(12) United States Patent
Bakman

(10) Patent No.: US 8,935,701 B2
(45) Date of Patent: Jan. 13, 2015

(54) UNIFIED MANAGEMENT PLATFORM IN A COMPUTER NETWORK

(75) Inventor: Alexander Bakman, Durham, NH (US)

(73) Assignee: Dell Software Inc., Aliso Viejo, CA (US)

(*) Notice: Subject to any disclaimer, the term of this patent is extended or adjusted under 35 U.S.C. 154(b) by 992 days.

(21) Appl. No.: 12/400,559

(22) Filed: Mar. 9, 2009

(65) Prior Publication Data

US 2009/0307597 A1    Dec. 10, 2009

Related U.S. Application Data

(63) Continuation-in-part of application No. 12/395,524, filed on Feb. 27, 2009, and a continuation-in-part of application No. 12/249,822, filed on Oct. 10, 2008, now abandoned.

(60) Provisional application No. 61/078,285, filed on Jul. 3, 2008, provisional application No. 61/064,474, filed on Mar. 7, 2008.

(51) Int. Cl.
| | |
|---|---|
| G06F 9/46 | (2006.01) |
| G06F 11/00 | (2006.01) |
| H04L 12/26 | (2006.01) |
| G06F 11/34 | (2006.01) |
| H04L 12/24 | (2006.01) |

(52) U.S. Cl.
CPC .......... *G06F 11/008* (2013.01); *G06F 11/3442* (2013.01); *G06F 11/3447* (2013.01); *H04L 43/0876* (2013.01); *H04L 41/22* (2013.01); *G06F 11/3409* (2013.01); *G06F 2201/815* (2013.01); *H04L 41/145* (2013.01); *G06F 11/3466* (2013.01); *H04L 41/024* (2013.01); *H04L 41/147* (2013.01)
USPC ....................................... 718/104

(58) Field of Classification Search
None
See application file for complete search history.

(56) References Cited

U.S. PATENT DOCUMENTS

| | | | |
|---|---|---|---|
| 5,495,610 A | 2/1996 | Shing et al. | |
| 6,311,321 B1 * | 10/2001 | Agnihotri et al. | 717/120 |
| 6,434,613 B1 | 8/2002 | Bertram et al. | |
| 6,449,688 B1 | 9/2002 | Peters et al. | |
| 6,457,143 B1 | 9/2002 | Yue | |
| 6,496,568 B1 | 12/2002 | Nelson | |
| 6,757,371 B2 | 6/2004 | Kim et al. | |
| 6,785,768 B2 | 8/2004 | Peters et al. | |
| 6,854,009 B1 | 2/2005 | Hughes | |
| 7,010,493 B2 | 3/2006 | Yamamoto et al. | |
| 7,024,517 B1 | 4/2006 | Zahavi | |

(Continued)

FOREIGN PATENT DOCUMENTS

| | | |
|---|---|---|
| CA | 2792227 A1 | 5/2004 |
| WO | WO 2009/048609 A1 | 4/2009 |
| WO | WO 2009/108344 A1 | 9/2009 |

OTHER PUBLICATIONS

IBM, "IBM Tivoli Service Level Advisor Administrators Guide", Version 2.1, Sep. 2004.*

(Continued)

*Primary Examiner* — Meng An
*Assistant Examiner* — James J Lee
(74) *Attorney, Agent, or Firm* — Winstead PC

(57) ABSTRACT

A method, system and apparatus for a unified management platform in a computer network such as in a virtualized computer environment, is provided.

12 Claims, 60 Drawing Sheets

(56) References Cited

U.S. PATENT DOCUMENTS

| | | |
|---|---|---|
| 7,069,234 B1 | 6/2006 | Cornelius et al. |
| 7,100,195 B1 | 8/2006 | Underwood |
| 7,111,297 B1 | 9/2006 | Sankaranarayan et al. |
| 7,167,844 B1 | 1/2007 | Leong et al. |
| 7,290,259 B2 * | 10/2007 | Tanaka et al. ............. 718/1 |
| 7,320,131 B1 | 1/2008 | O'Toole, Jr. |
| 7,412,492 B1 | 8/2008 | Waldspurger |
| 7,412,709 B2 * | 8/2008 | Branson et al. ............. 719/328 |
| 7,430,692 B2 | 9/2008 | White, III et al. |
| 7,689,676 B2 | 3/2010 | Vinberg et al. |
| 7,757,214 B1 | 7/2010 | Palczak et al. |
| 7,792,931 B2 | 9/2010 | Vinberg et al. |
| 8,127,291 B2 | 2/2012 | Pike et al. |
| 8,209,687 B2 | 6/2012 | Yuyitung et al. |
| 8,255,906 B2 | 8/2012 | Ding et al. |
| 8,291,411 B2 | 10/2012 | Beaty et al. |
| 8,320,256 B2 | 11/2012 | Temple, III |
| 8,738,972 B1 | 5/2014 | Bakman et al. |
| 2002/0128029 A1 | 9/2002 | Nishikawa et al. |
| 2002/0129082 A1 | 9/2002 | Baskey et al. |
| 2002/0133757 A1 | 9/2002 | Bertram et al. |
| 2002/0165963 A1 | 11/2002 | Baxley et al. |
| 2002/0188576 A1 | 12/2002 | Peterson et al. |
| 2003/0005108 A1 | 1/2003 | Bartley et al. |
| 2003/0028440 A1 | 2/2003 | Allen et al. |
| 2003/0046396 A1 | 3/2003 | Richter et al. |
| 2003/0110421 A1 | 6/2003 | Kurinami et al. |
| 2003/0169863 A1 | 9/2003 | Hernandez et al. |
| 2003/0171907 A1 | 9/2003 | Gal-On et al. |
| 2004/0117311 A1 | 6/2004 | Agarwal et al. |
| 2004/0139037 A1 | 7/2004 | Paleologo |
| 2004/0143664 A1 | 7/2004 | Usa et al. |
| 2004/0221285 A1 | 11/2004 | Donovan et al. |
| 2004/0249763 A1 | 12/2004 | Vardi |
| 2005/0010502 A1 | 1/2005 | Birkestrand et al. |
| 2005/0010930 A1 | 1/2005 | Vaught |
| 2005/0038833 A1 | 2/2005 | Colrain et al. |
| 2005/0086331 A1 | 4/2005 | Wadia et al. |
| 2005/0091399 A1 | 4/2005 | Candan et al. |
| 2005/0120160 A1 | 6/2005 | Plouffe et al. |
| 2005/0138168 A1 | 6/2005 | Hoffman et al. |
| 2005/0187950 A1 | 8/2005 | Parker et al. |
| 2005/0193269 A1 | 9/2005 | Haswell et al. |
| 2005/0240668 A1 | 10/2005 | Rolia et al. |
| 2005/0256946 A1 * | 11/2005 | Childress et al. ............. 709/223 |
| 2005/0278453 A1 | 12/2005 | Cherkasova |
| 2006/0025985 A1 | 2/2006 | Vinberg et al. |
| 2006/0031248 A1 | 2/2006 | Vinberg et al. |
| 2006/0037002 A1 | 2/2006 | Vinberg et al. |
| 2006/0059492 A1 | 3/2006 | Fellenstein et al. |
| 2006/0161884 A1 | 7/2006 | Lubrecht et al. |
| 2006/0190482 A1 | 8/2006 | Kishan et al. |
| 2006/0265711 A1 | 11/2006 | Bantz et al. |
| 2006/0288348 A1 | 12/2006 | Kawamoto et al. |
| 2007/0011092 A1 | 1/2007 | Bishop et al. |
| 2007/0043860 A1 | 2/2007 | Pabari |
| 2007/0168494 A1 | 7/2007 | Liu et al. |
| 2007/0271560 A1 | 11/2007 | Wahlert et al. |
| 2007/0271570 A1 | 11/2007 | Brown et al. |
| 2008/0052206 A1 | 2/2008 | Edwards et al. |
| 2008/0059214 A1 | 3/2008 | Vinberg et al. |
| 2008/0071905 A1 | 3/2008 | Sullivan et al. |
| 2008/0082983 A1 | 4/2008 | Groetzner et al. |
| 2008/0086731 A1 | 4/2008 | Trossman et al. |
| 2008/0126547 A1 | 5/2008 | Waldspurger |
| 2008/0133777 A1 | 6/2008 | Wilkinson |
| 2008/0172673 A1 * | 7/2008 | Naik ............. 718/104 |
| 2008/0189468 A1 | 8/2008 | Schmidt et al. |
| 2008/0189700 A1 | 8/2008 | Schmidt et al. |
| 2008/0216175 A1 | 9/2008 | Pike |
| 2008/0295096 A1 | 11/2008 | Beaty et al. |
| 2009/0013157 A1 * | 1/2009 | Beaule ............. 712/225 |
| 2009/0055834 A1 | 2/2009 | Ding et al. |
| 2009/0070771 A1 | 3/2009 | Yuyitung et al. |
| 2009/0100370 A1 | 4/2009 | Martone et al. |
| 2009/0164356 A1 | 6/2009 | Bakman |
| 2009/0287571 A1 | 11/2009 | Fujioka |
| 2009/0300173 A1 | 12/2009 | Bakman et al. |
| 2009/0300409 A1 | 12/2009 | Bates et al. |
| 2010/0049851 A1 | 2/2010 | Garrison et al. |
| 2010/0091664 A1 | 4/2010 | Nandy et al. |
| 2010/0162200 A1 | 6/2010 | Kamiyama et al. |
| 2010/0180275 A1 | 7/2010 | Neogi et al. |
| 2010/0306163 A1 | 12/2010 | Beaty et al. |
| 2011/0004885 A1 | 1/2011 | Kikuchi et al. |
| 2011/0035752 A1 | 2/2011 | Krishnakumar et al. |
| 2011/0125895 A1 | 5/2011 | Anderson et al. |
| 2011/0149737 A1 | 6/2011 | Muthiah et al. |
| 2011/0167424 A1 | 7/2011 | Murthy et al. |
| 2011/0276784 A1 | 11/2011 | Gewirtz et al. |
| 2011/0283283 A1 | 11/2011 | Kuno et al. |
| 2012/0072781 A1 | 3/2012 | Kini et al. |
| 2012/0167101 A1 | 6/2012 | Kandula et al. |
| 2012/0246646 A1 | 9/2012 | Bakman |
| 2012/0260248 A1 | 10/2012 | Katiyar et al. |
| 2012/0284713 A1 | 11/2012 | Ostermeyer et al. |
| 2012/0297385 A1 | 11/2012 | Arlitt et al. |
| 2013/0013248 A1 | 1/2013 | Brugler et al. |
| 2013/0218547 A1 | 8/2013 | Ostermeyer et al. |
| 2013/0239112 A1 | 9/2013 | Kato et al. |
| 2013/0275382 A1 | 10/2013 | Chi et al. |
| 2014/0032768 A1 | 1/2014 | Ding et al. |
| 2014/0181833 A1 | 6/2014 | Bird et al. |

OTHER PUBLICATIONS

International Preliminary Report and Written Opinion for PCT/US09/01237, mailed Jun. 3, 2009 (12 pages).

International Preliminary Report and Written Opinion PCT/US08/11639, mailed Dec. 18, 2008 (9 pages).

International Search Report for PCT/US08/11639, mailed Dec. 18, 2008 (1 page).

International Search Report for PCT/US09/01237, mailed Jun. 3, 2009 (2 pages).

Agarwala, Sandip, et al., "ChargeView: An Integrated Tool for Implementing Chargeback in IT Systems", Apr. 2008, 8 pages.

* cited by examiner

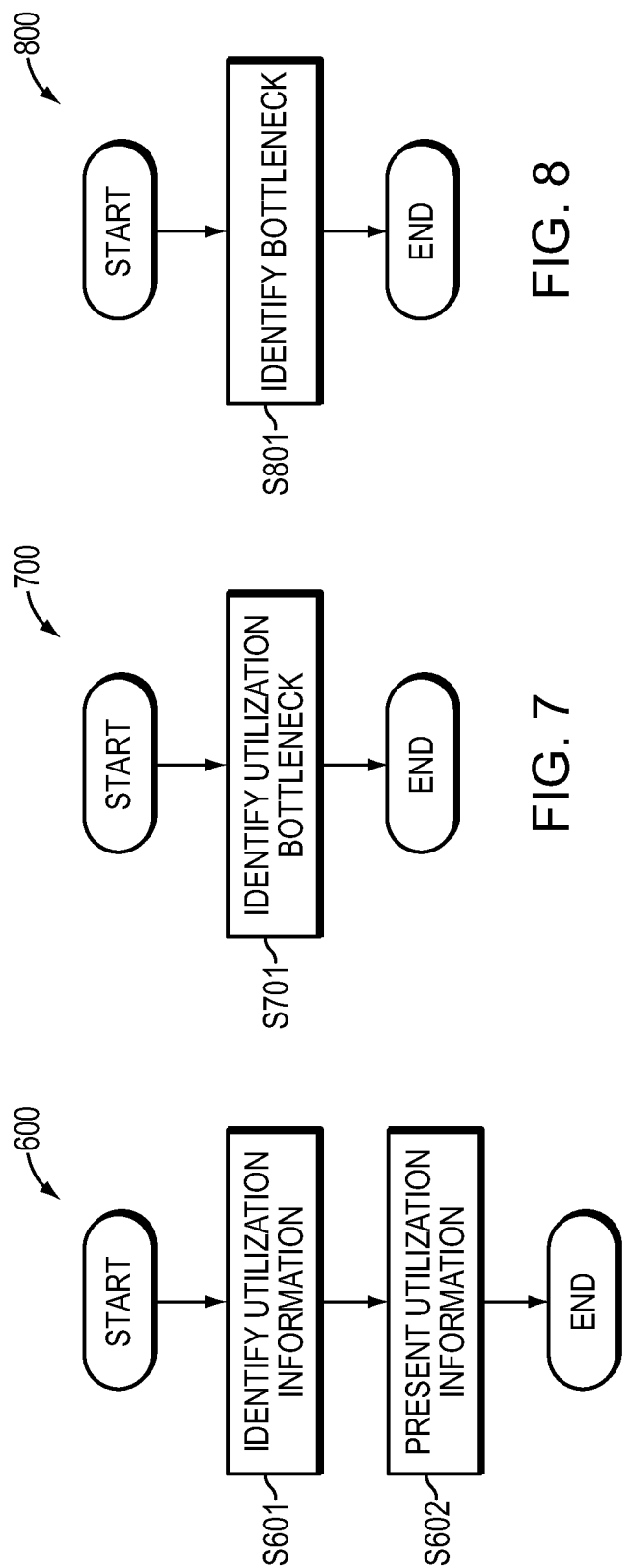

FIG. 9

| Manage Connections | | | |
|---|---|---|---|
| Connection | User Name | Status | Hours of historical data to collect |
| https://192.168.111.8./cdk | #cora | OK | 168 h |

Refresh | Add | Import from CSV file | Edit | Select Mode | Remove | Close

FIG.10

| ⤒ Save in PDF | 📄 Save in CSV | ▷ Scheduled report | | | | | | |
|---|---|---|---|---|---|---|---|---|
| Current Bottlenecks | Future Bottlenecks | Datastore Statistics | Top Consumers | Capacity Availability | | | | |

Current Capacity Bottlenecks

⊞ Identifies all hosts, clusters, resource pools or VMs that have bottlenecks ordered by highest severity...      Sort by most critical

| Virtual Objects | CPU | Memory | Storage | CPU Ready | IO Wait | Disk Bus Resets | Disk Commands Aborted |
|---|---|---|---|---|---|---|---|
| 🗔 SLCS 10 Proxy 11C | 1% ⇧ | XX% | XX% | 0% ⇧ | 7% ⇧ | 0 ⇧ | 0 ⇧ |
| 🗔 VK 115.108/XXXXXX X X XX 2 | 6% ➡ | XX% | 41% ⬅ | 1% ⇧ | 6% ⇧ | 0 ⇧ | 0 ⇧ |
| 🗔 VK_Xxxxx_XX | 4% ➡ | XX% | XX% | 2% ⇧ | 5% ⇧ | 0 ⇧ | 0 ⇧ |
| 🗔 XXXP.500 xx | 7% ⬅ | XX% | XX% | 1% ⇧ | 2% ⇧ | 0 ⇧ | 0 ⇧ |
| 🗔 XXXXXX_ XXXX | 1% ⇧ | 10% ⇧ | XX% | 0% ⇧ | 7% ⇧ | 0 ⇧ | 0 ⇧ |
| 🗔 XxxXP Tatyana | 2% ➡ | 73% ➡ | 41% ⬅ | 2% ⇧ | 9% ⇧ | 0 ⇧ | 0 ⇧ |
| 🗔 XXXXXX XXXXX XXXXX | 5% ⬅ | XX% | 97% ⬅ | 0% ⇧ | 5% ⇧ | 0 ⇧ | 0 ⇧ |
| 🗔 Sergs_CB1.4_XX_1 | 6% ⇧ | 77% ➡ | 97% ⬅ | 1% ⇧ | 4% ⇧ | 0 ⇧ | 0 ⇧ |
| 🗔 XXXXXXXXXXXXXXXXX | 15% ⬅ | XX% | XX% | 2% ⇧ | 2% ⇧ | N/A | N/A |
| 🗔 Yurys_Xxxxxx | 4% ➡ | XX% | 52% ➡ | 2% ⇧ | 11% ⇧ | 0 ⇧ | 0 ⇧ |
| Page 1 of 17 ▶ ▶❘ ○ | | | | | | | Displaying 1-10 of 161 |

FIG. 12

| METRIC | WARNING LEVEL | |
|---|---|---|
| CPU, MEMORY, STORAGE, NETWORK | 50% | |
| CPU READY | 5% | |
| IO WAIT | 25% | |
| DISK BUS RESETS | 5 | |
| DISK COMMANDS ABORTED | 10 | |

FIG. 13

| Save in PDF | Save in CSV | ▷Scheduled report | | | |
|---|---|---|---|---|---|
| Current Bottlenecks | Future Bottlenecks | Datastore Statistics | Top Consumers | Capacity Availability | |
| ⊞ The Datasore Statistics graph xxxxxxx xxxxxxxxxxx xxxxxxxx xx xxxxxxxxxxxxx xxxxxxxxxxx xxxxxxxxxxxxxxxxxx... | | | Xxxxxxxx Xxxxxxx | | |
| Xxxxxxxx | Xxx | xxxxxxxx-xxxxxxxxxxxxxxxxx xxxxxxxxxxxxxxxxx | Xxxxxx Xxxxxx | Xxxx Xxxx | Xxxx Xxxx |
| XxxxxXX | | | Xxxx Xxxxxxxx Xxxxxxxxxxxx | XXXXXX | XXXXXX |
| Xxxx_XX | xxxxxxxx-xxxxxxxxxxxxxxxxx xxxxxxxxxxxxxxxxx | | Xxxx Xxxxxxx Xxxxxxxxxxxx Xxxxxxxxxxxxxxx | XXXXXXX | XXXXXX |
| XXXX_XXxxxx | xxxxxxxx-xxxxxxxxxxxxxxxxx xxxxxxxxxxxxxxxxx | | Xxxx Xxxxxx Xxxxxxx Xxxxxxx | XXXXXX | XXXXXX |
| XXXX_XXxxxx | xxxxxxxx-xxxxxxxxxxxxxxxxx xxxxxxxxxxxxxxxxx | | Xxxx XXX XXX XXX XXX Xxxxxxxxxx Xxxxxxxxxxxxxxx Xxxx Xxxxxxxxxxx Xxxxxxxxxxxxxxx Xxxxxxxxxxx | XXXXXXX | XXXXXXX |
| XXXX-XXxxxx | | | Xxx XXX XXX XXX XXX Xxxx Xxxx Xxxxxxxxxxx Xxx XXX XXX XXX XXX Xxxx Xxxx Xxxxxxxxxxx Xxxxxx Xxxxxxx Xxxxxx xxx xxxxx | XXXXXXX | XXXXXXX |
| XxxXX | | | Xxx XXX XXX XXX XXX Xxxx Xxxx Xxxxxxxxxxxxxxxxxxx Xxx XXX XXX XXX XXX Xxxx Xxxx Xxxxxxxxxxxxxxxx Xxxxxxxxxxxxxxx Xxxxx Xxxx Xxxxxx Xxxxxxxxxxxxxxx Xxxxx Xxxx Xxxxxx Xxxxxxxxxxxxxxxxxxxxxxx | XXXXXXX | XXXXXXX |

FIG. 14

| MINIMUM REQUIREMENTS | STANDARD | ENTERPRISE |
|---|---|---|
| MEMORY | 2 GB | 2 GB |
| STORAGE | 5 GB | 3 GB |
| NETWORK | 10 Mbps | 10 Mbps |
| SOFTWARE | VMWARE PLAYER 1.0.0 OR HIGHER, VMWARE WORKSTATION 5 OR HIGHER, VMWARE ESX SERVER 3.X OR HIGHER, VIRTUALCENTER 2.5 OR HIGHER, OR VMWARE SERVER 1.03 OR HIGHER | |
| BUILT-IN SOFTWARE | | |
| | TOMCAT | 5.5.20 |
| | APACHE | 2.2.4 |
| | VMWARE TOOLS | 3.5.0-82663 |
| | MYSQL | 5.0.45 |

Capacity Availability Map

Need to know where is the best place to deploy new VMs?
Capacity Availability Map lists all hosts, clusters or resource pools with the most available capacity, ordered by availability. The Available VM Capacity identifies VMs you can run on that particular object before hitting the red threshold level. This graph can also help identify underutilized systems. The number of additional VMs is calculated by taking the average VM utilization (CPU, memory, storage) on a host, cluster or resource pool, checking the remaining resources on the object, and determining the most limiting resource. If HA is enabled for that resource, we use the maximum value for each resource type (CPU, memory, storage) to calculate the number of additional VMs. Also the number of additional VMs may also be calculated by using the utilizations specified at "Settings" >> "Options" >> "Average VM Settings" if the "Use the above settings when calculating the Capacity Availability Map" box is checked there.

| Virtual Object | Number of Running VMs | How Many More VMs Can Fit | HA Enabled | Calculated VM Size | Constraining Res |
|---|---|---|---|---|---|
| ⊖ Schmitt | 10 | 9 | ⊗ | • 512 MB of Memory<br>• 1000 MHz of CPU<br>• 2.256 GB Storage | ☐ CPU |
| ⊖ Pontes | 0 | 9 | ⊗ | • 512 MB of Memory<br>• 1000 MHz of CPU<br>• 2.256 GB Storage | ☐ CPU |
| ⊖ Perrier | 9 | 9 | ⊗ | • 512 MB of Memory<br>• 1000 MHz of CPU<br>• 2.256 GB Storage | ☐ CPU |
| ⊖ Gonzalez | 0 | 9 | ⊗ | • 512 MB of Memory<br>• 1000 MHz of CPU<br>• 2.256 GB Storage | ☐ CPU |
| ⊖ Castro | 0 | 9 | ⊗ | • 512 MB of Memory<br>• 1000 MHz of CPU<br>• 2.256 GB Storage | ☐ CPU |

Prediction based on 7 days of historic data. Confidence 100%.

FIG. 31

| Custom Groups ▼ | Reports ▼ | Alerts | Scheduled Tasks | Settings ▼ | Help ▼ | | | Vkernel Capacity Analyzer 3.0 R Enterprise Ed. © 2008 Vkernel Corp. Patents Pending |
|---|---|---|---|---|---|---|---|---|

Navigate  «   △ Save in PDF   📊 Save in CSV   ▷ Scheduled report

⊙ Push this button to reallocate tree items

| Current Bottlenecks | Future Bottlenecks | Datastore Statistics | Top Consumers | Capacity Availability |
|---|---|---|---|---|

Future Capacity Bottlenecks

☐ Predicts in how many days a warning or critical bottleneck will develop. Bottlenecks are calculated by default up to 30 days into the future (this can be changed from the "Settings" menu then "Options" and finally "Prediction Period" in the General Section. A minimum of 7 days of historical data is required to calculate future capacity bottlenecks accurately.

- ⊞ ☐ Custom Groups
- ⊟ 🖳 Virtual Environment
  - ⊞ ☑ ESX3.5
    - ⊞ ☐ 192.168.111.190
      - ⊞ 🖳 Eastern
      - ⊞ 🖳 Northern
      - ⊞ 🖳 Western

| Virtual Object | Constraining Resource | Days to warning or problem | Days to warning or problem - if 50% Powered off VMs are on |
|---|---|---|---|
| 🖳 DRACD-1 | Memory | 3 Days | 3 Days |
| 🖳 FOLIG-1 | Memory | 7 Days | 7 Days |
| 🖳 GALED | Memory | 9 Days | 9 Days |
| 🖳 KOENE-1 | Memory | 9 Days | 9 Days |
| ⊙ Eastern | Storage | 15 Days | 15 Days |
| ⊙ Bennett | Storage | 15 Days | 15 Days |
| ⊙ Dewey | Storage | 15 Days | 15 Days |
| ⊙ Franken | Storage | 15 Days | 15 Days |
| ⊙ Hernandez | Storage | 15 Days | 15 Days |
| ⊙ Izquierdo | Storage | 15 Days | 15 Days |

3201 ↗

| Page [1] of 39 ▶ ▶| | ○ Zoom out | Now 15 30 60 90<br>Days to predict | Displaying 1 - 10 of 387 |
|---|---|---|---|

Prediction based on 7 days of historic data. Confidence 50%.

Information

FIG. 32

| Virtual Machine | Utilization in MB | Limit | Recommendation | Execute |
|---|---|---|---|---|
| VK_CA_3.0_Release_SE | 400 | 923 | Set limit to 520 MB. | ☐ |
| Vkernel CB 1.3.1 | 760 | 765 | Set reservation to 700 MB.<br>Set limit to 800 MB. | ☐ |
| VK_CBA_2.0_Beta_Standard | 460 | None | Set limit to 500 MB. | ☐ |
| VK_Search_Prod | 480 | 650 | Set limit 510 MB. | ☐ |
| VK_Modeler_1.0_Beta_SE | 560 | 500 | Set reservation to 600 MB.<br>Set limit to 600 MB. | ☐ |

In general, 15% of memory usage could be recovered by changing 57 virtual machines.

UNIFIED MANAGEMENT PLATFORM IN A COMPUTER NETWORK

CROSS-REFERENCE TO RELATED PATENT APPLICATION

This is a continuation-in-part application under 35 U.S.C. 120 of U.S. Nonprovisional application Ser. No. 12/395,524, filed on Feb. 27, 2009 in the U.S. Patent and Trademark Office, the entire disclosure of which is incorporated herein by reference. Additionally, this application claims the benefit under 35 U.S.C. §119(e) of U.S. Provisional Patent Applications Nos.: 61/078,285 filed on Jul. 3, 2008; and 61/064,474 filed on Mar. 7, 2008 in the U.S. Patent and Trademark Office, the entire disclosures of which are incorporated herein by reference. Additionally, this application is a continuation-in-part of U.S. Non-Provisional patent application Ser. No. 12/249,822, filed on Oct. 10, 2008 now abandoned in the U.S. Patent and Trademark Office, the entire disclosure of which is incorporated herein by reference.

FIELD OF THE INVENTION

The present application is in the field of computer networks and systems management and is directed to a unified management platform in a computer network.

BACKGROUND OF THE INVENTION

Conventionally, information technology (hereinafter "IT") organizations consolidate physical servers into a smaller set of physical servers running many virtual servers. In this virtual server environment, most or all hardware resources, such as memory, central processing unit (CPU), storage and network are shared among the virtual servers. Many organizations are reducing the number of physical servers through virtualization technologies which allow for multiple virtual servers to run on one or more physical servers. With consolidation of servers it is inevitable that capacity bottlenecks will develop in sharing or resources such as CPU, RAM, and Storage. That is, if the shared resources are over-utilized, users can experience performance degradation and even downtime.

Conventional approaches for determining capacity bottlenecks is very labor intensive, requiring system administrators to manually examine numerous capacity graphs to determine where bottlenecks exist. That is, using conventional capacity reporting software is extremely time consuming and requires examination of hundreds of charts. For example, in a small environment with only 50 ESX hosts, a systems administrator would have to study nearly 260 graphs to evaluate utilization of just four resources: (50 Hosts+5 clusters+10 Resource Pools)*4 Resource types=260 graphs.

Furthermore, conventional techniques do not provide any means for proactively managing and allocating shared resources in a virtual environment. For example, conventional approaches do not anticipate resource allocation or future utilization that may lead to bottlenecks in CPU, memory, storage and disk Input/Output (hereinafter "I/O"), which can lead to performance problems and costly downtime situations. Likewise, conventional systems do not provide means for dealing with over-allocation of resources which can drive up the cost per virtual machine and diminishing returns on the investment in virtualization.

Furthermore, conventional systems management products are not designed to solve critical virtualization issues at the speed at which an organization (such as an IT organization) demands. Conventional systems management products include multitude of features pre-packaged with the installation—most of these features are not needed and are never used. The drawbacks of such conventional systems range from complex implementations and instruction manuals with superfluous information to unnecessary hardware and software resource consumption, as well as delays in deployment and installation. For example, conventional systems are time consuming, involve repetitive discovery and lack integration among system management applications, amongst other disadvantages and deficiencies.

Embodiments of the present invention address the above-noted drawbacks associated with conventional approaches to management and allocation of shared resources in a virtualized environment.

SUMMARY OF THE INVENTION

As noted above, exemplary embodiments of the present invention address at least the above-noted problems and/or disadvantages, and provide at least the advantages described below.

Exemplary embodiments and implementations of the present invention provide a method, system and apparatus for a unified management platform in a computer network. The methods can be computer implemented.

An exemplary embodiment of the present invention provides a method for predicting future utilization information of resources on a computer network. The method comprises identifying computing objects utilizing resources on the network, and generating future utilization information for each object for a specified time period. A notification based on, and/or indicative of, a prediction of future utilization information can be generated as desired. According to an exemplary implementation, future utilization information is based on historical utilization information.

Another exemplary embodiment of the present invention provides a method and system that facilitate evaluation of resource utilization in a computer network. An exemplary implementation, involves monitoring utilization of one or more computing objects utilizing resources on the computer network, generating resource availability information related to each computing object, generating resource bottleneck information for each computing object, generating resource utilization trend information for resource consumers, and generating a notification based on, and/or indicative of, computing resource utilization. The monitoring and generation of information, including or without a notification, can be performed continuously, or on demand.

Yet another exemplary embodiment of the present invention provides a graphical user interface (GUI) for displaying, managing and allocating computing resources in a computer network. According to an exemplary implementation, the GUI comprises an interface for mapping a computing object with a computing resource, another interface providing utilization bottleneck information of computing resources in the computer network, and another interface providing utilization trends for the computing resources. The GUI can be implemented to facilitate utilization of the systems and methods according to exemplary embodiments of the present invention.

Another exemplary implementation of the present invention provides a method and system for monitoring utilization trends of a computing object utilizing the at least one resource in the computer network.

Yet another exemplary implementation of the present invention provides a method and system for identifying utilization bottleneck of computing resources in a computer network.

Yet another exemplary implementation of the present invention provides a method and system for identifying at least one current utilization bottleneck of at least one computing resource in a computer network, where the current utilization is based on past and present utilization of the computing resource.

Yet another exemplary implementation of the present invention provides a method and system for identifying at least one future bottleneck of computing resources in a computer network, where identifying of future bottleneck comprises predicting utilization trend information based at least on past and present computing resource utilization.

Yet another exemplary implementation of the present invention provides a GUI that facilitates predictive analysis of computing objects utilizing resources in a computer network by providing, for example, a slider user interface allowing a user to specify a time period within a range of time periods for predictive analyses. A slider can be displayed along with resource utilization information for the computing objects, so that a user can receive immediate feedback via the display while selectively manipulating the slider.

Yet, another exemplary implementation of the present invention provides a method for analyzing and utilizing unused resource utilization of at least one virtual machine ("VM") in a computer network.

Yet, another exemplary implementation of the present invention provides a method for analyzing, managing and modeling resource utilization of resources in a computer network. For example, at least one virtual machine ("VM") in a computer network.

Yet, another exemplary implementation of the present invention provides a method, apparatus and system for a unified management platform in a virtual computer network, providing a novel approach to system management for virtual resources, providing at least the benefit of optimizing time for system administrators.

Embodiments of the present invention provide for proactively analyzing and managing shared capacity utilization trends in a virtualized environment utilizing a graphical use interface, providing the benefit of significantly reducing the time and costs of utilizing and maintaining virtualized environments.

BRIEF DESCRIPTION OF THE DRAWINGS

The above and other exemplary features, aspects and advantages of the present invention will become more apparent from the following detailed description of certain exemplary embodiments thereof when taken in conjunction with the accompanying drawings in which:

FIGS. 4-8 are flow diagrams illustrating methodology for predicting future utilization of resources and managing capacity on a computer network, according to exemplary implementations of the present invention.

Figure 9:
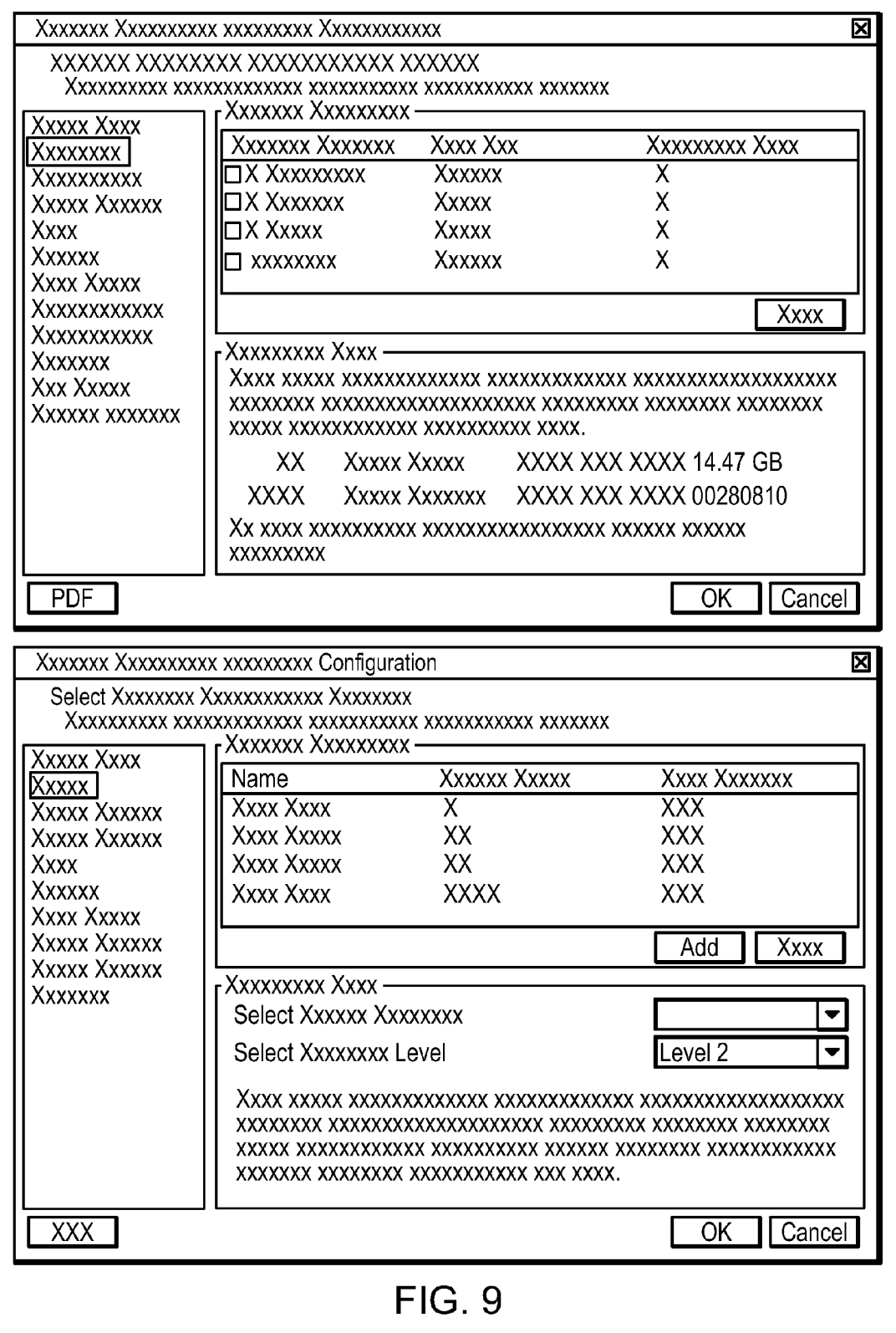

FIGS. 9-16 are screenshots illustrating exemplary GUI implementations, as well as methods, systems as devices for managing resource capacity availability on a network, according to exemplary implementations of the present invention.

FIGS. 18-28 are screenshots illustrating exemplary GUI implementations, as well as methods, systems and devices for identifying, managing and predicting capacity bottlenecks, according to exemplary implementations of the present invention.

FIGS. 29-39 are screenshots illustrating exemplary GUI implementations, as well as methods, systems and devices for managing resource capacity, availability and bottlenecks on a network, according to exemplary implementations of the present invention.

FIGS. 40-45 are screenshots illustrating exemplary GUI implementations, as well as methods, systems and devices for analyzing, utilizing and/or sizing resource utilization of at least one virtual machine ("VM") in a computer network.

Figure 51:
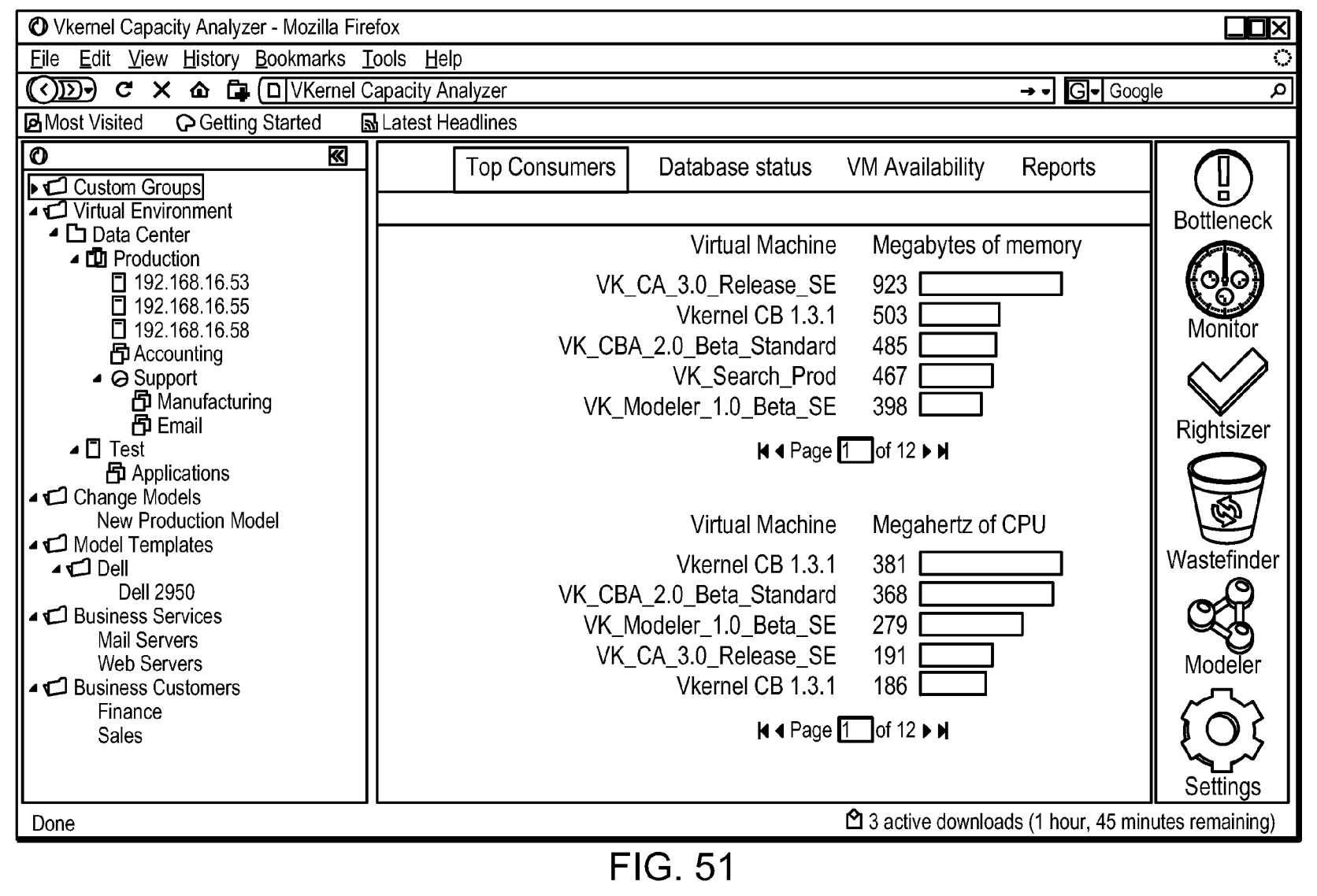

FIGS. 48-53 are screenshots illustrating exemplary GUI implementations, as well as methods, systems and device for analyzing, utilizing and managing and modeling capacity of resources for at least one virtual machine in a computer network.

FIG. 55 is a screenshot illustrating an exemplary GUI implementation, as well as a method, system and device for automated licensing and licensing monitoring for resources in a virtual environment.

Throughout the drawings, like reference numerals will be understood to refer to like elements, features and structures.

DETAILED DESCRIPTION OF EXEMPLARY EMBODIMENTS

The matters exemplified in this description are provided to assist in a comprehensive understanding of exemplary embodiments of the present invention described with reference to the accompanying drawing figures. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness. Likewise, certain naming conventions, labels and terms as used in the context of the present disclosure are, as would be understood by skilled artisans, non-limiting and provided only for illustrative purposes to facilitate understanding of certain exemplary implementations of the embodiments of the present invention.

Exemplary implementations of the present invention provide a method, system and apparatus for proactively managing and allocating utilization of shared resources in a virtualized environment on a computer network. Some of the benefits that may be achieved by certain exemplary implementations of system and method according to the present invention include, but are not limited to:

Identifying current capacity bottlenecks causing performance problems.

Predicting future capacity bottlenecks and facilitating preventive actions.

Calculating resource availability across hosts, virtual machines, clusters and resource pools Providing information showing exactly where to safely add new virtual machines.

Tracking the top resource consumers in the virtualized environment.

Providing an alert when capacity utilization trends exceed thresholds.

Modeling resource utilization of at least one virtual machine ("VM") in a computer network.

Utilizing unused or under-utilized resource of at least one virtual machine ("VM") in a computer network.

Figure 1:
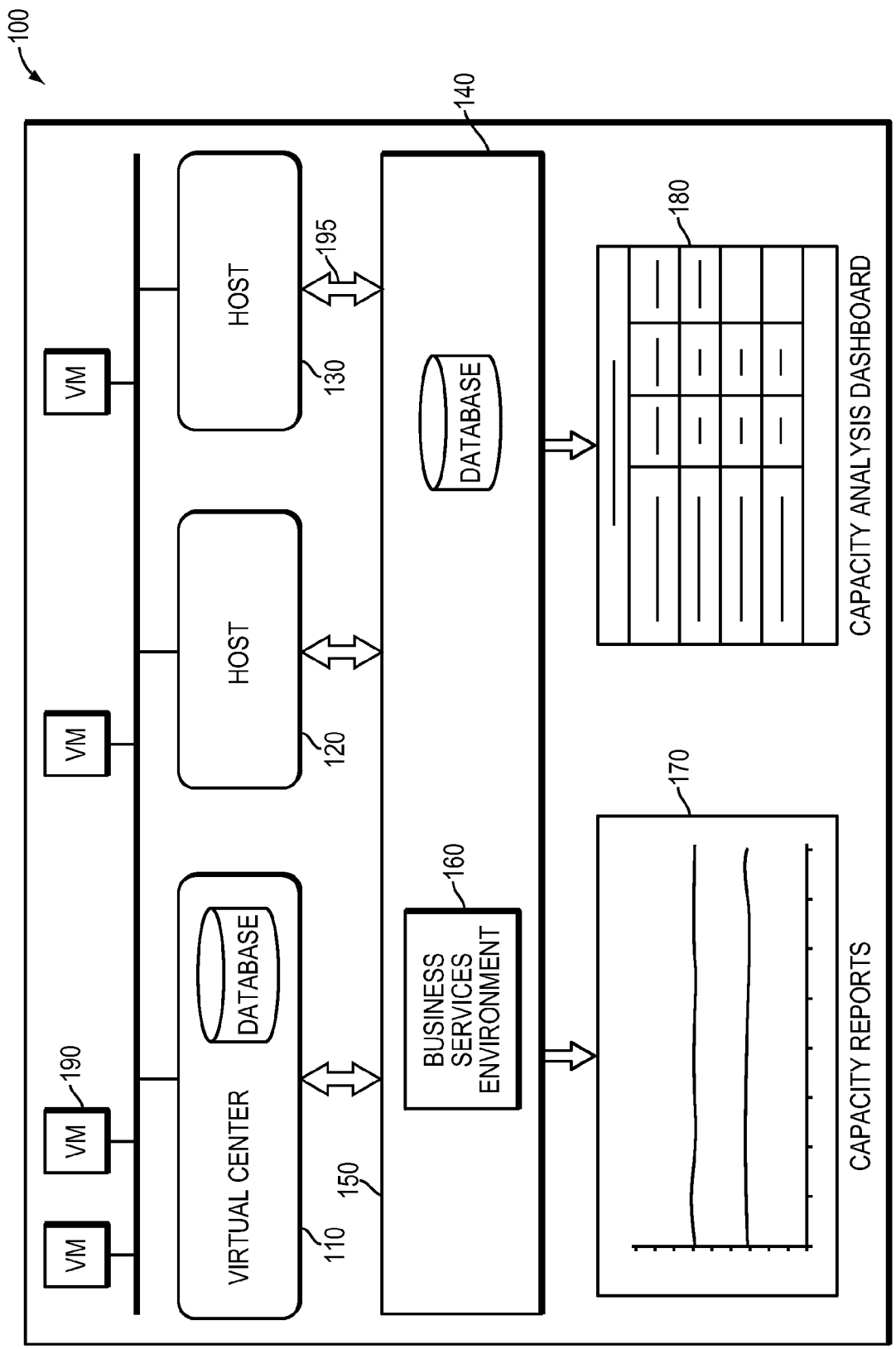
FIGS. 1-3 and 3a are schematic block diagrams that illustrate architecture associated with a method, system and apparatus according to exemplary embodiments of the present invention.
Figure 2:
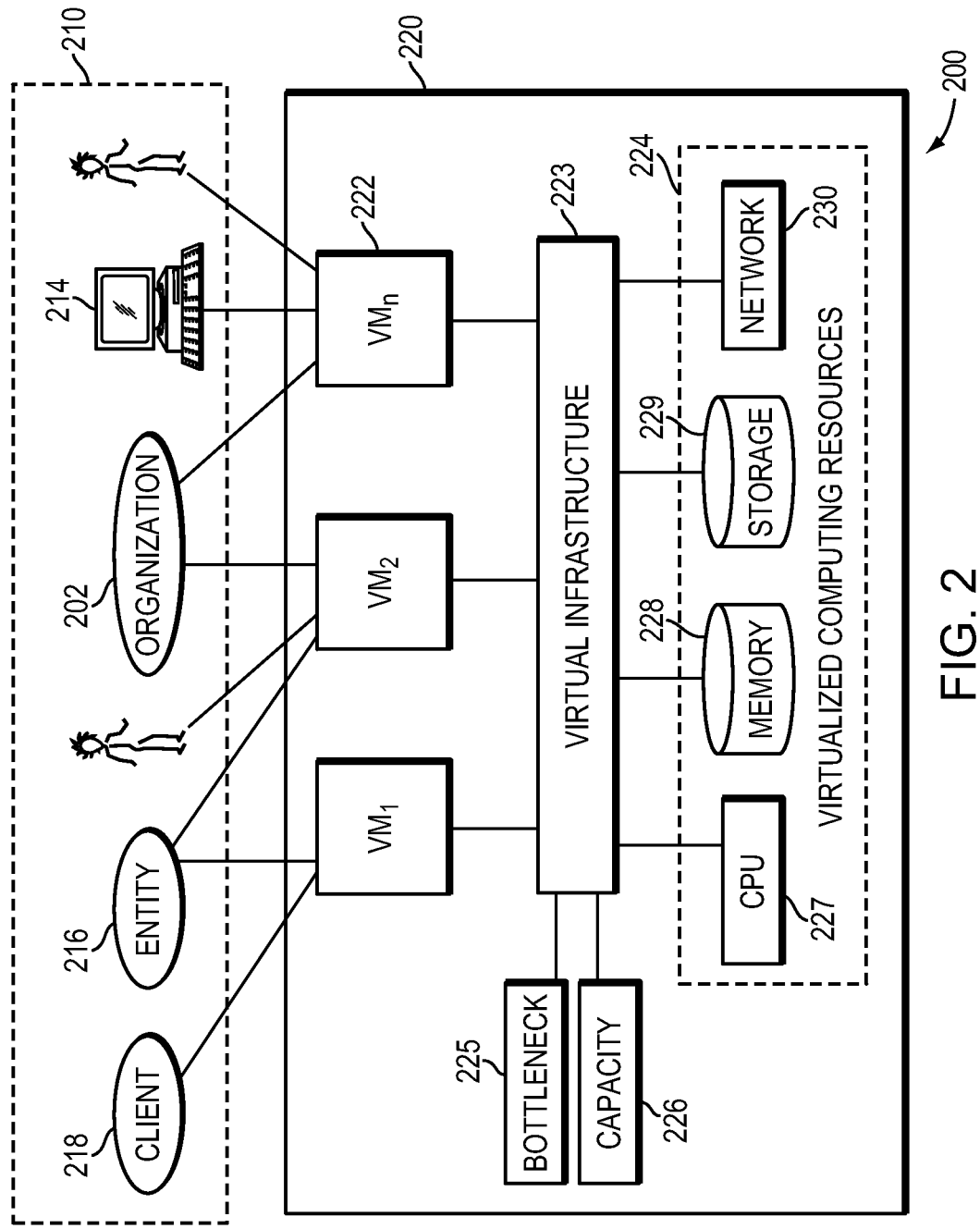
Figure 3:
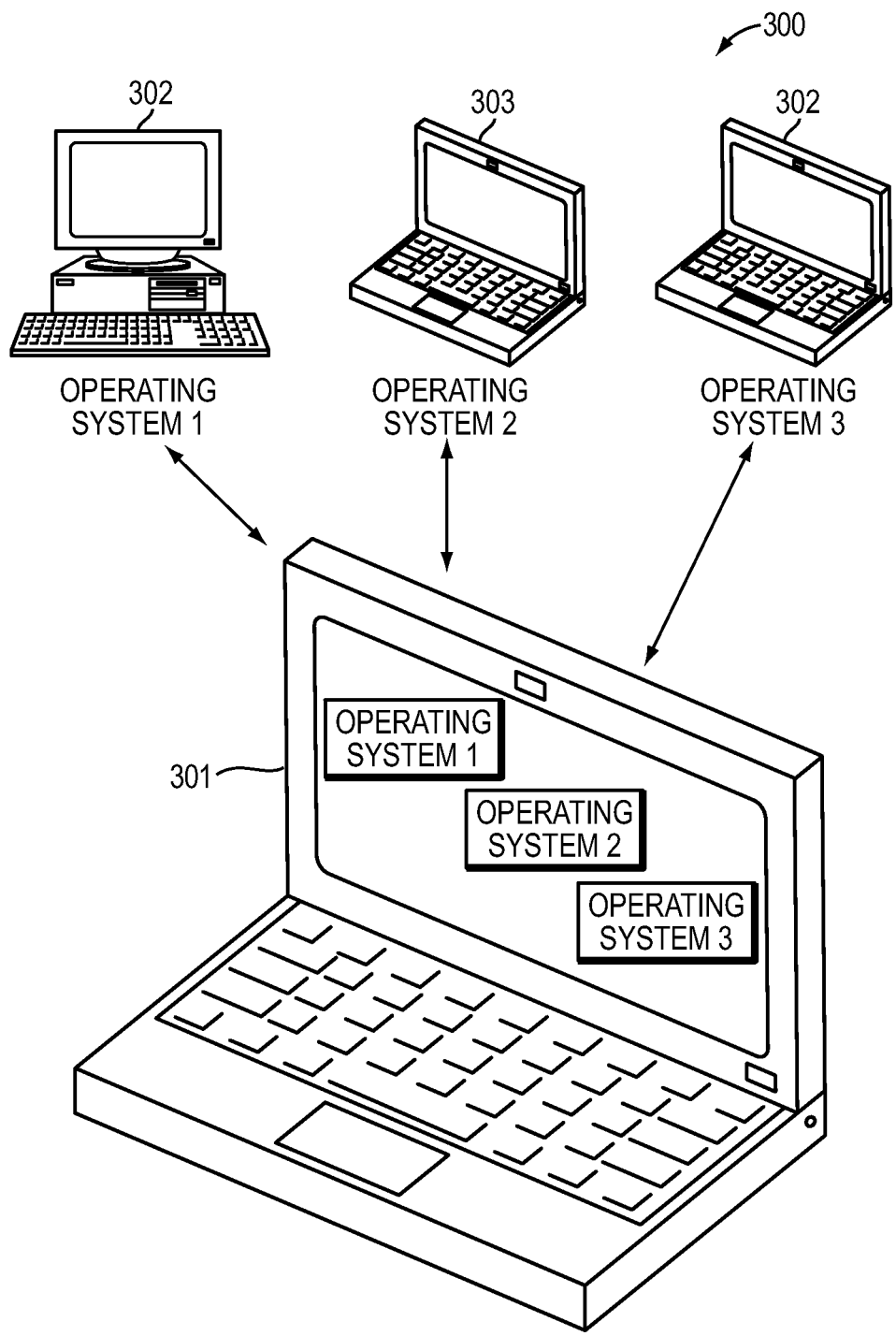

FIGS. 1-3 are schematic block diagrams that illustrate architecture associated with a method, system and apparatus of the present invention, according to an exemplary embodiment.

According to exemplary implementations, of the present invention, the methods and processes described, herein, can be performed continuously until terminated or be performed selectively as desired.

Referring to FIG. 1, the exemplary architecture 100 shows the a system for capacity utilization and management 150, according to the present invention, where business services 160, according to exemplary implementations of the present invention, in conjunction with a database, relate to 195 various hosts 120, 130 and a virtual center 110, providing services for virtual machines 190. Implementations of the present invention generate various reports for capacity utilization 170 and analysis 180.

Figure 3A:
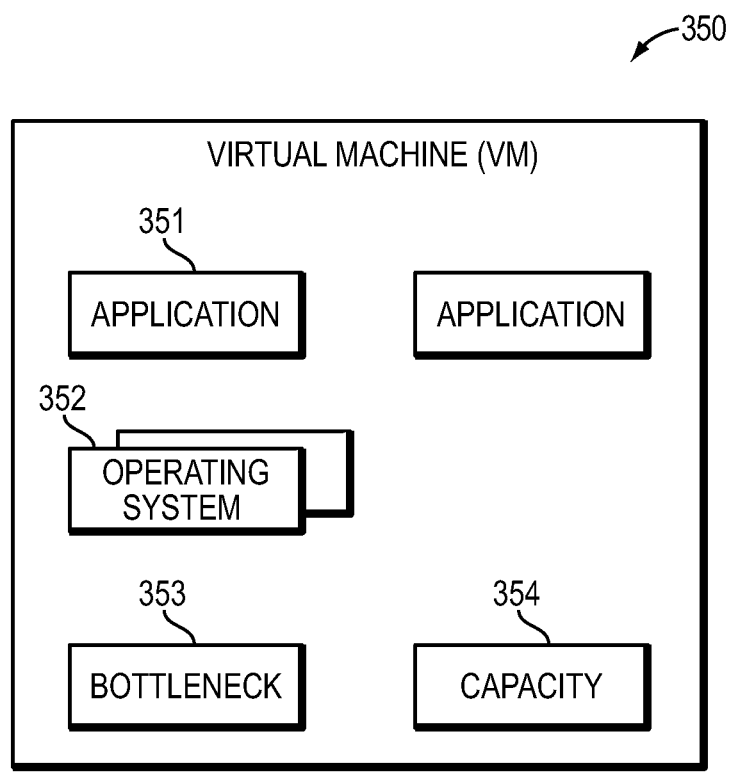

Referring to FIGS. 2, 3 and 3a, exemplary architectures 200, 300 and 350 show that virtualization essentially provides for one computer 301 doing the job of multiple computers 302, 303, 304, by sharing resources of a single computer 301 across multiple computing environments 302, 303, 304. Virtual servers and virtual desktops let entities host multiple operating systems 301 and multiple applications locally and in remote locations, freeing them from physical and geographical limitations. This leads to lower capital expenses due to more efficient use of computing resources, high availability of computing resources, better management of computing resources, increased security and improved disaster recover process.

According to an exemplary embodiment, as shown in FIG. 3a, a VM 350 is a tightly isolated software module (for example, a folder, a container, and so on) that can run it's own operating system and applications as if it were a physical computer. A VM 350 behaves like a physical computer and can be associated with virtual (for example, software-based) CPU 227, memory (for example, RAM) 228, storage 229 and network 230 (for example, network interface cards ("NIC")). A VM 351 can be comprised entirely of software with no direct relation to any real hardware. As a result, VMs offer a number of distinct advantages over physical hardware.

In general, VMs provide at least the following benefits:

1. Compatibility—VMs are compatible with all standard x86 computers.

2. Isolation—VMs are isolated from each other as if physically separated.

3. Encapsulation—VMs encapsulate a complete computing environment.

4. Hardware Independence—VMs run independently of underlying hardware.

According to exemplary implementations of virtual computing environments, an operating system cannot tell the difference between a virtual machine and a physical machine, nor can applications or other computers on a network.

According to exemplary embodiments of the present invention, a virtual machine can be a computer application 301 used to create a virtual environment allowing entities to run multiple operating systems 302, 303, 304 at the same time through the use of software located on the computer platform.

Exemplary embodiments and implementations of the present invention provide method, system and apparatus for managing, modeling, predicting, allocating and utilizing resources (also referred to as "capacity") in a computer network, where the resources comprise at least one of a memory, a central processing unit ("CPU"), network, storage and/or Input/Output ("I/O") channels (for example, storage I/O and network I/O) in a computer network.

VM can be implemented in various exemplary environments/implementations of the present application. VMs can be implemented as hardware virtual machine software in relation to utilization and capacity (for example, determining utilization bottleneck information and capacity information). Through the use of the hardware virtual machine software, a user can have a seemingly private machine with fully functional hardware that is separate from the other users. Hardware virtual machine software also allows users to boot and restart their machines quickly since hardware initializations are not necessary.

According to exemplary implementations, VMs can also be implemented as application VM software. Application VM software allows the software application to be isolated from the computer being used. The software is intended to be used on a number of computer platforms. This makes it unnecessary to create separate versions of the same software for different operating systems and computers. Java Virtual Machine is an example of an application VM.

According to other exemplary implementations, VM can also be a virtual environment that is used for running programs at the user level for executing applications and not for drivers or operating system kernels.

According to other exemplary implementations, a VM 222 can also be a group of computers that work together to create a more powerful machine. These implementations of VMs make it possible for one environment 200 to be formed throughout several centers (for example, computers, users and/or entities) 101. This makes it appear to the end user as if he or she is using a single computer 301, when they are actually using numerous computers 302, 303, 304.

Exemplary implementations of the present invention provide the benefit of optimal performance by providing for proactive capacity management and proper allocation of shared resources in a virtual server infrastructure. Additionally, exemplary implementations of the present invention provide for allocating an appropriate amount of resources to avoid bottlenecks in CPU, memory, storage, and disk I/O, providing the benefit of avoiding performance problems and costly downtime events. Exemplary implementations of the present invention also provide the benefit of avoiding over-allocating resources that can drive up cost per virtual machine—making a Return On Investment harder to achieve.

Figure 21:
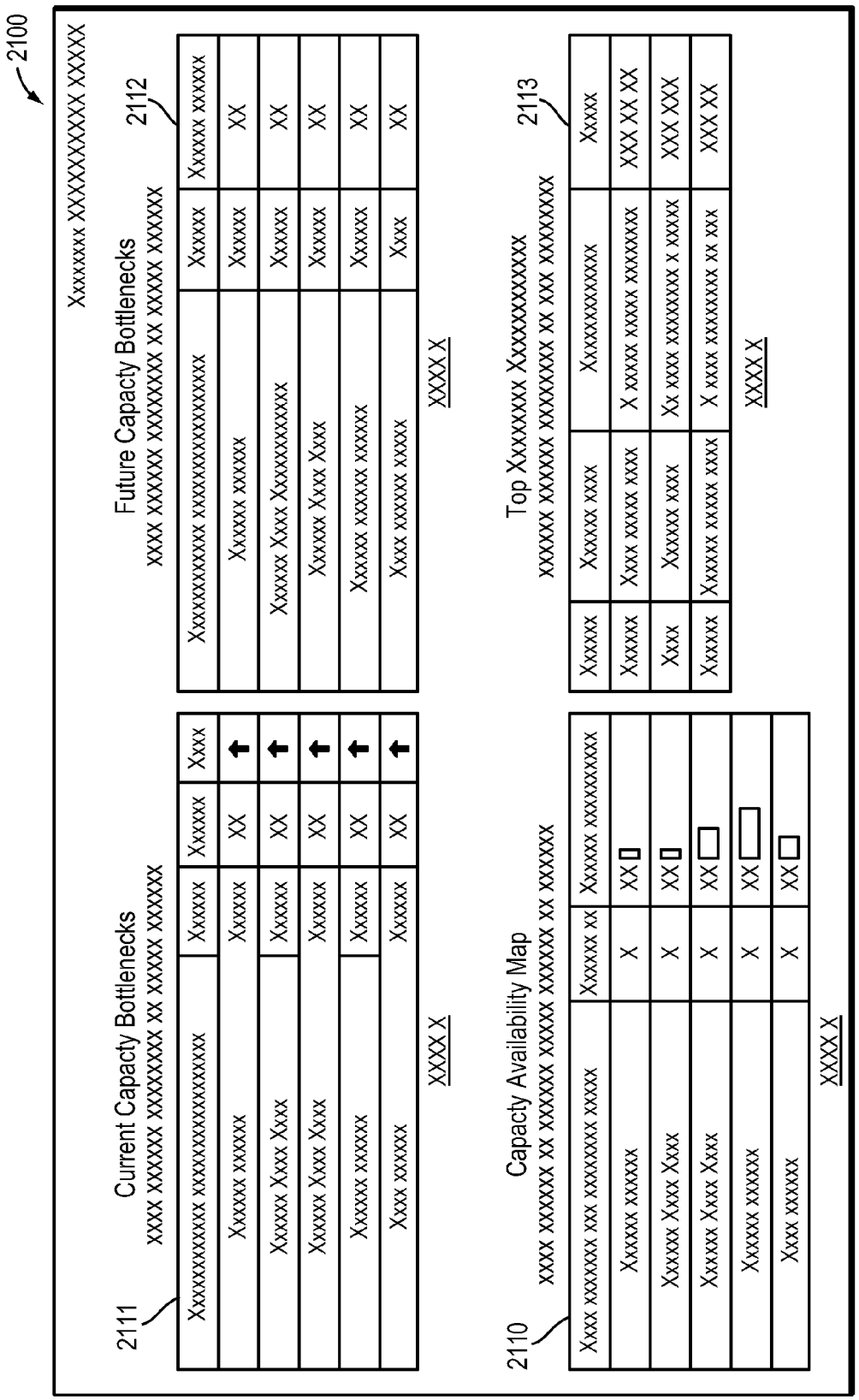
Figure 22:
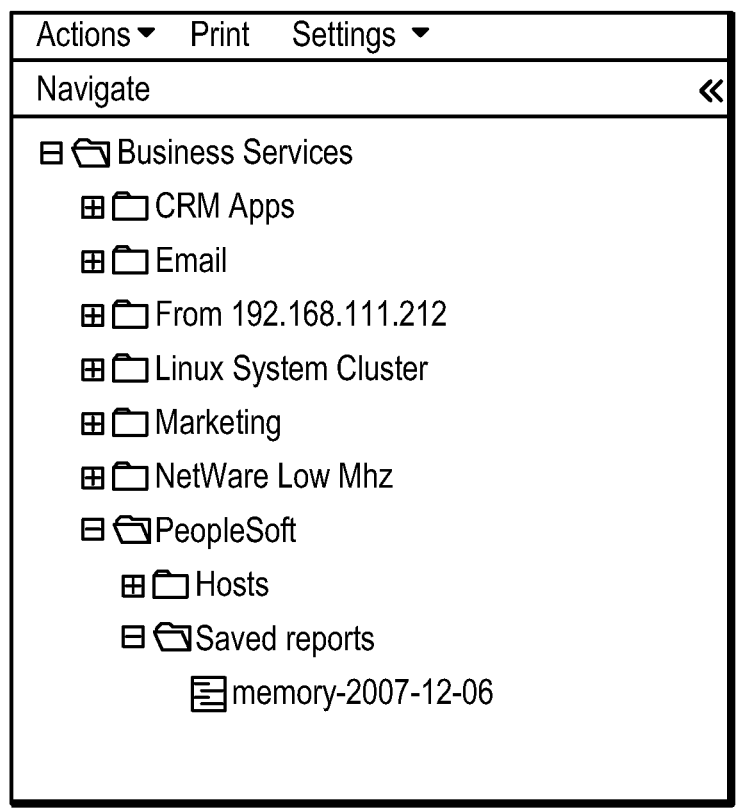
Figure 23:
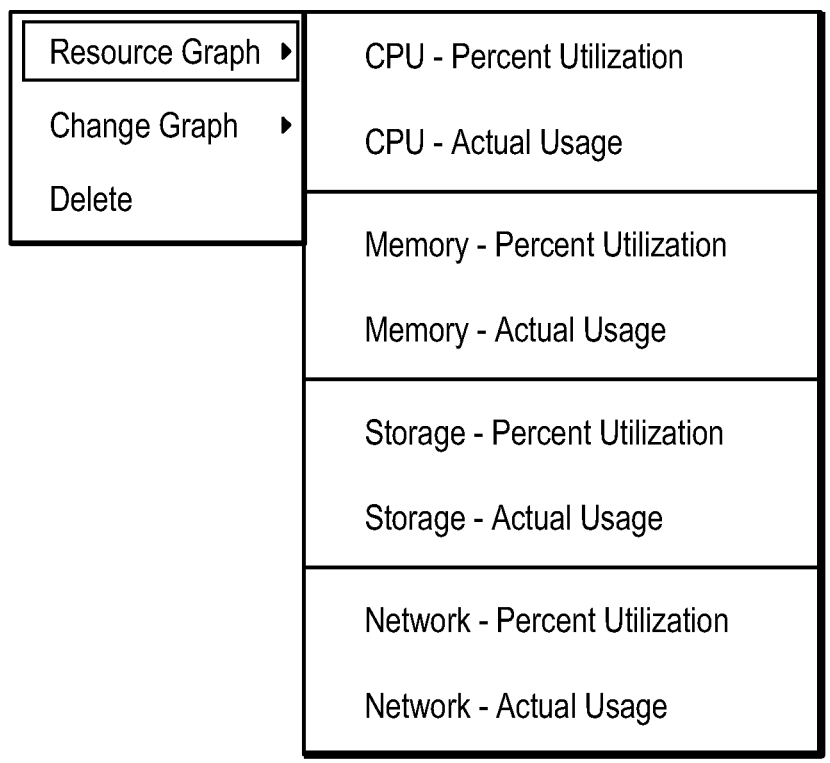
Figure 24:
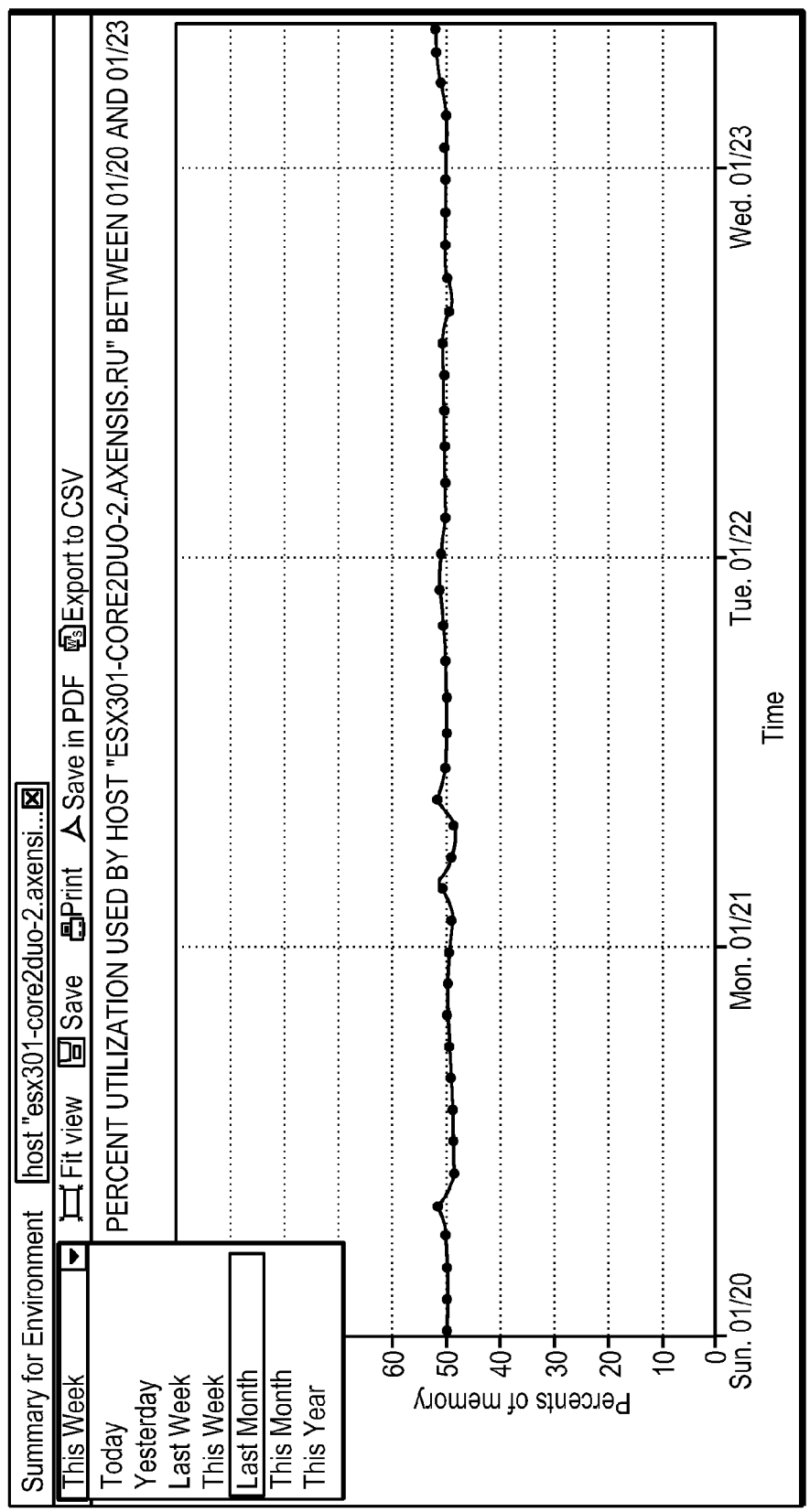
Figure 25:
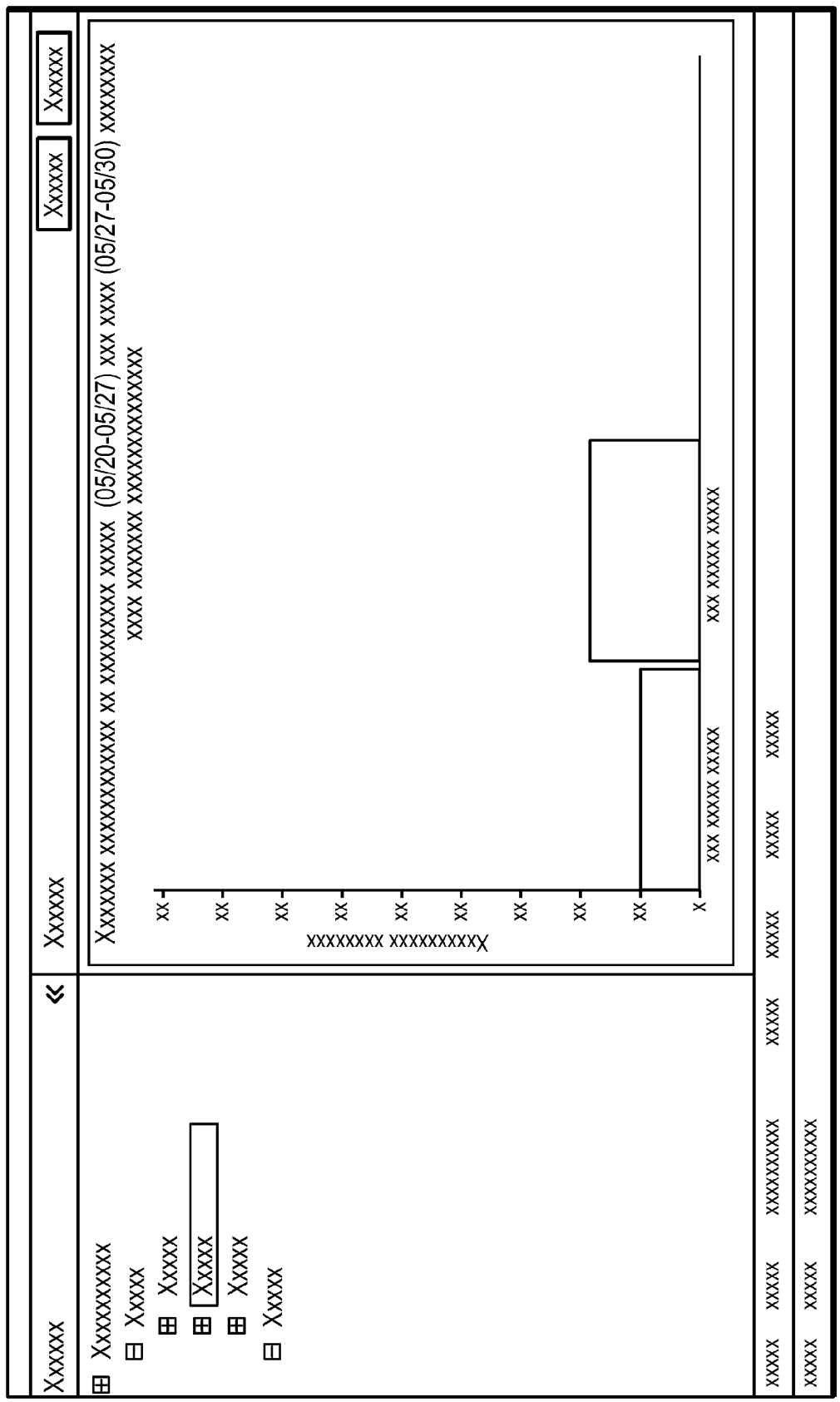
Figure 26:
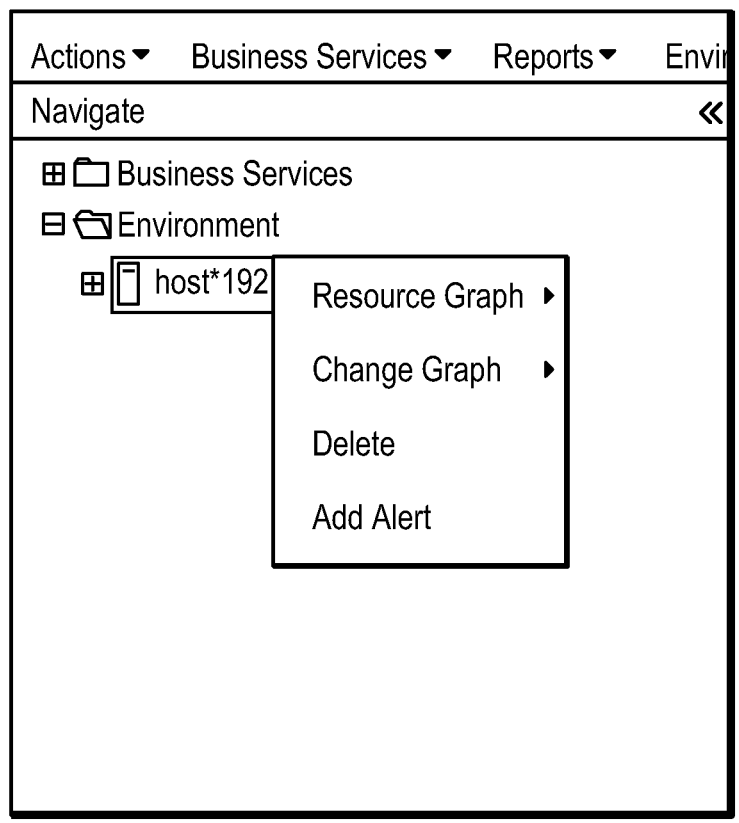
Figure 28:
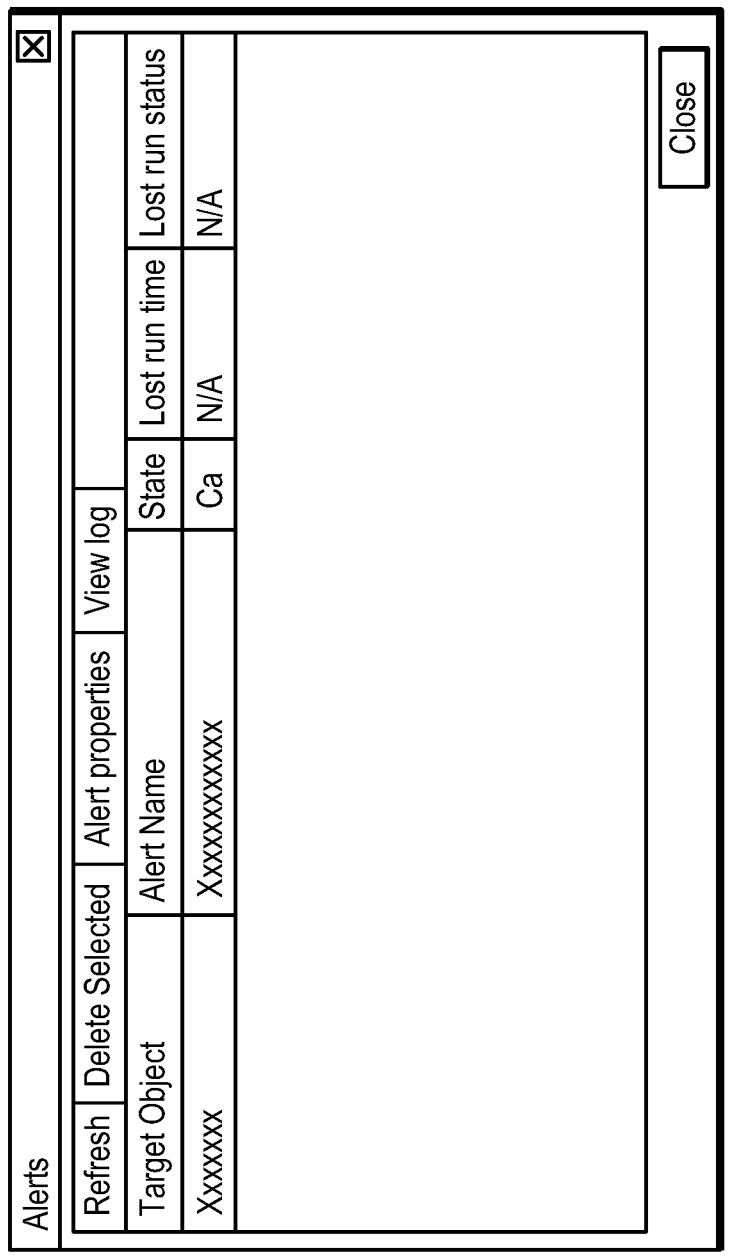
Figure 29:
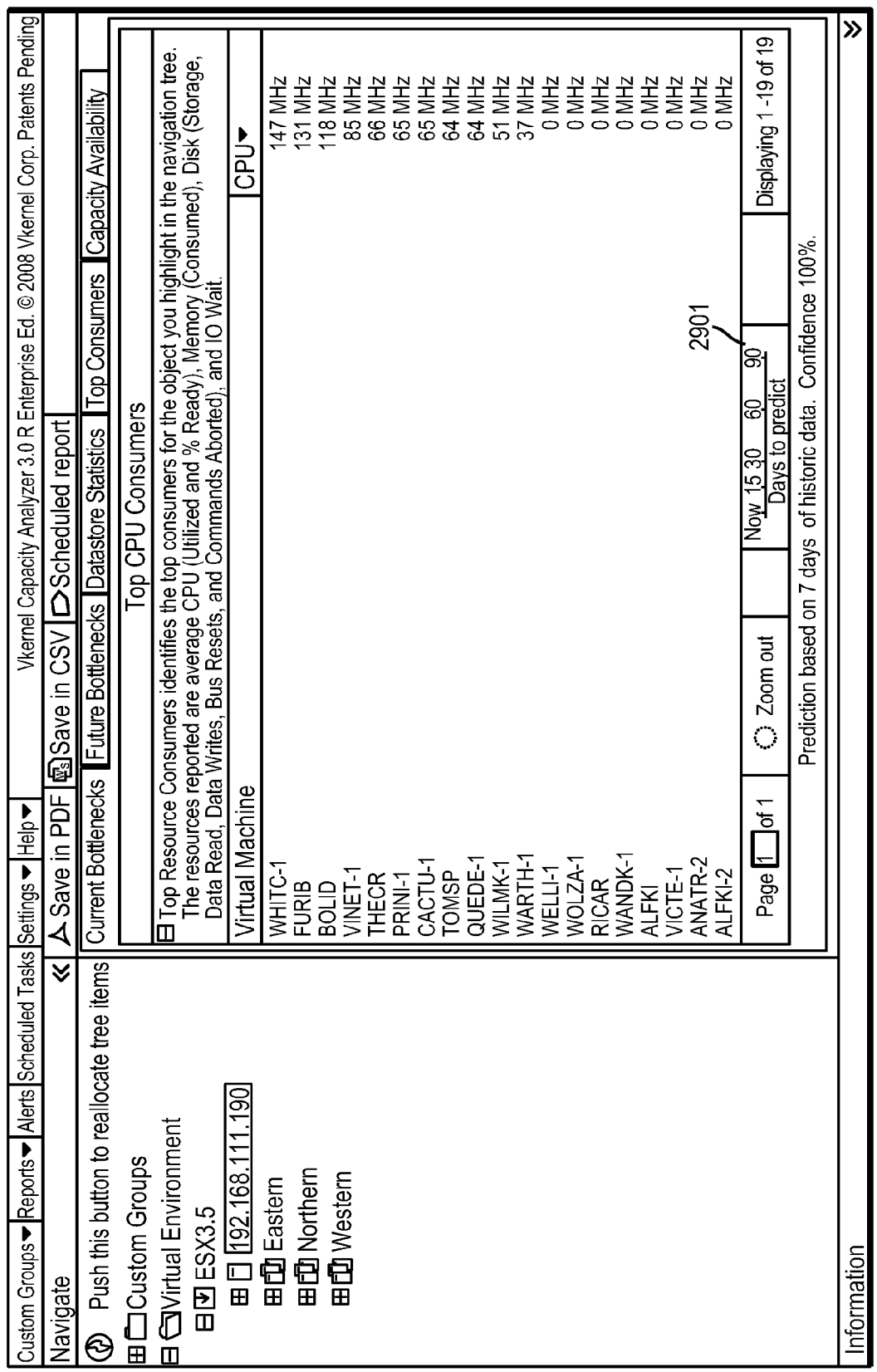
Figure 30:
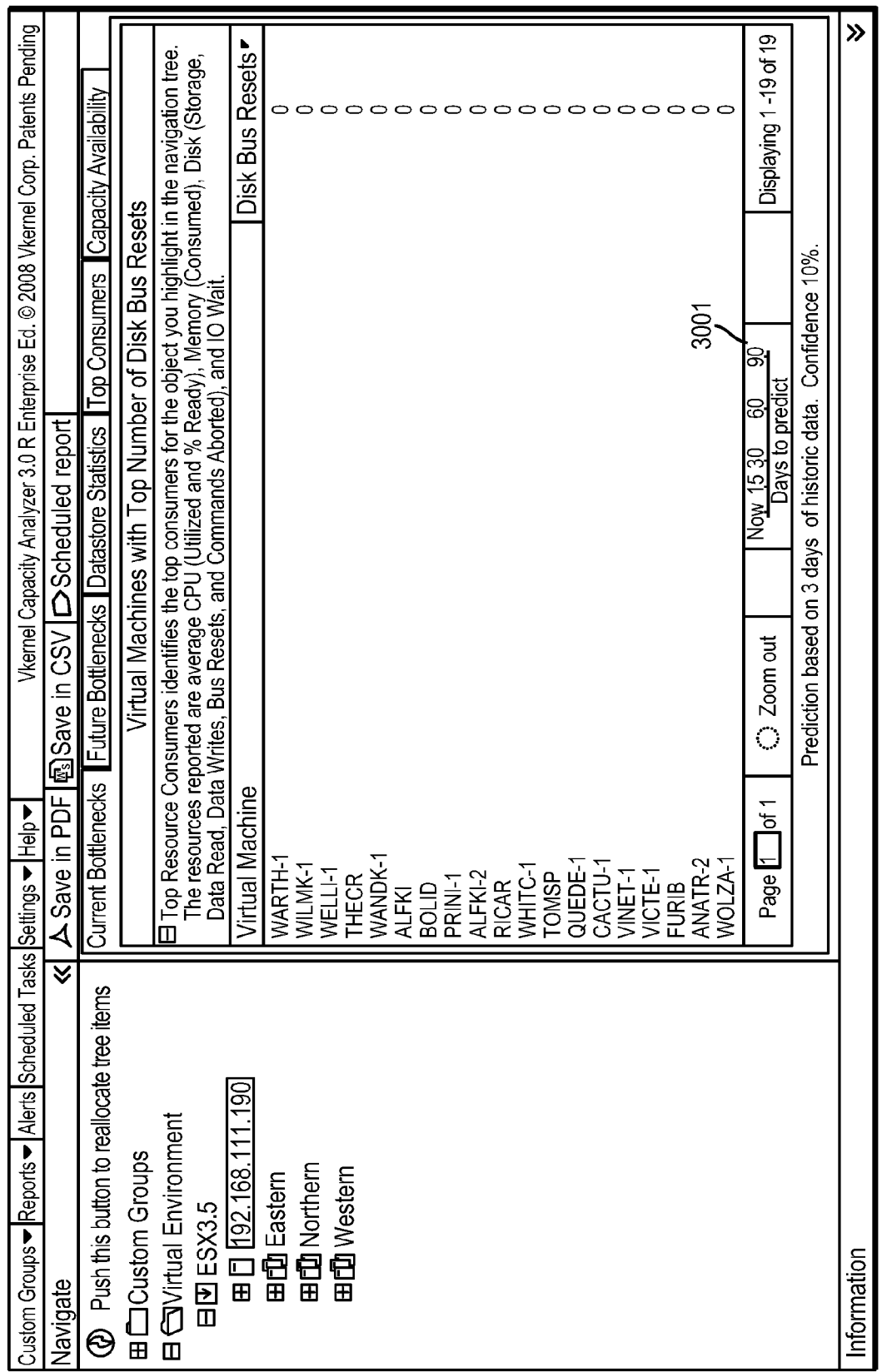
Figure 33:
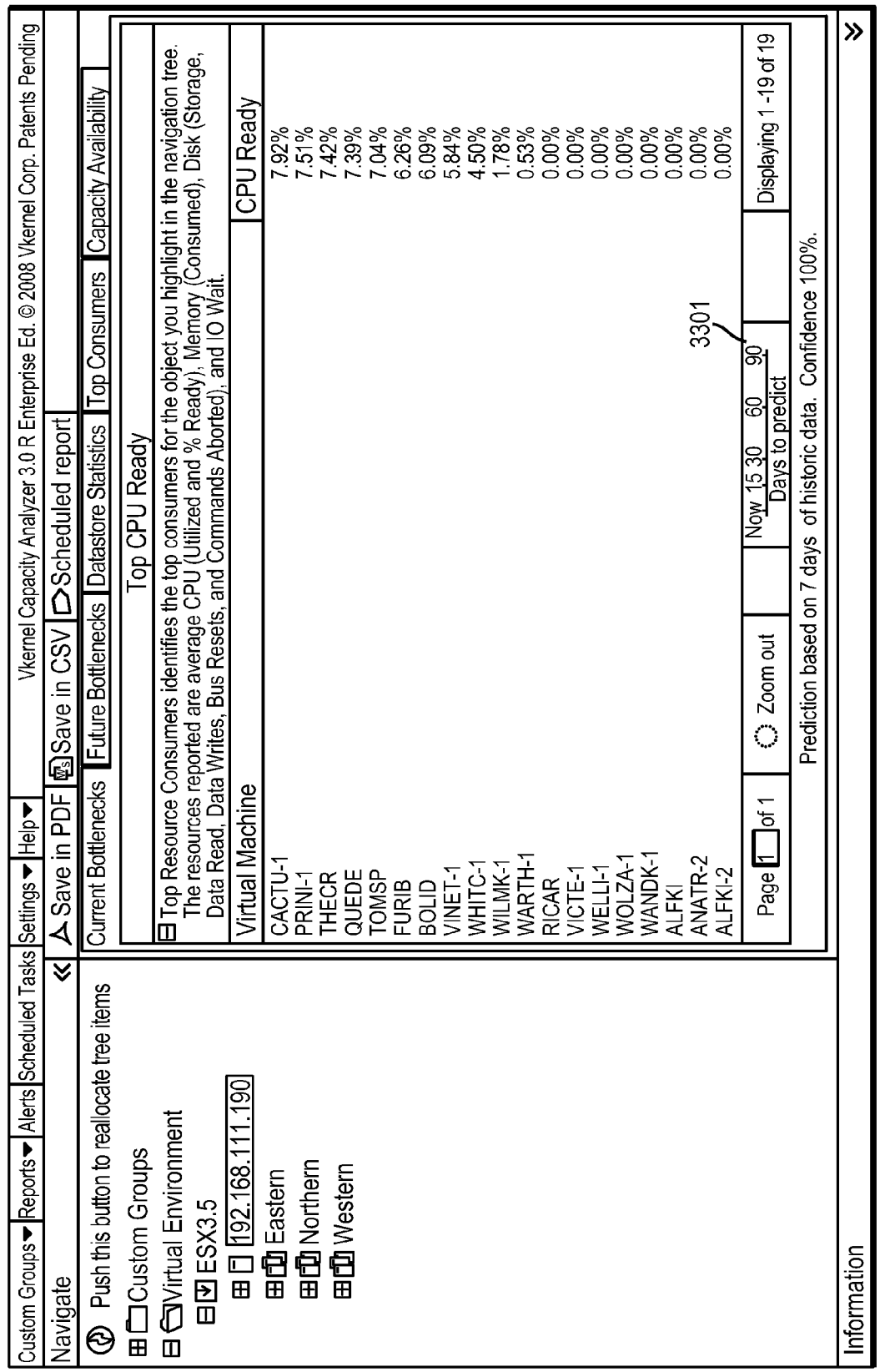
Figure 34:
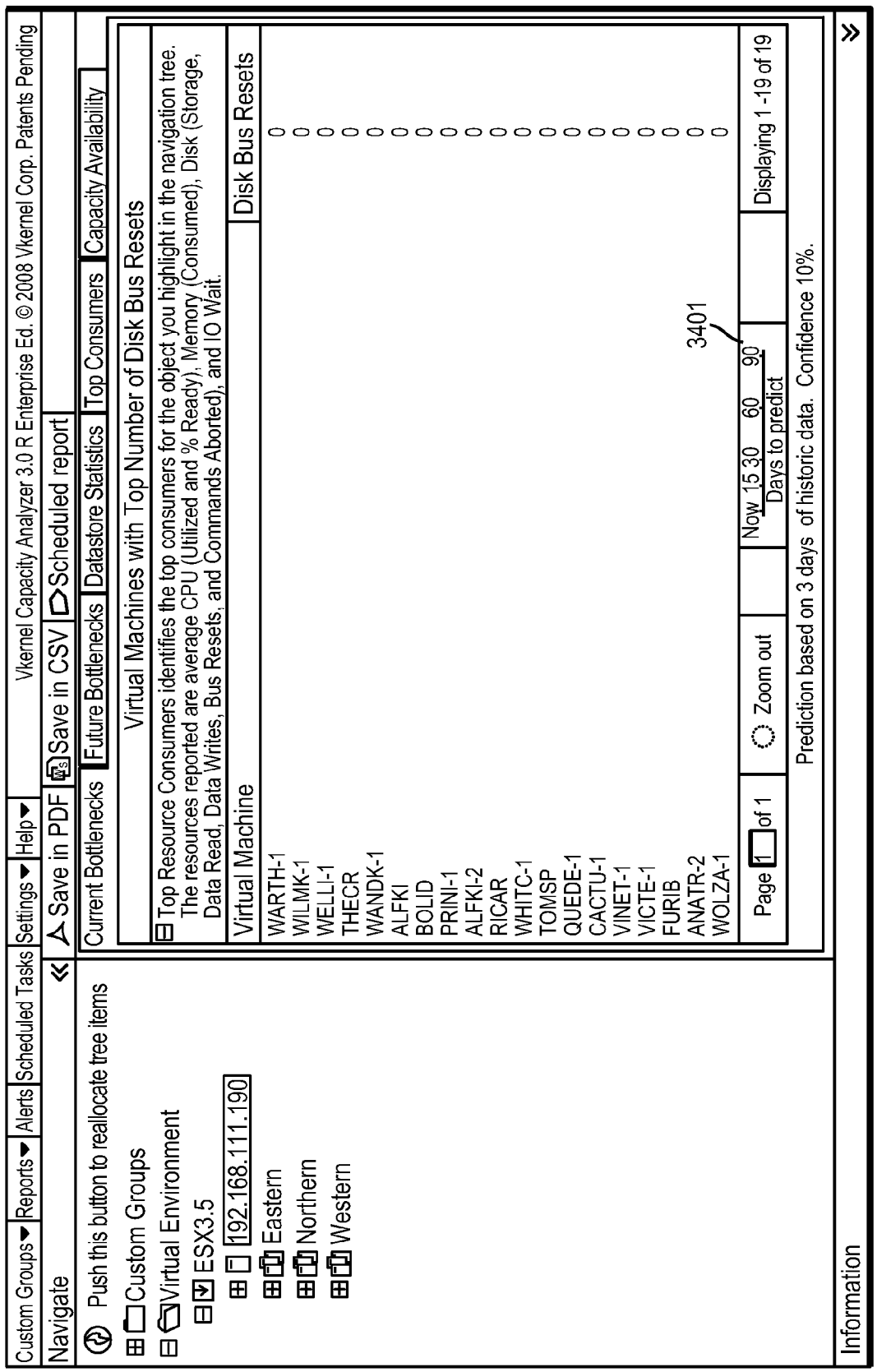
Figure 35:
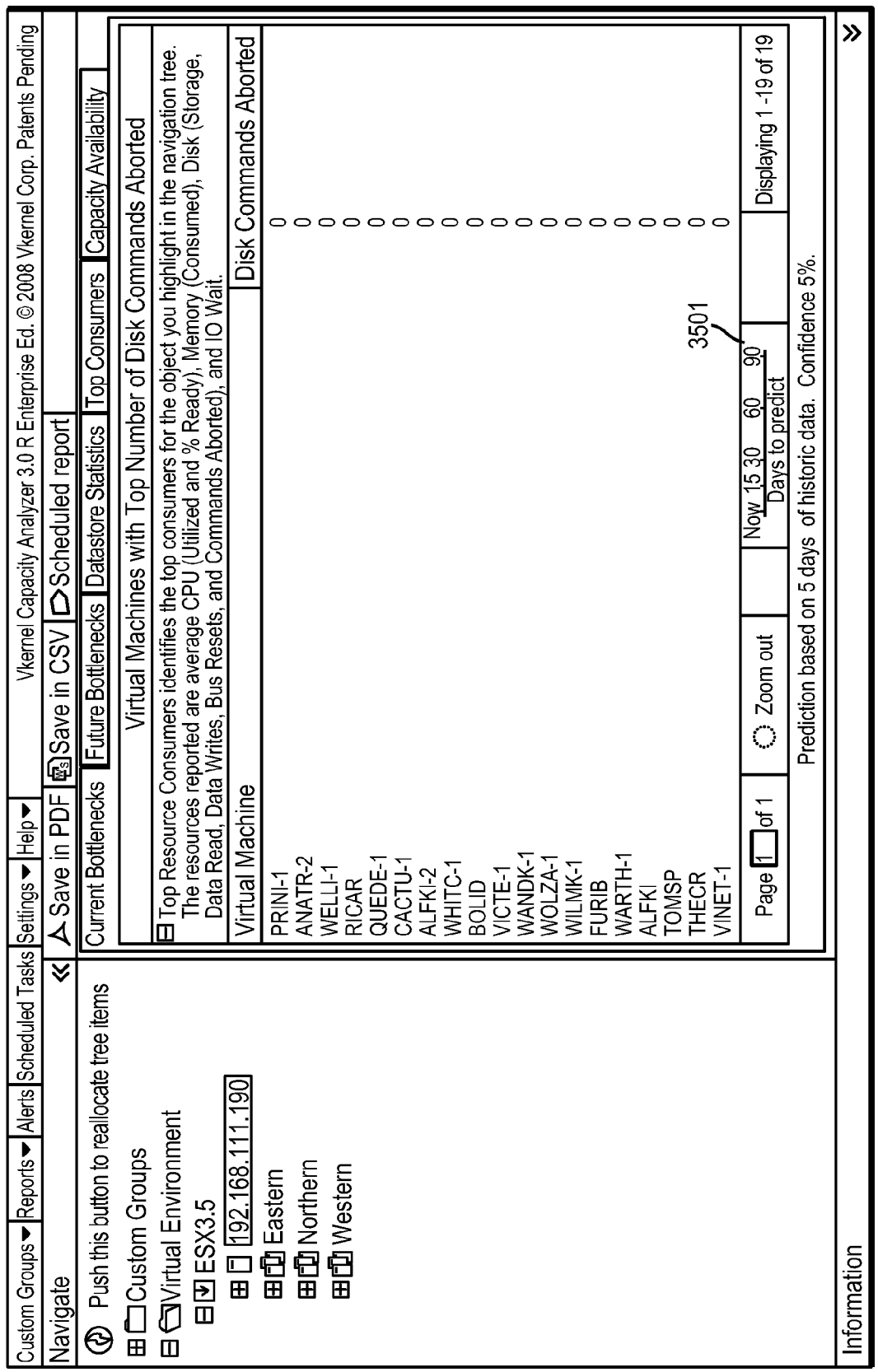
Figure 36:
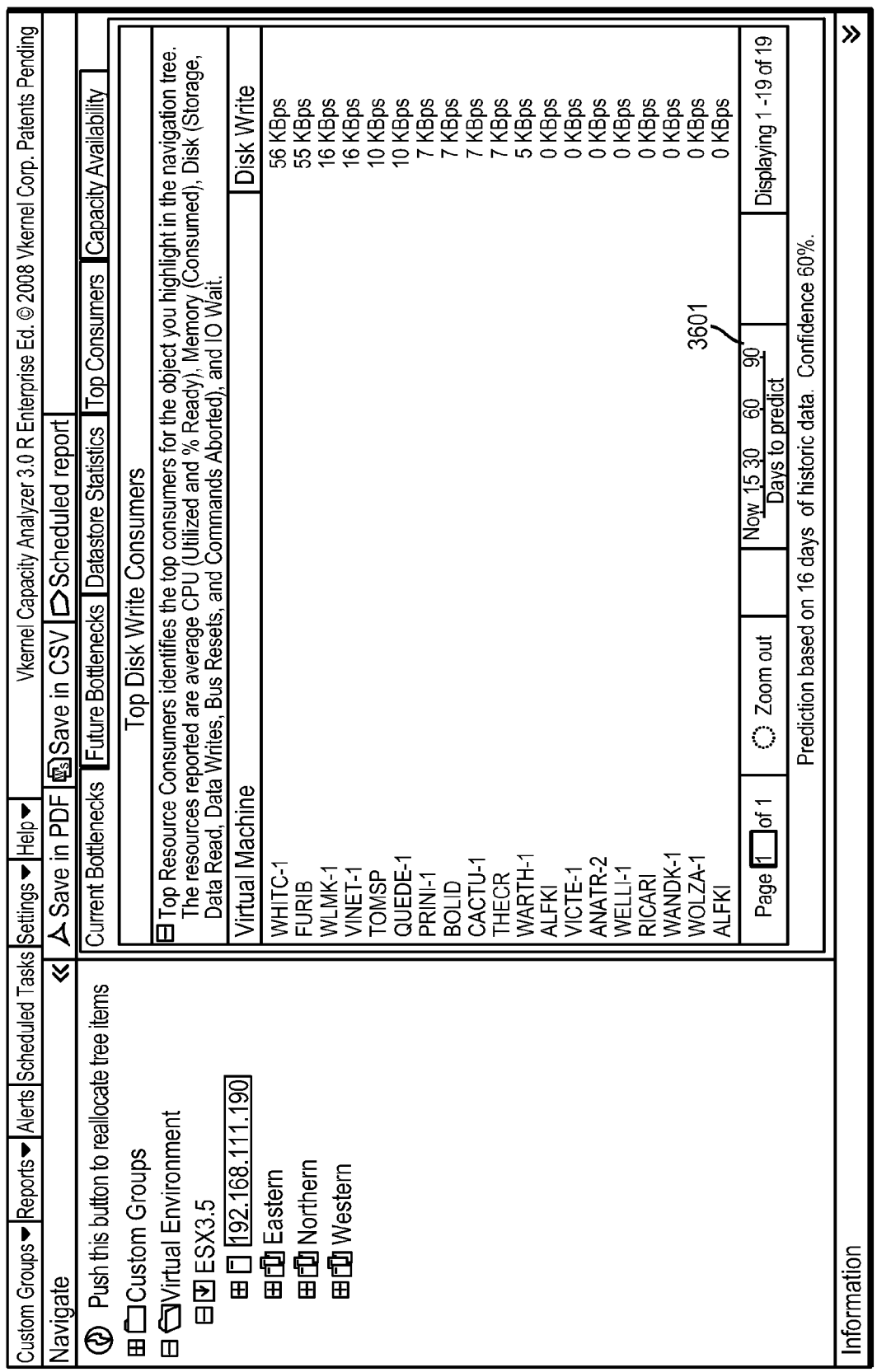
Figure 37:
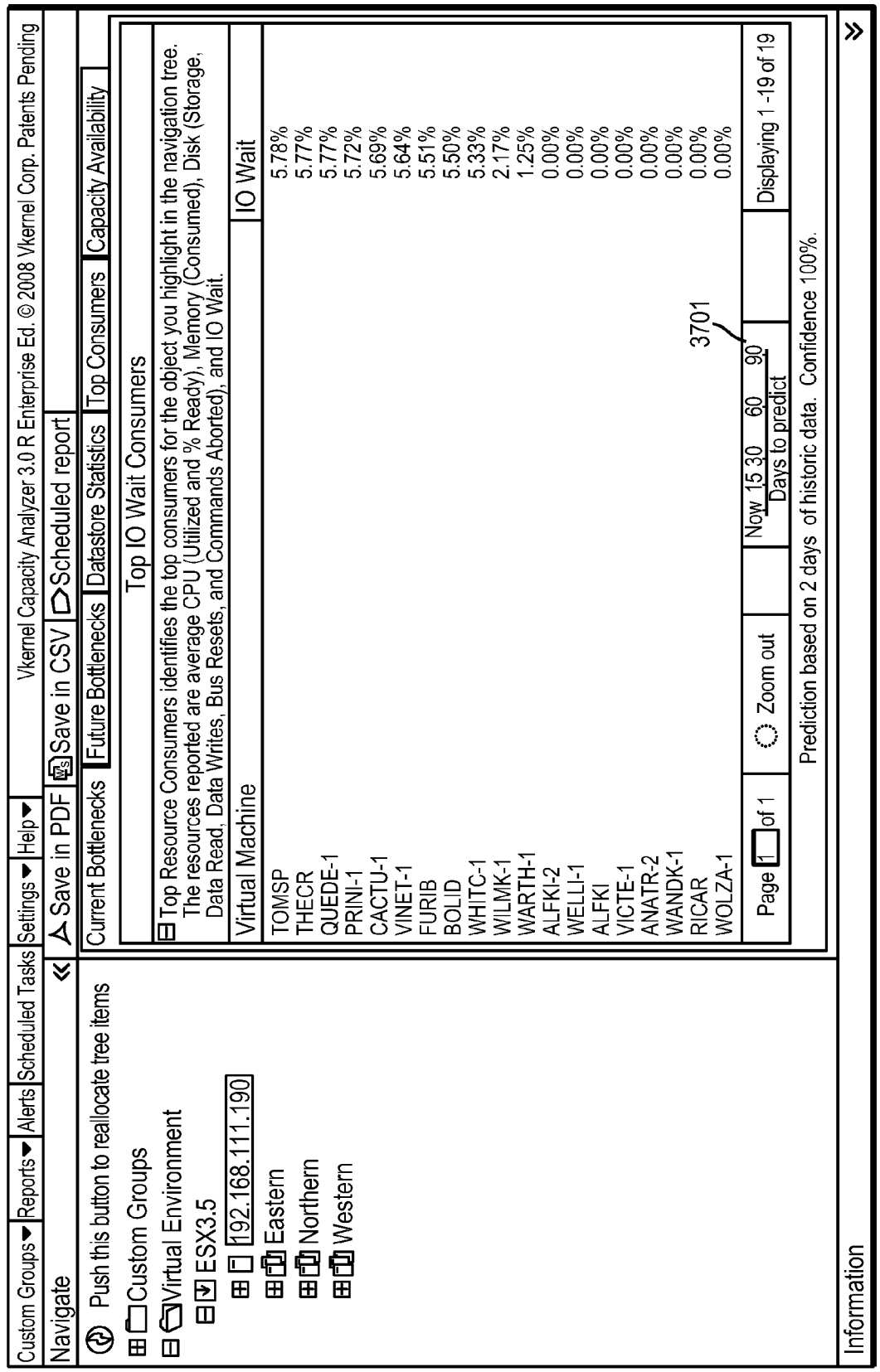
Figure 38:
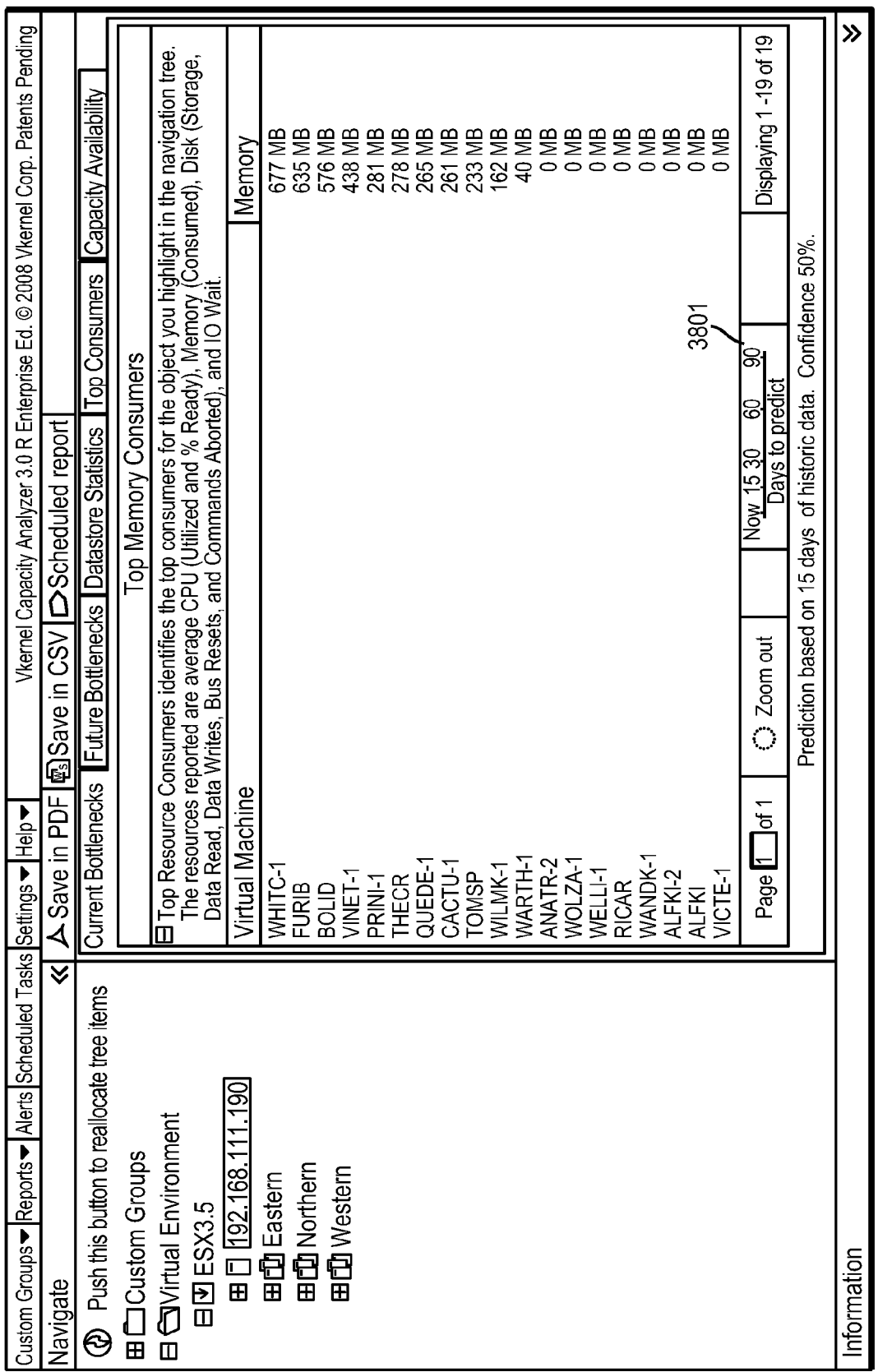

FIGS. 12 and 21 show implementations of the present invention provide the benefit of allowing a user to proactively examine various data points on a unique single-screen dashboard, continuously. By continuously monitoring shared capacity utilization trends a virtualized environment, implementations of the present invention can significantly reduce the time and cost of:

a. Identifying current capacity bottlenecks causing performance problems.
b. Predicting where future problems will occur and taking preventative action.
c. Calculating resources availability across host, clusters, and resource pools, so that it can be discerned, quickly and easily, exactly where to safely add new virtual machines.
d. Tracking the top resource consumers in a network.
e. Providing alerts when capacity utilization trends exceed thresholds.

Exemplary implementations of the present invention provide a method utilizing novel mathematic formulas for re-computing and re-displaying all of the data every few minutes, which provides the benefit of enterprise scalability. Implementations of the present invention provide means for:

Preventing current and potential future capacity problems.
Significantly lowering the risk of performance degradations and downtime events.
Maximize IT investment by reducing the cost per virtual machine.
Better manage and plan for a network environment (for example, a virtual environment), saving time and money.

Figure 39:
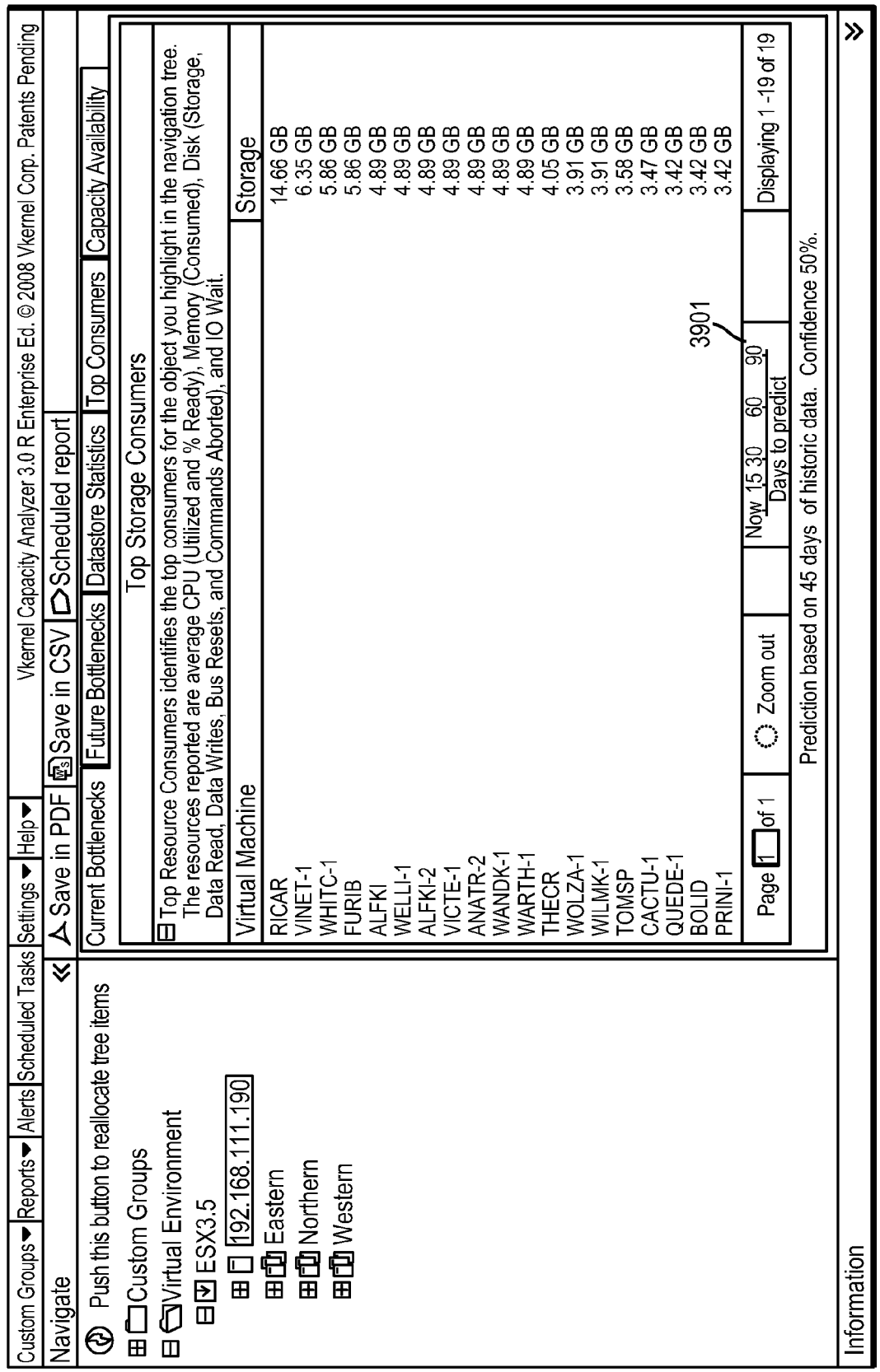

Exemplary embodiments of the present invention continuously monitor CPU, memory, storage I/O and disk I/O utilization and instantly identify problems in a virtual environment. Through a sing screen, implementations of the present invention provide critical resource utilization trending data to properly plan for growth, ensuring optimal performance, and lower the cost per virtual machine. Implementations of the present invention provide:

an easy to use single-screen management dashboard (show in FIGS. 12 and 21).
capacity availability maps showing how many more virtual machines can fit in a resource pool, to resolve capacity problems FIG. 31.
means to quickly understand the amount of total space and free space available in data-stores FIG. 39.
current capacity bottlenecks as shown in FIG. 12 (1201), where bottlenecks are color coded and sorted by severity 1200. A trend indicator can show if a problem is getting better or worse FIG. 1210.
future capacity bottlenecks as shown in FIG. 32 (3210)
immediate identification of what hosts, resource pools or clusters will run out of capacity next and predict the number of days before problems will occur FIG. 31 (3100).
tracking the top capacity consumers for identifying the biggest resource consumers in the environment FIGS. 29, 30 and 33-39.

Exemplary implementations of the present invention provide tools that facilitate capacity management and allocation of shared resources, as described in, for example, (1) "Vkernel Capacity Analyzer User Guide and Reference Architecture", Release 3.0, pages 1-51, and (2) "VKernel Capacity Bottleneck Analyzer User Guide and Reference Architecture", Release 2.0 (Beta), both by V-Kernel Corp., the entire disclosures of both are hereby incorporated by reference. Exemplary embodiments of the present invention implement certain features described in these references, and such features may not be further described in detail in the examples that follow, for clarity and conciseness.

Analyze Capacity

Figure 48:
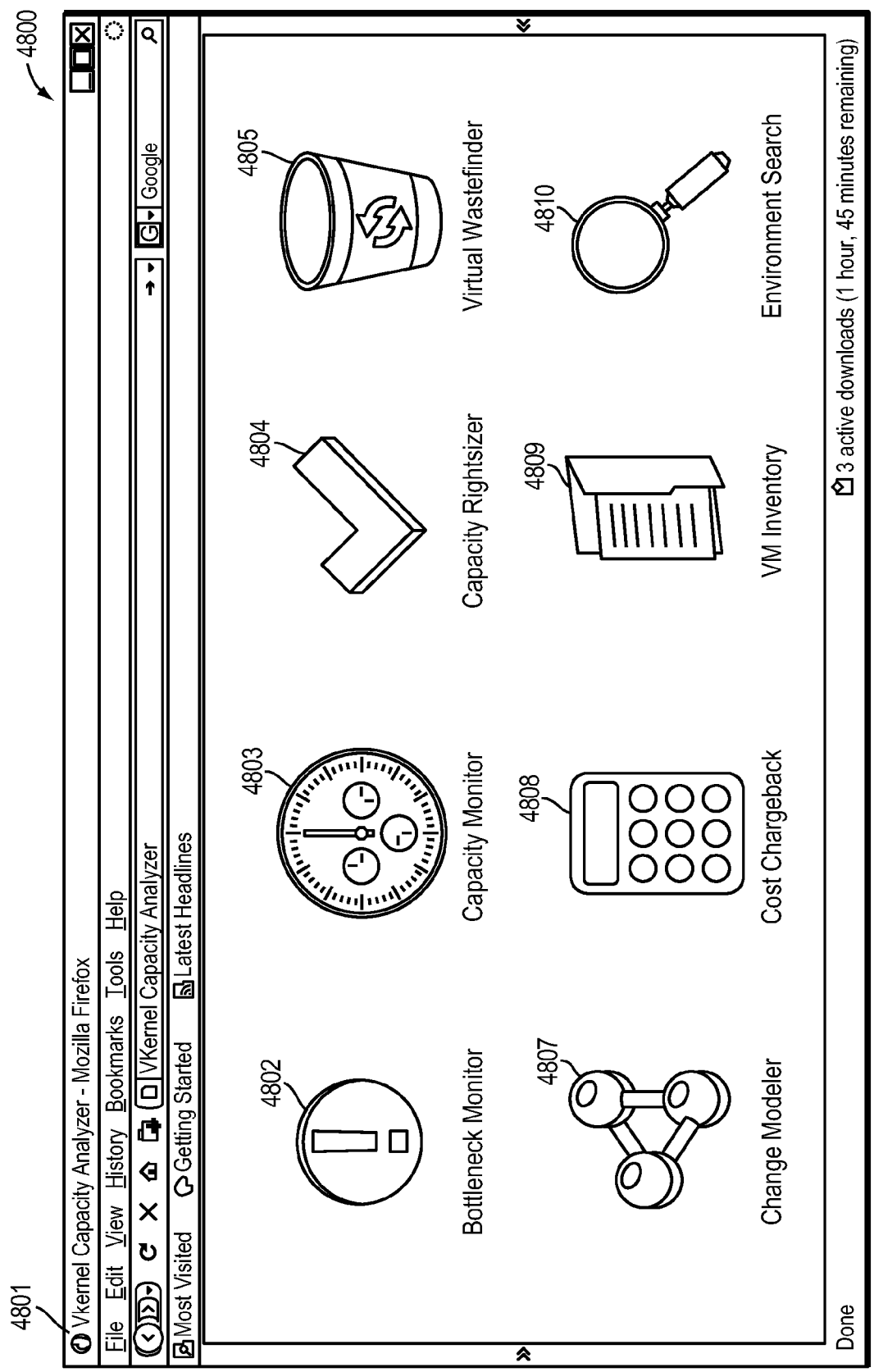

FIG. 48 shows an exemplary implementation of the present invention for providing a graphical user interface (for example a browser, window and/or a frame) 4800 providing a navigation tool 4801 that allows a user to analyze capacity (for example, resources) of VMs in a computer network. For example, FIG. 48 shows an implementation that provides capacity analysis context and functional objects across various functions for managing resources in a computer network (for example, VMs in a computer network). A user of the exemplary implementation can select one or more functions from the graphical user interface to further provide functionalities of each of the objects 4802-4810. According to an exemplary implementation, if a VM shows a bottleneck in the Bottleneck Monitor 4802 functional object, then the user switching to the Capacity Rightsizer function 4804 would allow the user to determine if the VM is sized appropriately (thus indicating that the bottleneck was caused by other outside influences). According to another exemplary implementation, if Capacity Rightsizer 4804 indicates that the VM should be given more resources, the user could determine if the lack of resources was causing a bottleneck by switching to the Bottleneck Monitor 4802 function. Details for the functions and applications shown in FIG. 48 are provided below.

Capacity Bottlenecks

Exemplary embodiments of the present invention provide a method for calculating and detecting current (FIG. 12) and future capacity (FIG. 32) bottlenecks (Fig. UMP1) in a virtualized environment.

Conventional systems for determining capacity problems are very labor intensive, because it requires physical examination of numerous capacity graphs before being able to take steps to resolve the problems. IT organizations consolidate physical servers into a smaller set of physical servers running many virtual servers. In this environment, hardware resources like memory, CPU, storage and network are shared among all servers. If the shared resources get depleted, users will experience performance problems such as resource degradation and downtime. For example, staff in an IT organization (such as a System Administrators) must examine many graphs to determine where bottlenecks exist. Even using capacity reporting software is extremely time consuming and requires examination of hundreds of charts. For example, a small environment with only 50 resource hosts. A systems administrator would have to look at 260 graphs (50 Hosts+5 clusters+10 Resource Pools)*4 Resource types=260 graphs.

To visually determine where capacity bottlenecks exist today, it would be very helpful to be able to quickly determine where capacity bottlenecks are developing before they actually develop and quickly take steps to resolve them. Exemplary implementations of the present invention provide a method, system and apparatus that automates the process further by producing a list of capacity bottlenecks.

For example, in order to find capacity bottlenecks in memory 228 and CPU 227, an exemplary implementation of the present invention can take the following approach to find the capacity bottleneck in memory and CPU:

1. Get capacity statistics about all powered on virtual machines (VMs) belong to selected host, cluster or a resource pool at the moment (n—amount of VMs).
2. Determine the amount of available data up to the maximum of 24 hours.
3. The period is split to m sub-periods S where m<=24 and size of S(k)>=5 minutes, k=1 . . . m)
4. Get data $P_{ik}$ for each Vm for that periods (i=1 . . . n, k=1 . . . m)
5. Figure out total usage $U_k$ for each period S.

$$U_k = \sum_{i=1}^{n} P_{ik}$$

6. Get limit L for selected object (where if any limits of the object was not set, get the limit from the parent object).
7. Figure out Average Utilization (A)

$$A = \frac{\sum_{k=1}^{m} U_k}{m} * 100$$

8. Compare A with thresholds and fill up with suitable color.
9. To find out Trend, create interpolation function (using the least squares method for both extrapolation and interpolation) I for U
   If I(S(1))<I(S(m))—rising tendency
   If I(S(1))>I(S(m))—falling tendency
   If I(S(1))=I(S(m))—straight line An exemplary implementation of the present invention can take the following approach to find the Current Capacity Bottlenecks detection in Storage:

1. Get all LUNs assigned to selected object directly (for hosts) and indirectly (for Clusters/ResourcePools)(n—amount of LUNs).
2. Find out period for what there is data for all the LUNs but not larger than 24 hours.
3. Get usage space values ($P_{ij}$) for these LUNs for the period (i=1 . . . n, j=1 . . . F(i), F(k)—amount of changes for k-LUN for the period) (storing only changes for storage).
4. Figure out Average Usage ($A_i$) for each LUN.

$$A_i = \frac{\sum_{j=1}^{F(i)} P_{ij}}{F(i)}$$

5. Get limits ($L_i$) for each LUN (if any limits for the object was not set, get the limit from the parent object recursivelypostra).
6. Figure out Total Utilization (U) for selected object as the following $$U = \frac{\sum_{i=1}^{n} A_i}{\sum_{i=1}^{n} L_i} * 100$$

7. Compare U with thresholds and fill up with suitable color.
8. To find out Trend, create interpolation functions $I_i$ from $A_i$ for each LUNs, use start point s and end point e of the period from point 2
   If $\Sigma I_i(s) < \Sigma I_i(e)$—rising tendency
   If $\Sigma I_i(s) > \Sigma I_i(e)$—falling tendency
   If $\Sigma I_i(s) = \Sigma I_i(e)$—straight line Predicting Future Capacity Bottlenecks (CPU/Memory)

FIG. 21 shows an exemplary implementations of the present invention provide for predicting future capacity bottlenecks related to various resources on a computer network 3201 (for example, for CPU and memory in a virtual environment). Organizations are reducing the number of physical servers through virtualization technologies. For example, virtual servers allow for multiple virtual servers to run on one or more physical servers (see Fig VM3). With consolidation of servers capacity bottlenecks can develop when sharing CPU, RAM, storage and I/O. Exemplary implementations of the present invention provide a method, system and apparatus for predicting future capacity bottlenecks in CPU and memory, according to the following process:

1. Collect performance statistics for all Virtual Machines that belong or belonged to selected host, cluster, resource pool or other VM groups for last 30 days (n—amount of Vms).
2. Find Virtual Machines with performance statistics available, but use not more than the last 30 days of data.
3. Split the data into periods. The period is split to m sub-periods S where m<=30 and size of S(k)>=5 minutes, k=1 . . . m).
4. Each periods S(k) can be separated to sub-periods T($C_k$(j)) if composition $C_k$(j) of Vms were changed during S(k) (j=1 . . . M(k), M(k)—amount of compositions for k-period, Z($C_k$(j))—amount of Vms for composition $C_k$(j)).
5. Figure out your total usage for all Vms from composition $C_k$(j) for period T($C_k$(j)) as the following:

$$P_{C_k}(j) = \sum_{i=1}^{Z(C_k(j))} P_i(C_k(j), T(C_k(j))), \text{ where}$$

$P_i(C_k(j), T(C_k(j)))$—average usage i-Vm from composition $C_k$(j) for T($C_k$(j)) period
6. Figure out Total Resource Usage ($U_k$) for each period of S $$U_k = \frac{\sum_{j=1}^{M(k)} P_{C_k}(j) * T(C_k(j))}{\sum_{j=1}^{M(k)} T(C_k(j))}$$

7. Create extrapolation function I from U
8. Get limit L for selected object

9. Using I find out $U_p \geq L*T$ where $p=(m+1) \ldots (m+d)$, d—maximum prediction in days, by default d=30. If $U_p$ was find, show (p-m) as prediction days when the resource archive threshold T. In certain implementation, T is a next threshold for the resource of selected object. Next threshold depends from current usage (current threshold). There are 3 zone (green->yellow->red). For example if you now in green zone, next threshold is yellow border, if you in yellow zone, next threshold is red border Predicting Future Capacity Bottlenecks in Storage FIG. 32 shows an exemplary implementations of the present invention provide a method, system and apparatus for predicting future capacity bottlenecks in storage, according to the following process:

1. Get all LUNs assigned to selected object directly (for hosts) and indirectly (for Clusters/ResourcePools) (n—amount of LUNs).
2. For each LUN gets usage space values $U_i$ for the last 30 days (only changes for storage are stored).
3. Create interpolation functions $I_i$ from $U_i$ for each LUNs
4. Figure out $A_s$ and $A_e$ for LUNs by using start point s (s—the oldest date when there is data even though for one LUN) and end point e (now) as the following:

$$A_s = \sum_{i=1}^{n} I_i(s), A_e = \sum_{i=1}^{n} I_i(e)$$

5 Create extrapolation function E from $A_s$ and $A_e$
6. Get limits ($L_i$) for each LUN and figure out total limit $M = \Sigma L_i$
7. Using E find out $U_p \geq L*T$ where $p=(m+1) \ldots (m+d)$, d—maximum prediction in days, by default d=30. If $U_p$ was find, show (p-m) as prediction days when the resource archive threshold T.

Capacity Availability Map

Organizations are reducing the number of physical servers through virtualization technologies which allow for multiple virtual servers to run on one or more physical servers. With consolidation of servers, capacity bottlenecks will develop in sharing CPU, RAM, and Storage. FIG. 32 shows an exemplary implementation of the present invention that provides a method, system and apparatus to allow for determining the number of virtual machines that can be added to a physical host, a cluster or a resource pools.

An exemplary implementation of the present invention first determines the size of a typical virtual machine in a given host, cluster or resource pool, and then figures out which resource (CPU, Memory and Storage) will become the first constraint. The first constraint serves as the limiting factor in how many more virtual machines can "fit" in a physical host, a cluster or a resource pool.

FIG. 31 shows an exemplary implementation of the present invention comprising a GUI illustrating a capacity availability map listing all hosts, clusters or resource pools with the most available capacity, ordered by availability. The available VM capacity identifies VMs that can run on that particular object before hitting the threshold level. The GUI of FIG. 31 can also help identify underutilized systems. The number of additional VMs can be calculated by taking the average VM utilization (CPU, memory, storage) on a host, cluster or resource pool, checking the remaining resources on the object, and determining the most limiting resource. This can impact high availability ("HA") failover in current and future capacity analysis and recommendations. Additionally, if HA is enabled for a particular resource, we can use the maximum value for each resource type (CPU, memory, storage) to calculate the number of additional VMs. Also, the number of additional VMs may also be calculated. According to certain exemplary implementations, on clusters with HA enabled, the resource for the largest host is eliminated, thus allowing for a failure of one of the hosts. Further, according to an exemplary implementation, if there are three hosts in a cluster, and one of the hosts has 16 GB of memory, another host has 12 GB of memory and the third host has 8 GB of memory, then exemplary implementations of the present invention would use 20 GB as the maximum available memory and thereafter, subtract the maximum memory utilization of each VM to see how much memory is available for new VMs. According to an alternative implementation, on clusters without HA enabled, exemplary implementations of the present invention would use the total resources available (for example, 36 GB), and use the average memory utilization of each VM to see how much memory is available for new VMs.

Exemplary implementations of the present invention provide a method, system and apparatus for mapping capacity availability for CPU and memory, according to the following process:

1. Get performance statistics for all Vms that belong to selected host, resource pool or cluster (n—amount of Vms).
2. Figure out the size of average virtual machine (VM) AVM based on Vms from point 1 (average Vm is hypothetical Vm what consume average value of CPU/Memory).
3. Get current utilization U of selected object and its limits L.
4. Figure out how many more virtual machines (VMs) F can be added to not to exceed limit L with threshold T (T percentage values represent threshold).

$$F = \frac{\left(\frac{L*T}{100} - U\right)}{AVM}$$

If the numerator is less than zero, result should be interpreted as zero ($F_j=0$)

Exemplary implementations of the present invention provide a method, system and apparatus for mapping capacity availability for determining the constrain in storage, according to the following process:

1. Get all LUNs assigned to selected object directly (for hosts) and indirectly (for Clusters/ResourcePools) (n—amount of LUNs).
2. Get all Vms on the LUNs (m—amount of Vms)
3. Figure out average Vm AVM based on Vms from point 2 (average Vm is hypothetical Vm what allocate average amount of space).
4. Figure out free space L for all LUNs.
5. Figure out how many Vms F can be added more to not to exceed limit L with threshold T (T multitude of percentage values represent threshold).

$$F = \frac{\left(\frac{L*T}{100}\right)}{AVM}$$

Predictive Vmotion

An exemplary implementation to the present invention provides a method, system and apparatus, in a virtualized environment, to migrate a virtual machine (VM) from one physical host. Certain exemplary implementations can be couple the migration with predictive analysis, which can provide the benefit of enabling system administrators to know where in the future performance bottlenecks will develop. In order to avoid the performance bottlenecks that can be burden the environment, system administrators can utilize implementations of the present invention to see and avoid problems proactively.

According to exemplary implementations of the present invention, Predictive Vmotion functions as the following:
1. Predictive monitoring—constantly analyze performance and capacity metrics in a dynamic data center in the virtual environment.
2. Predict bottlenecks—predict where bottlenecks will develop in:
   A. hosts
   B. virtual machines
   C. Resource pools
   D. Clusters
3. Display—display a table showing all virtual machines, hosts, resource pools and clusters where bottlenecks will develop unless a change is made.
4. Migration—system administrators can move a virtual machine to another host manually or automatically using rules (policy-based management). In either case, certain implementations of the present invention will migrate virtual machines to another physical host.

Predictive Distributed Resource Scheduler (DRS)

According to exemplary implementations of the present invention, a predictive distributed resource scheduler provides for utilizing Predictive Vmotion to change the host where a virtual machine is being executed. When a particular host in a cluster is getting constrained (for example, memory or CPU), implementations of the present invention predict future performance bottlenecks and proactively, ahead of the performance problems, rebalance the virtual environment by migrating virtual machines from the constraining hosts to hosts where more resources are available or a lesser utilized host.

According to exemplary implementations of the present invention, Predictive DRS functions as the following:
1. Analyze and predict when in the future bottlenecks will develop and what VMs would be impacted.
2. Resolve problem—attempt to resolve the future bottleneck problem by performing at least one of (a) notifying administrators of impending problems, and (b) initiating migration the virtual machine from the constrained hosts.
3. Migrating the virtual machines.
4. repeating this process continuously until termination.

Figure 4:
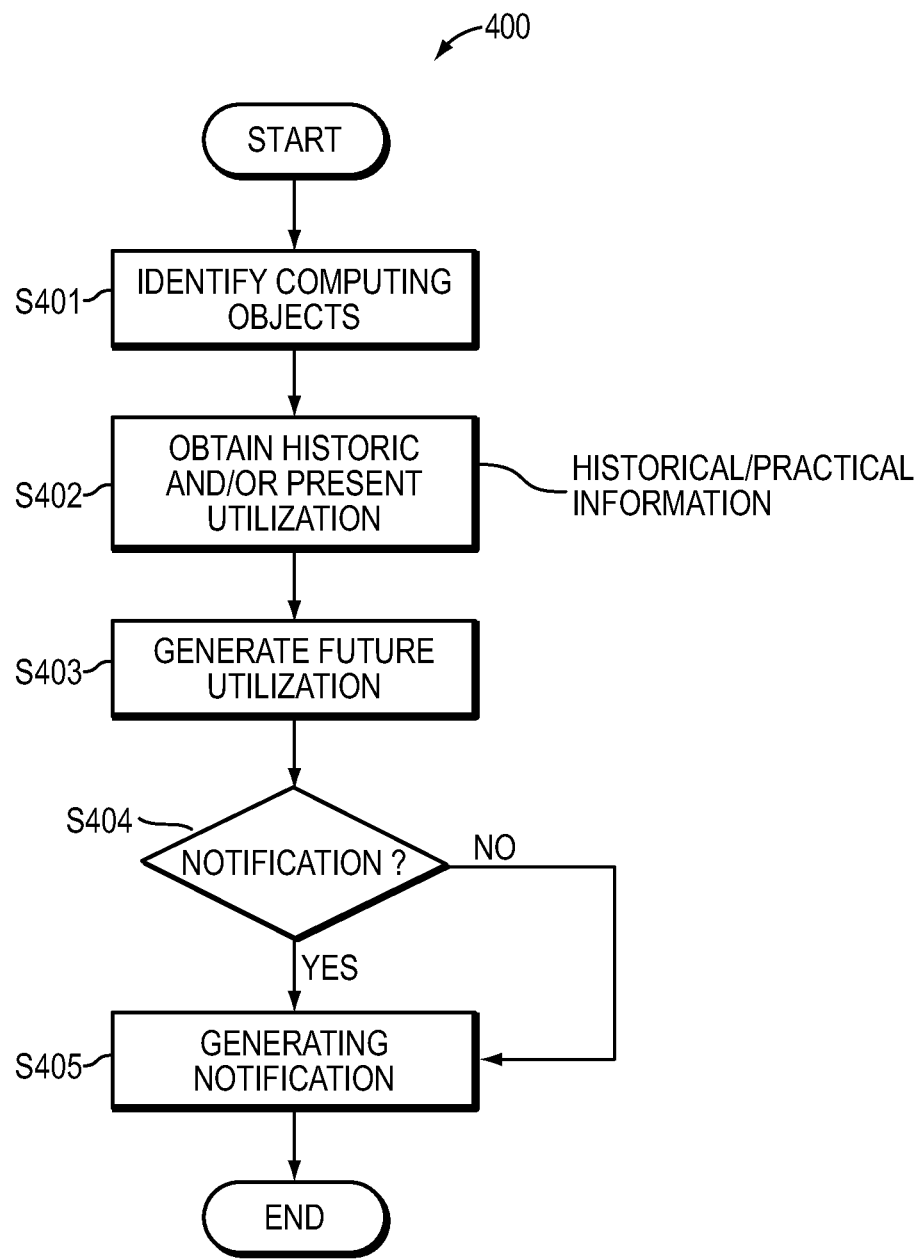

FIG. 4 shows an exemplary embodiment of the present invention that provides a method for predicting future utilization information of resources on a computer network 400, the method comprising, identifying at least one computing object utilizing resources on a computer network S401, obtaining first data indicative of at least one of current and historical utilization of the resources by the at least one computing object S402, and generating second data indicative of future utilization of the resources by the at least one computing object based on the first data S403, wherein the method is computer implemented. Additionally, exemplary implementations of the present invention provide a method for selectively S405 generating a notification indicative of future utilization based on at least one criteria S405.

Figure 5:
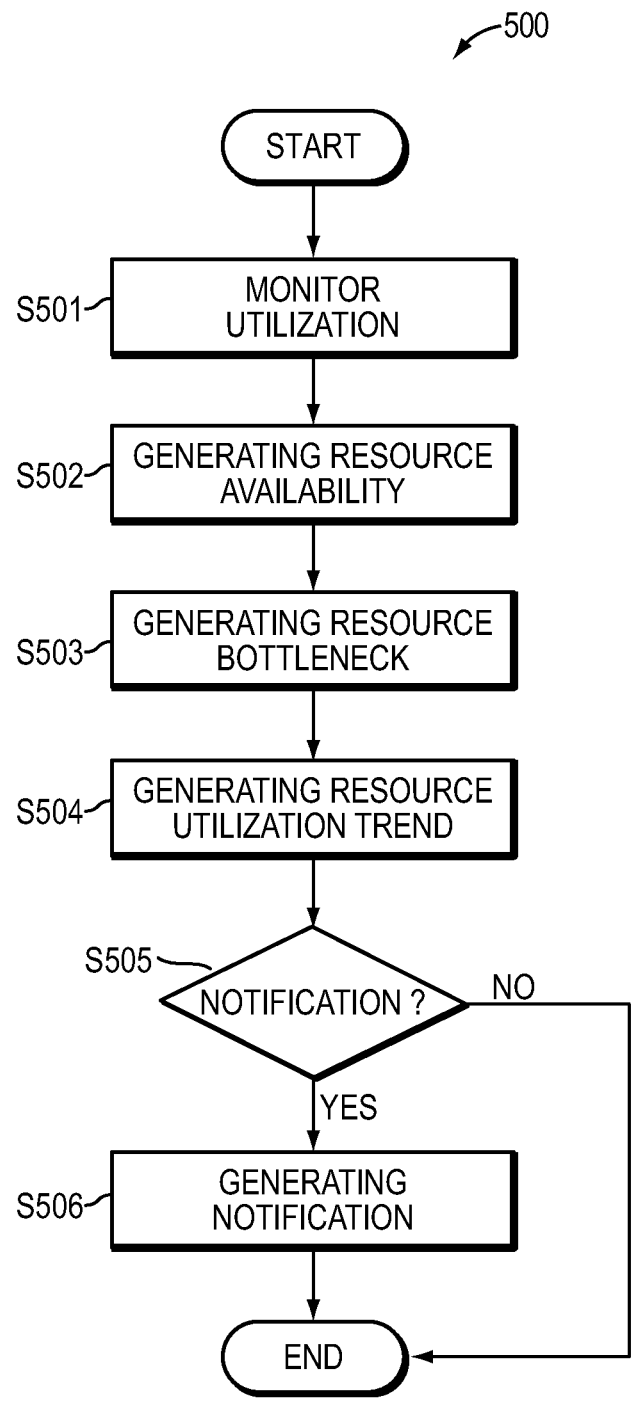
Figure 11:
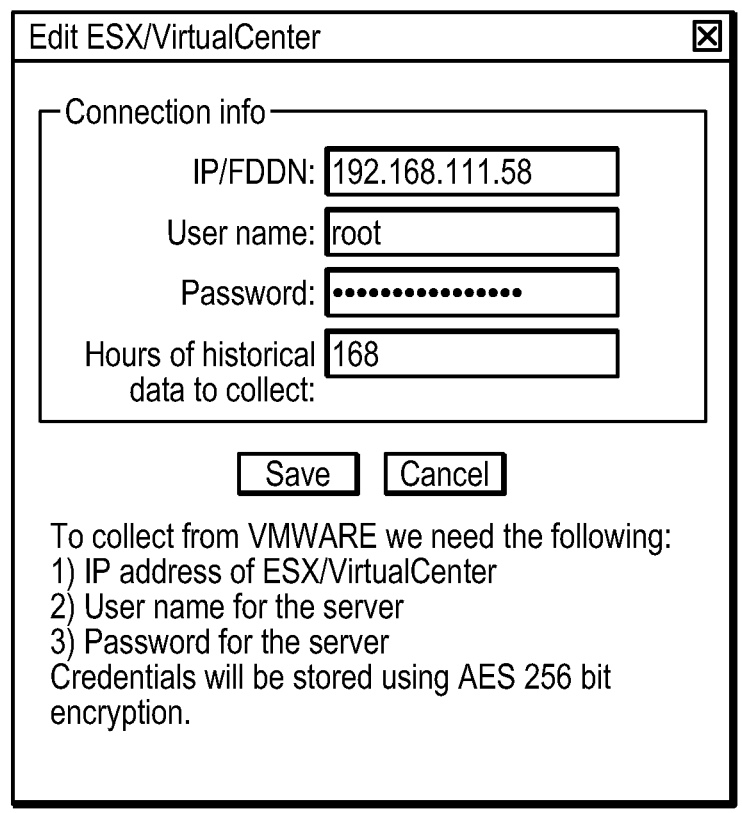
Figure 15:
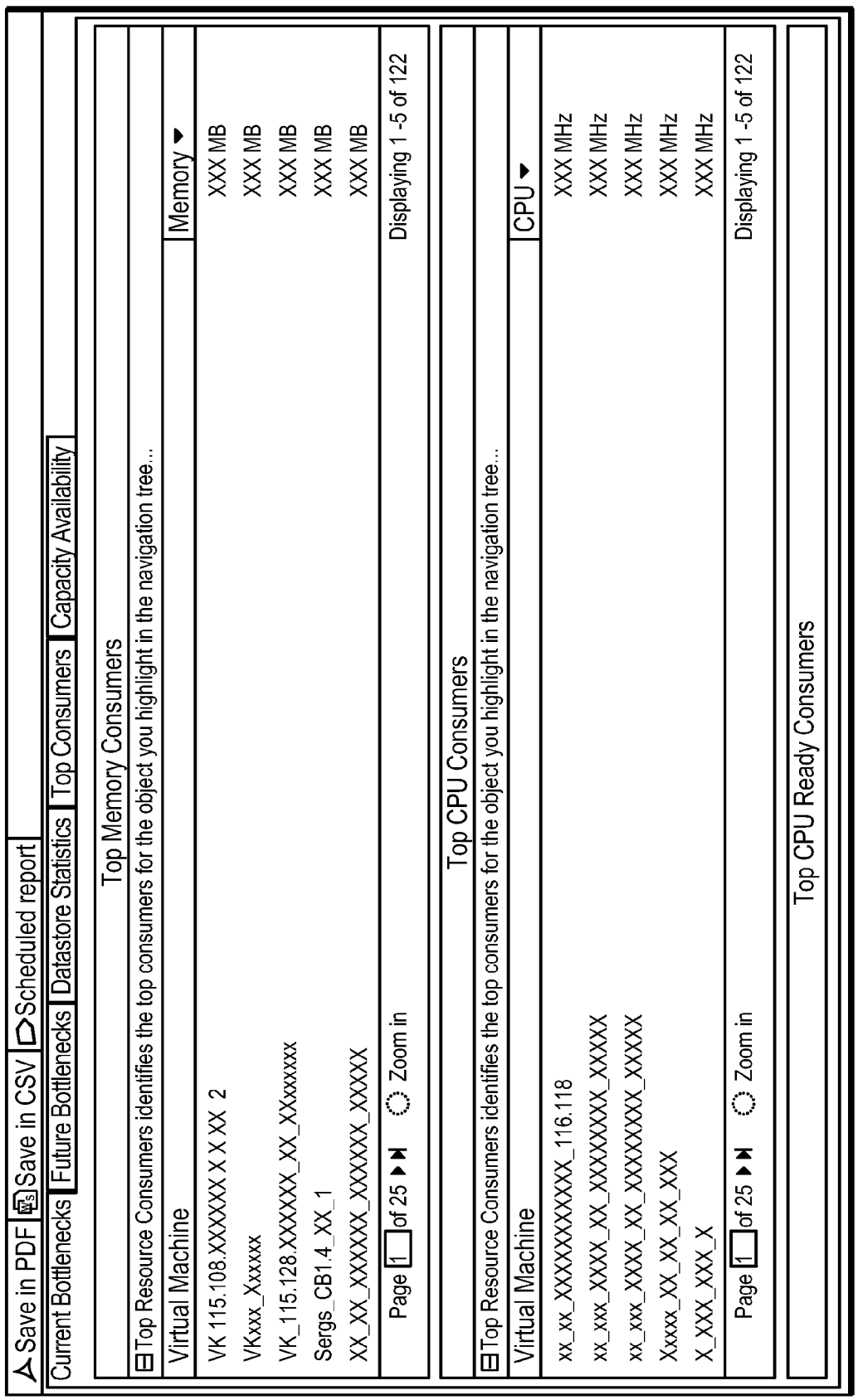
Figure 17:
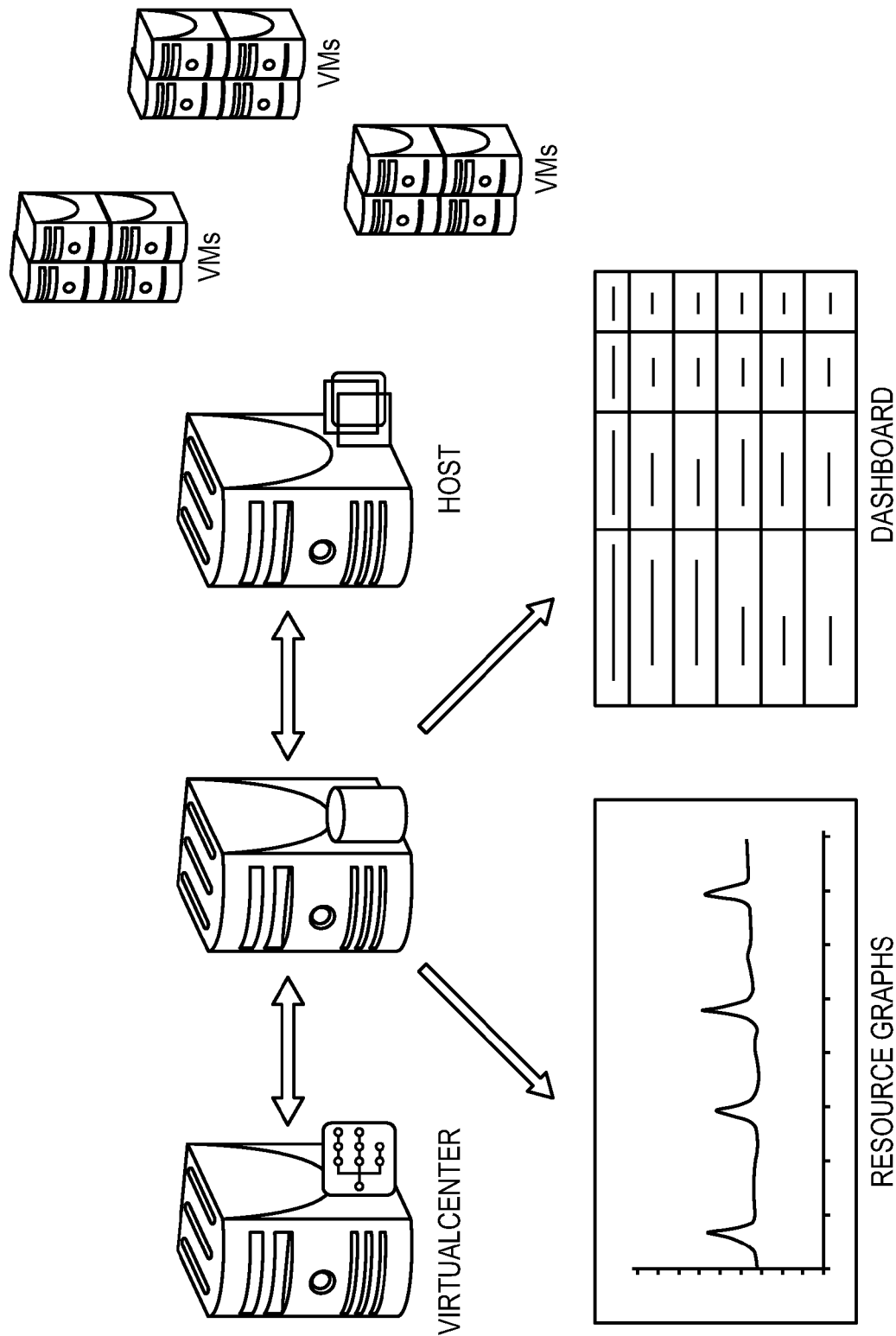
FIG. 17 illustrates an architecture associated with an exemplary implementation of the method, system and apparatus according to exemplary embodiments of the present invention.
Figure 18:
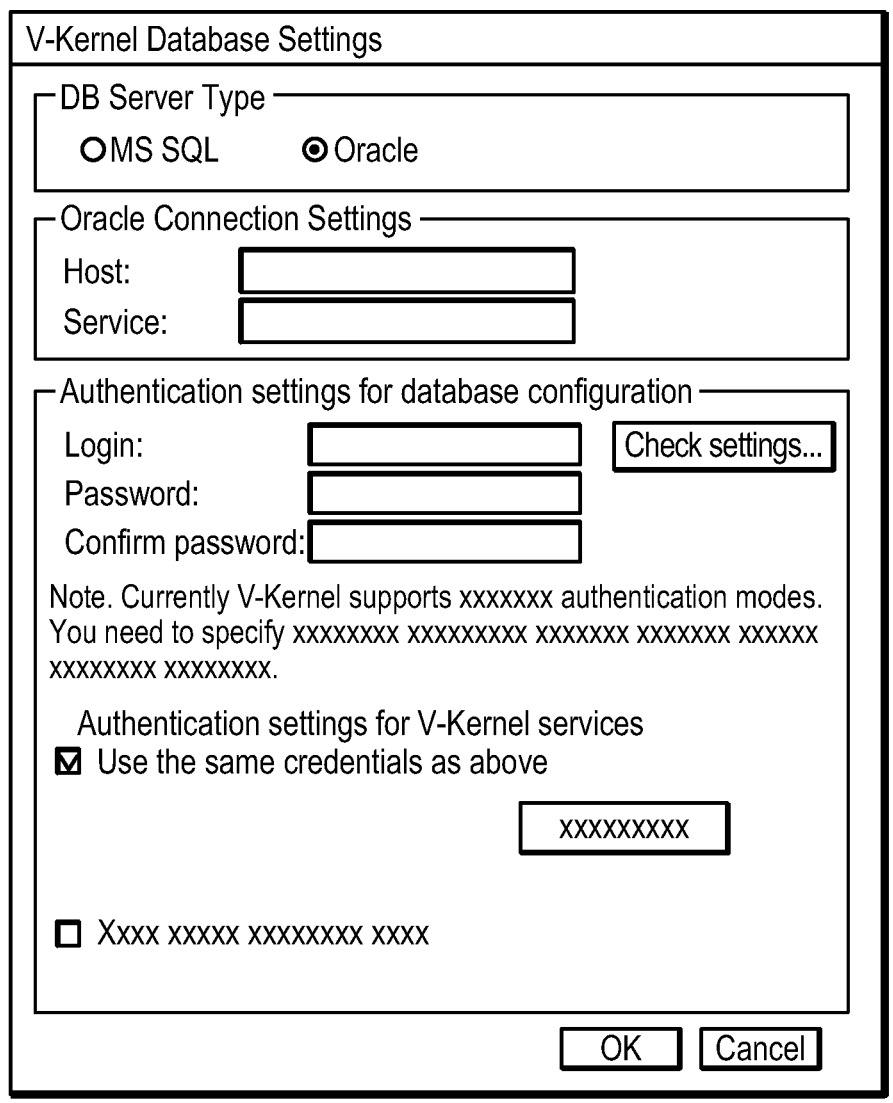
Figure 19:
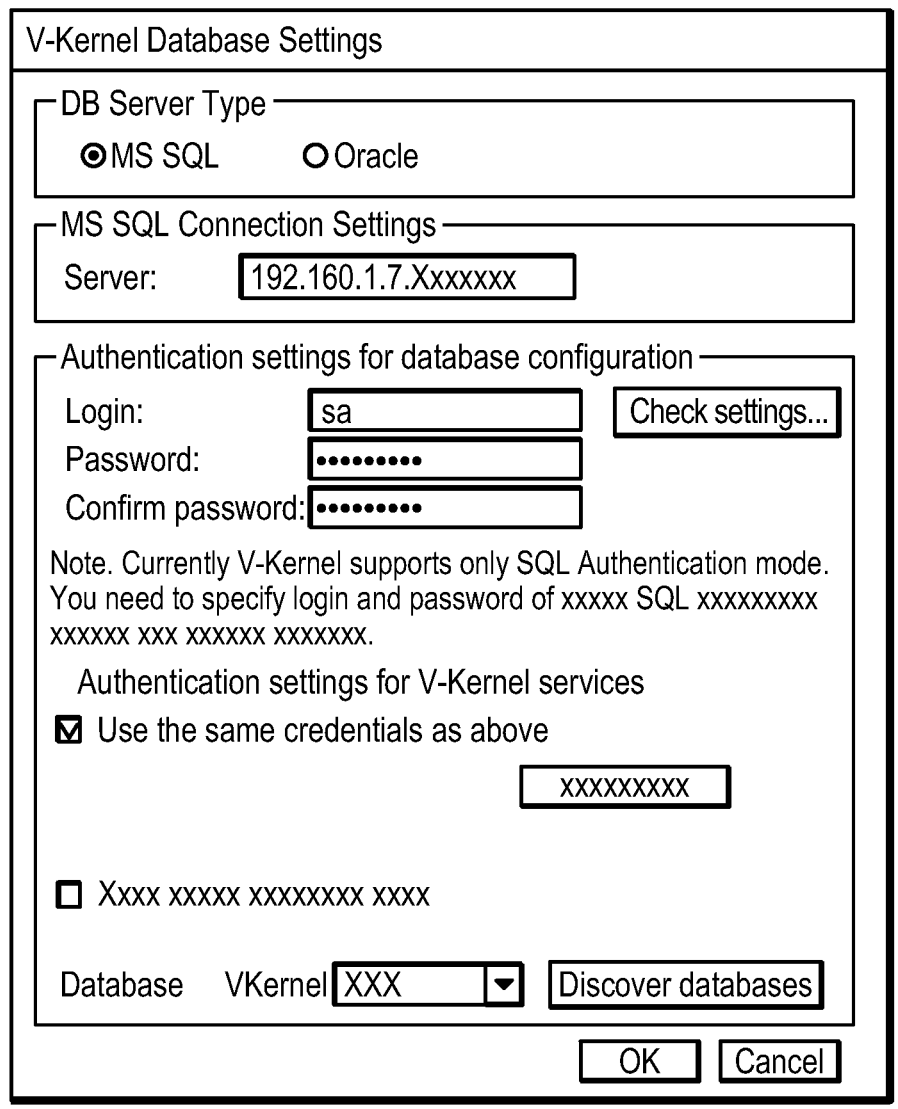
Figure 20:
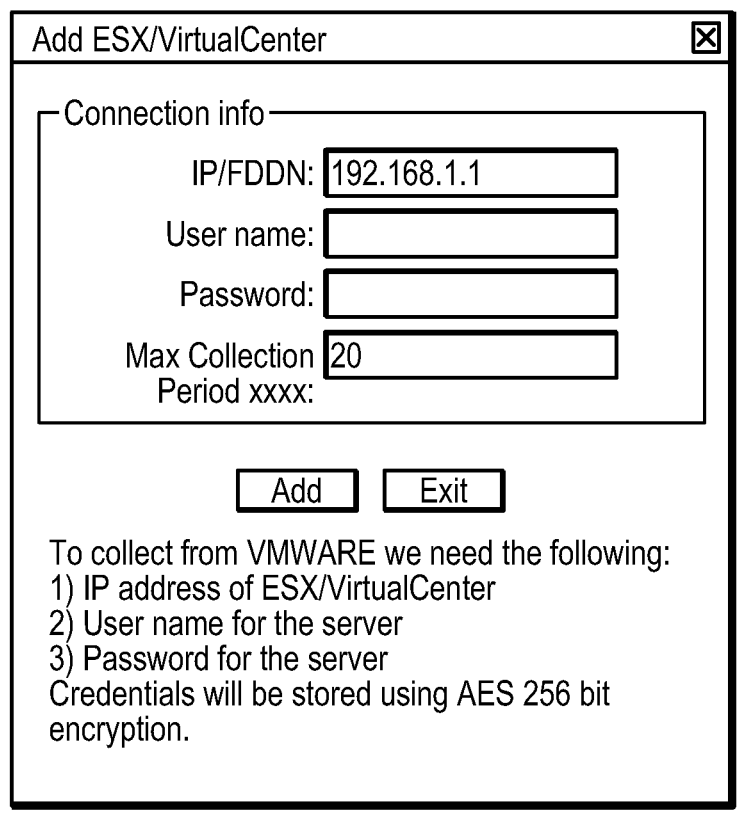

FIG. 5 shows an exemplary implementation of the present invention provides a method for analyzing resource utilization in a computer network 500, the method comprising monitoring utilization of at least one computing object utilizing resources on the computer network S501, generating resource availability information related to each computing object S502, generating resource bottleneck information for each computing object S503, generating resource utilization trend information for resource consumers S504, wherein the method is computer implemented, continuously. Additionally, exemplary implementations of the present invention provide a method for selectively S505 generating a notification indicative of future utilization based on at least one criteria S506.

FIG. 6 shows an exemplary implementation of the present invention that provides a method for monitoring utilization trends of a computing object utilizing the at least one resource in the computer network 600, comprising identifying continuously, utilization information of resources by computing objects S601, and presenting utilization information S602.

Capacity Analyzing—Modeling

FIGS. 48-53 show exemplary embodiments of the present invention that provide a method, apparatus and/or system that facilitate modeling of resource utilization scenarios before the scenarios are committed to actual resource utilization, in a computer network. An exemplary benefit thereof is allowing a user to analyze various proposed changes to resources, evaluating past, present and future effects of these changes. According to certain implementations, users can analyze various scenarios and abandon scenarios that are not desirable. Exemplary implementations of the present invention allow a users and/or processors to utilize one or more constraints for analyzing and/or validating model information for historical, current and/or prospective resource models. Further, embodiments of the present invention provide a method for modeling resources for VMs, allowing a user and/or a processor to interactively design and validate a resource model for one or more VMs. The proposed methodology includes, for example, launching a modeling process to receive or manually enter capacity model design information for designing the capacity model of resources on a computer network (for example, VMs), obtaining constraints for analyzing capacity model design information received, receiving capacity model design information for designing a model of capacity of resources, forwarding modeling information to a capacity modeling processor, storing capacity model design information, and generating a presentation for presenting capacity model design information.

Figure 49:
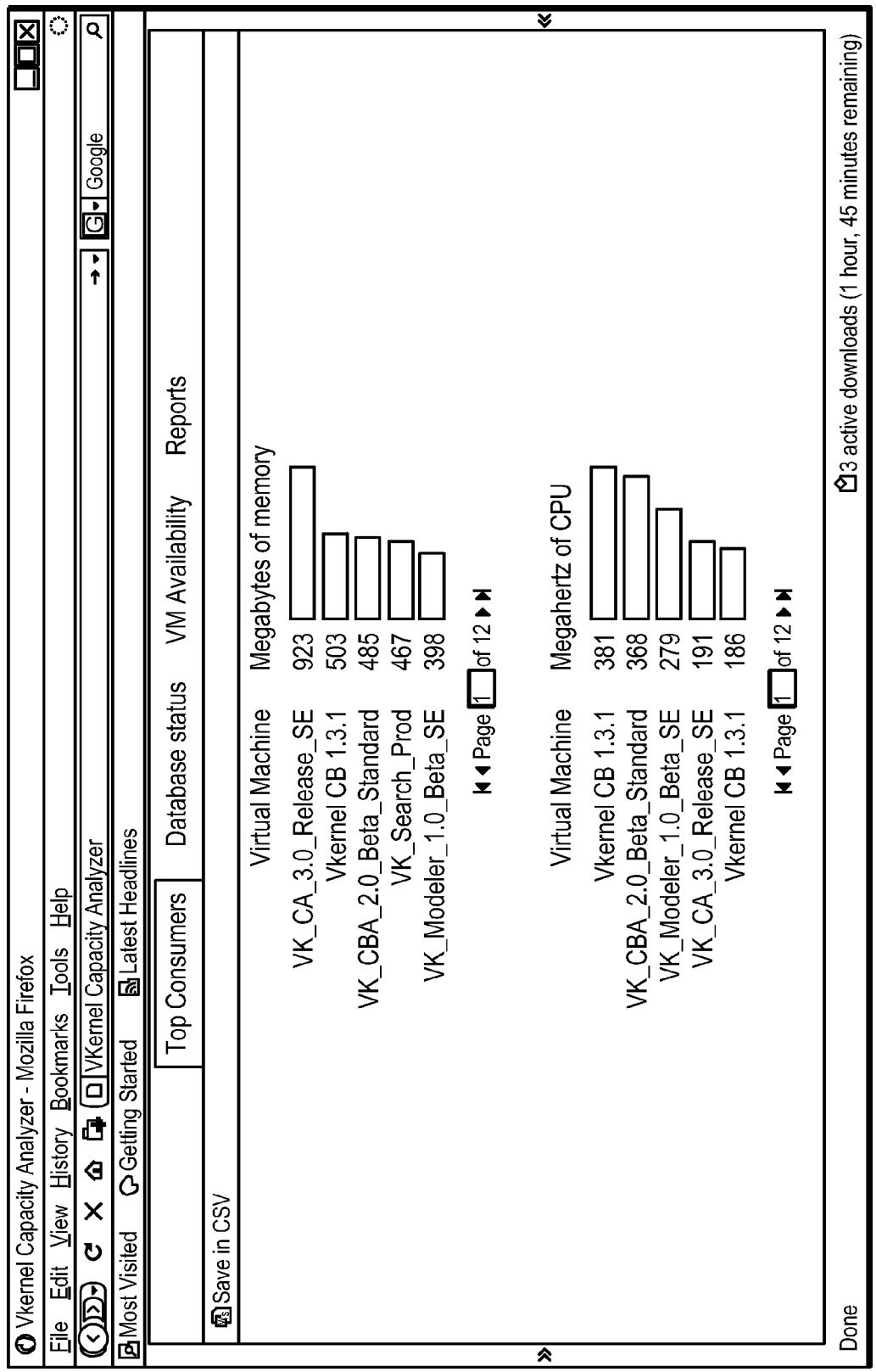
Figure 50:
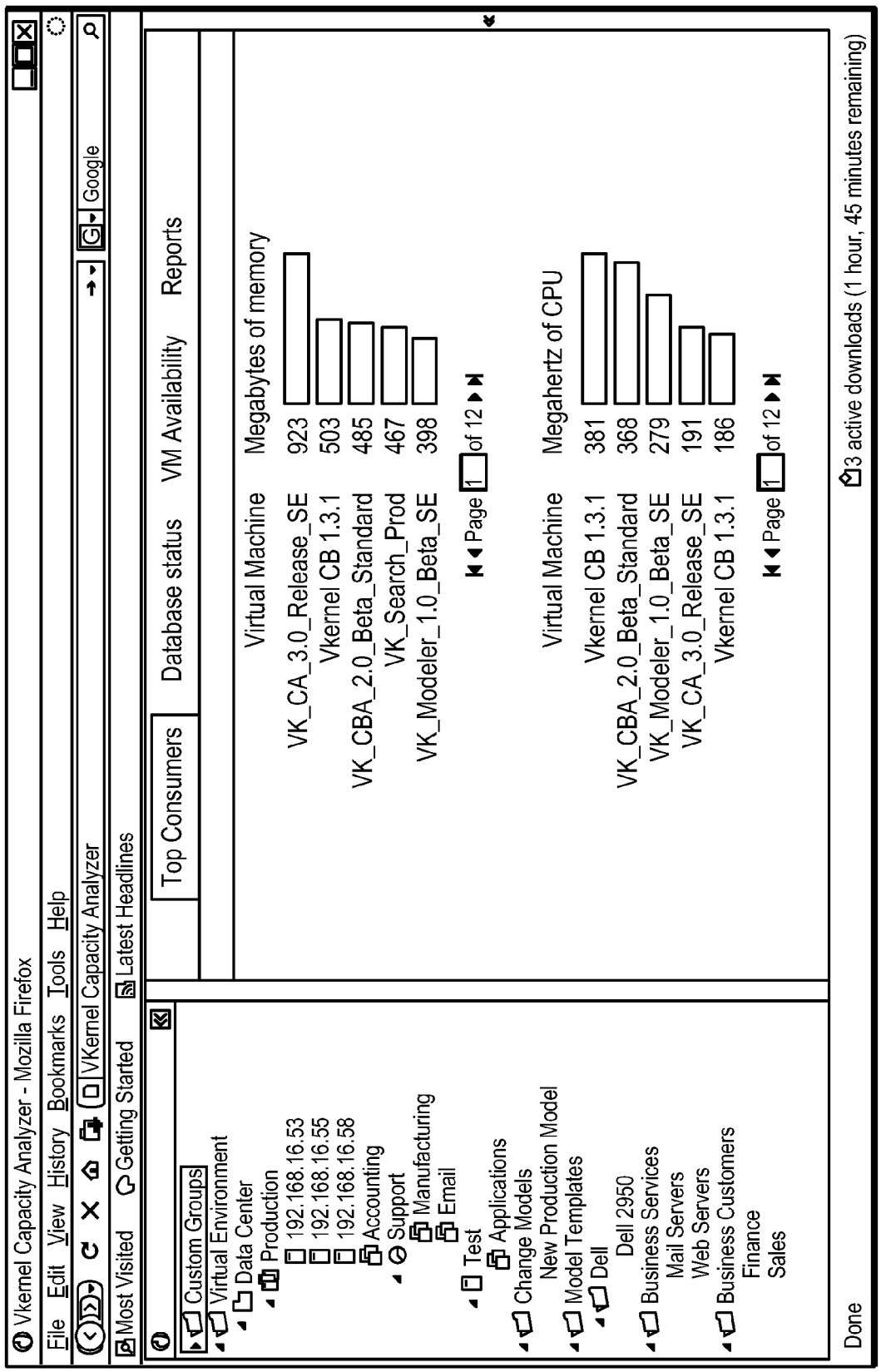
Figure 54:
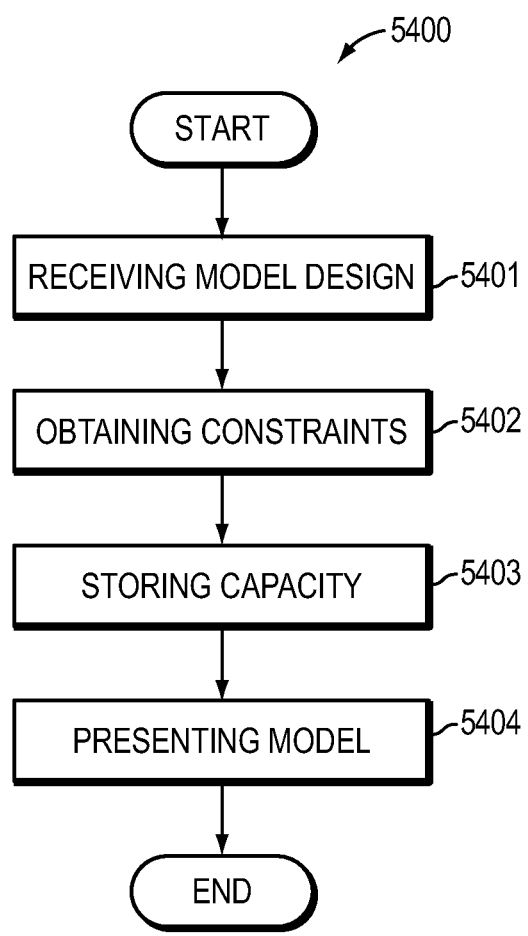
FIG. 54 is a flow diagram illustrating methodology for a method for analyzing and modeling resource utilization of at least one virtual machine in a computer network.

Exemplary implementations of the present invention provide a method for modeling capacity of resources on a computing network facilitating interactive design an validation of a model of resources in a computer network VMs. For example, an exemplary implementation, as in FIGS. 49 and 54, illustrate a method for analyzing and modeling resource utilization of at least one virtual machine ("VM") in a computer network 5400, the method comprising receiving capacity modeling design information for designing a model of capacity of resource for at least one VM S5401, obtaining constraints for analyzing capacity model design information received S5402, storing capacity modeling design information S5403, and presenting capacity modeling design information S5404. According to exemplary implementations, the method facilitates interactive design and validation of a model in a computer network, and wherein the method is computer implemented.

According to future exemplary implementation, the present invention provides for designing a model comprising at least one of generating a new capacity model, altering and/or updating an existing capacity model and/or validating alterations to an existing capacity model.

Capacity Analyzing—Size Management

Figure 40:
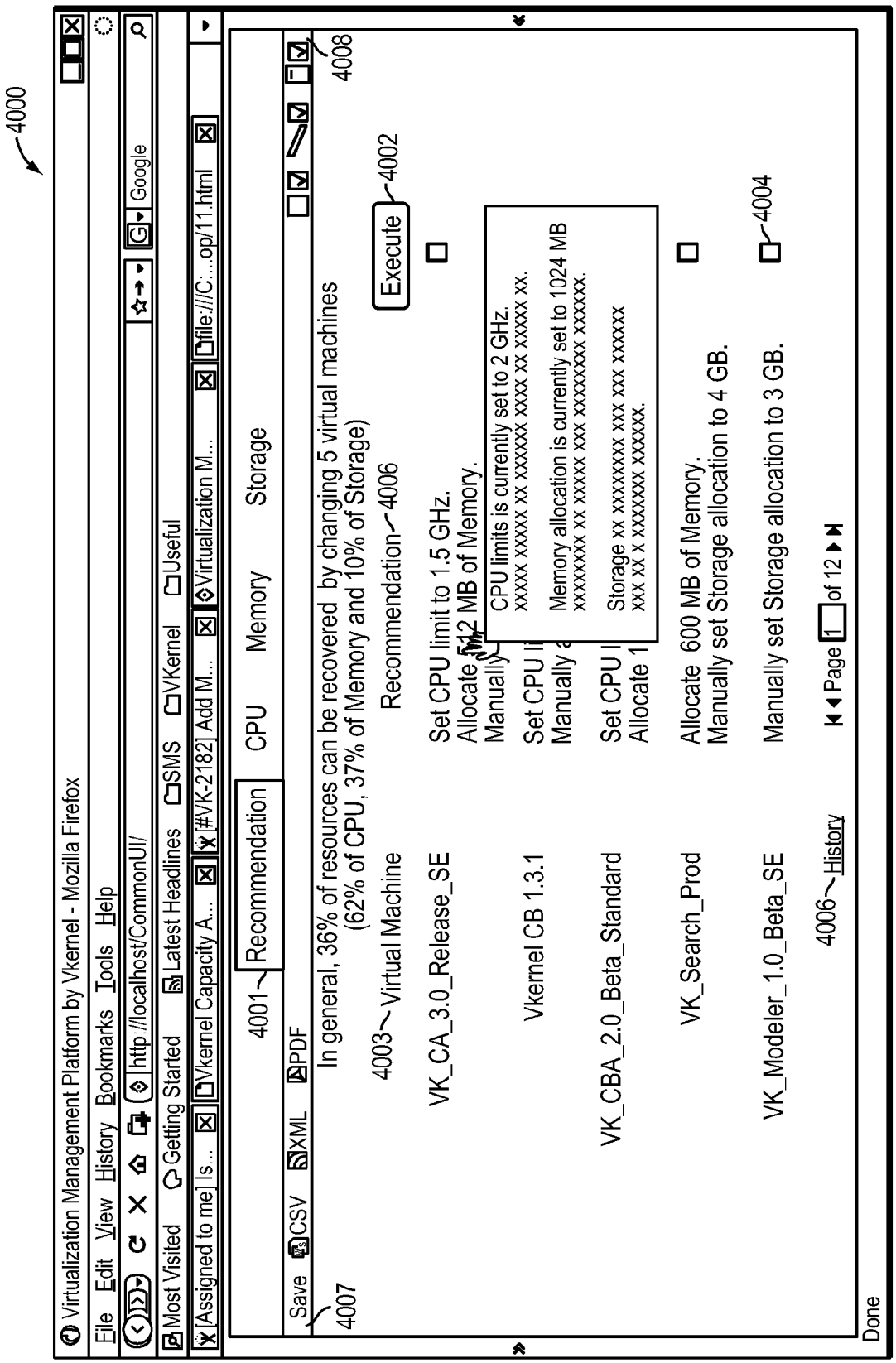

FIGS. 40-45 and 48 show exemplary implementations of certain embodiments of the present invention that provide a method for analyzing capacity and managing size and utilization of resources on a computing network, the method comprising determining and providing information allowing a user to easily manage size of capacity resources, specifically find, fix and tune resource for VMs. Exemplary implementations of the present invention provide for finding, fixing and tuning VMs for efficient utilization of resources providing the benefit of appropriately sizing resources for MVs by minimizing the resources allocated while not adversely impacting performance. For example, resources for VMs that are not optimally sized, set or utilized in a distributed computing environment are identified. In the initial set-up, optimal settings for VMs resources (such as utilization) are initialized and customized. After initial set-up, exemplary implementations of the present invention provide a graphical user interface (GUI) 4000 comprising information for fixing and tuning resources for VMs, such as a listing of VMs, and recommendations for setting or utilizing VM for efficient utilization of the resources. Thereafter, exemplary implementations of the present invention provide an option to apply the recommended changes, either manually and/or automatically. For example, FIG. 40 shows a Recommendations tab 4001 comprising a list of VMs 4003 for which resources are not properly set and summary recommendations 4005 for every VM, allowing users to apply the recommendations, either automatically (upon indication for execution by use 4002) and/or manually 4004. For example, in FIG. 40, for the VM VK_Modler_1.0_Beta_SE, the only recommendation for the VM is to manually set storage allocation to 9 GB, thus the related checkbox 4004 is disabled. For recommendations that can be automatically performed, the user of the Recommendations tab of the present invention can check the checkbox corresponding to the VM with a recommendation and press the Execute button 4002 in order to apply changes on the selected VMs, recalculate resources and refresh the page. If changes are committed, then a link 4006 to History page 4100 can provide a user the history of the changes performed. Certain implementations of the present invention provide for saving the recommendations information (for example, in cvs, xml and pdf file formats) 4007. Additionally, certain implementations of the present invention provide for including and/or excluding resources from the recommendations 4008. Further, FIG. 45 (4500) shows an exemplary implementation of the present invention allowing a user to selectively exclude certain resources for VMs.

Figure 41:
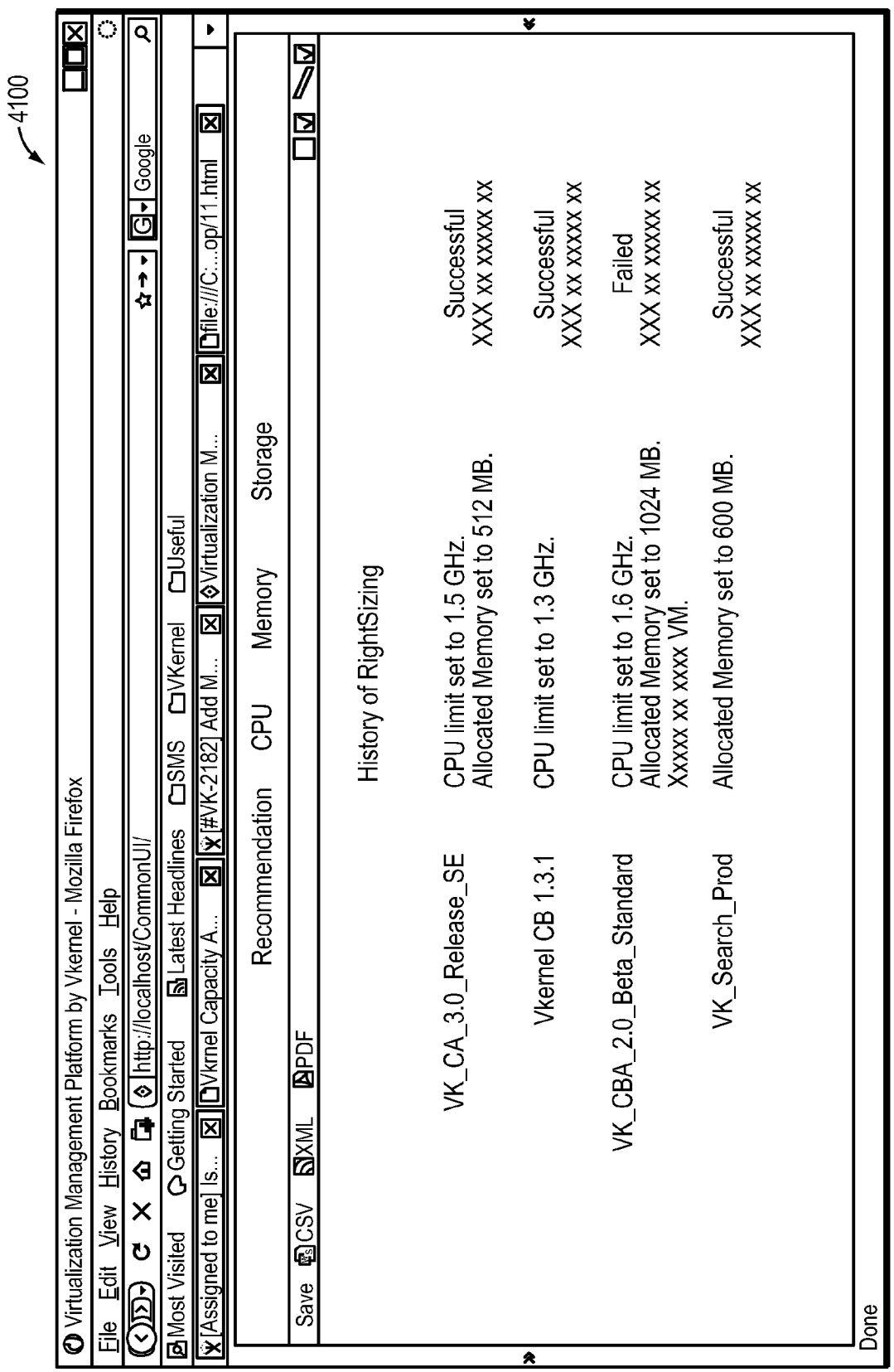

FIG. 41 illustrates an exemplary implementation of the present invention comprising a History page 4100 showing the history of tuning and fixing changes performed.

Figure 42:
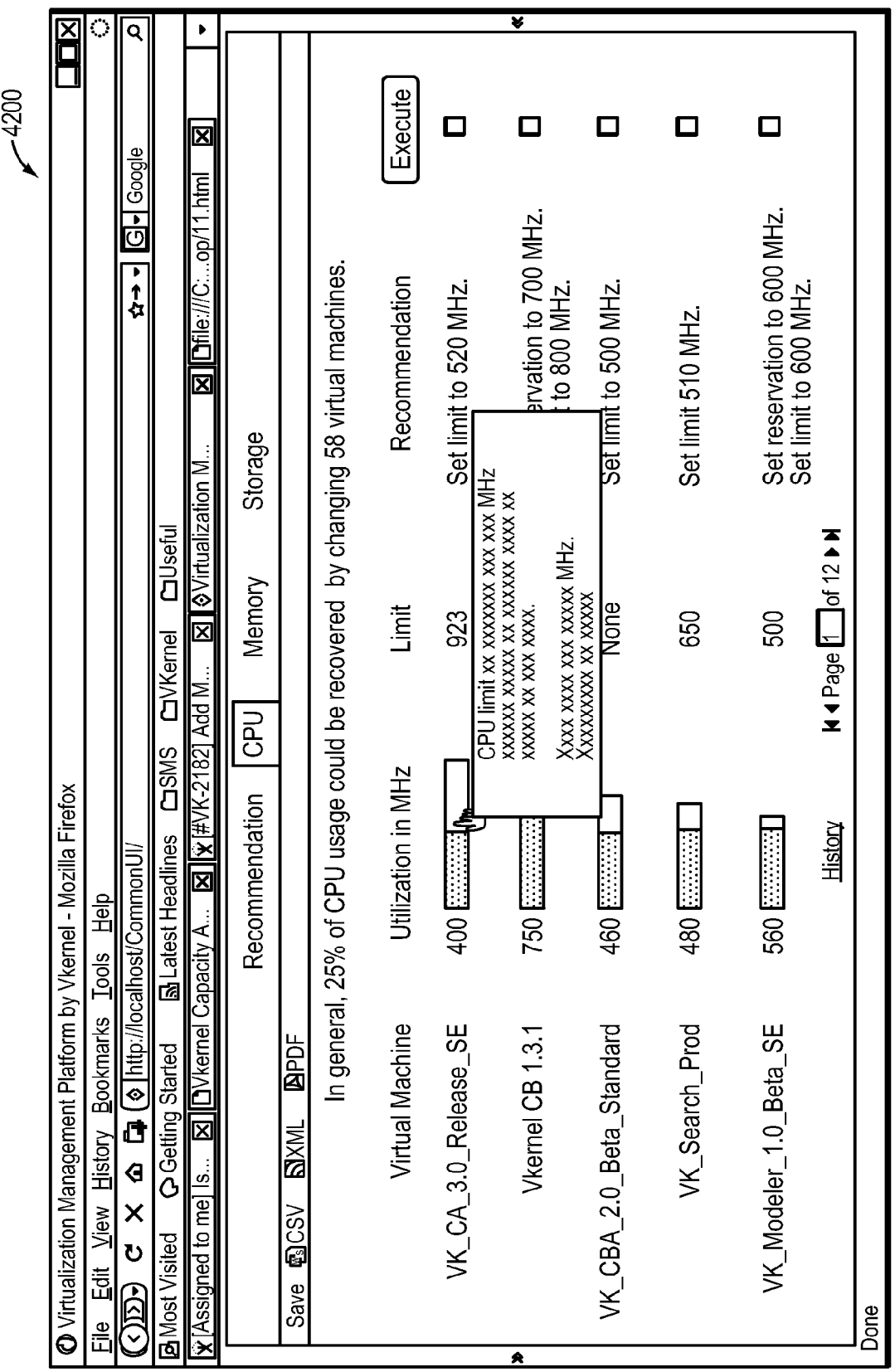

FIG. 42 illustrates an exemplary implementation of the present invention comprising a graphical user interface 4200 comprising size management information (including recommendations) about better utilization of CPU resources for allowing a use to optimize CPU usage for VMs.

FIG. 43 illustrates an exemplary implementation of the present invention comprising a graphical user interface 4300 comprising size management information (including recommendations) about recoveries of memory resources for allowing a use to optimize memory usage for VMs.

Figure 44:
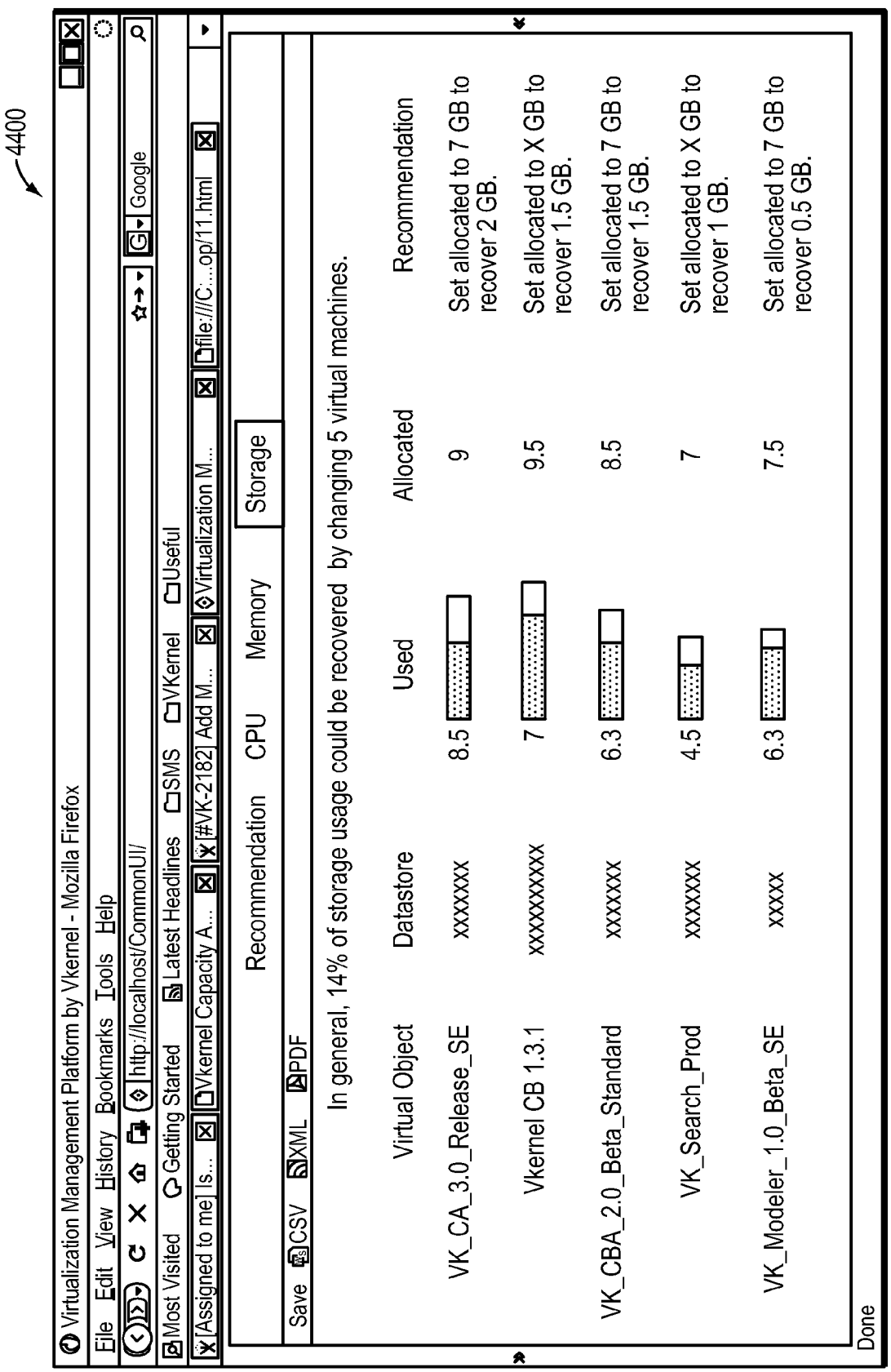
Figure 45:
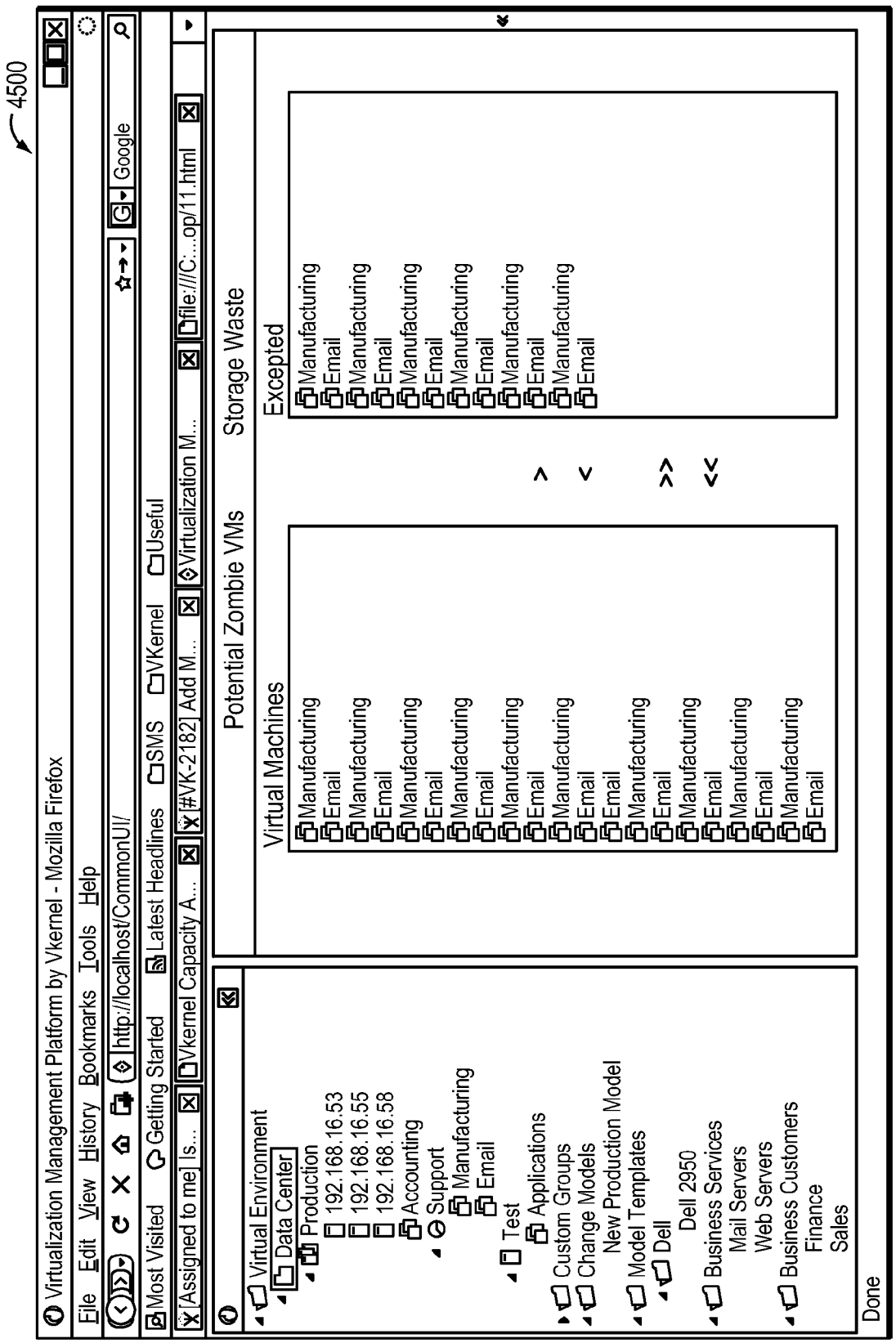

FIG. 44 illustrates an exemplary implementation of the present invention comprising a graphical user interface 4400 comprising waste management information (including recommendations) about recoveries of storage resources for allowing a use to optimize storage usage for VMs.

Capacity Analyzing—Waste Management

Figure 46:
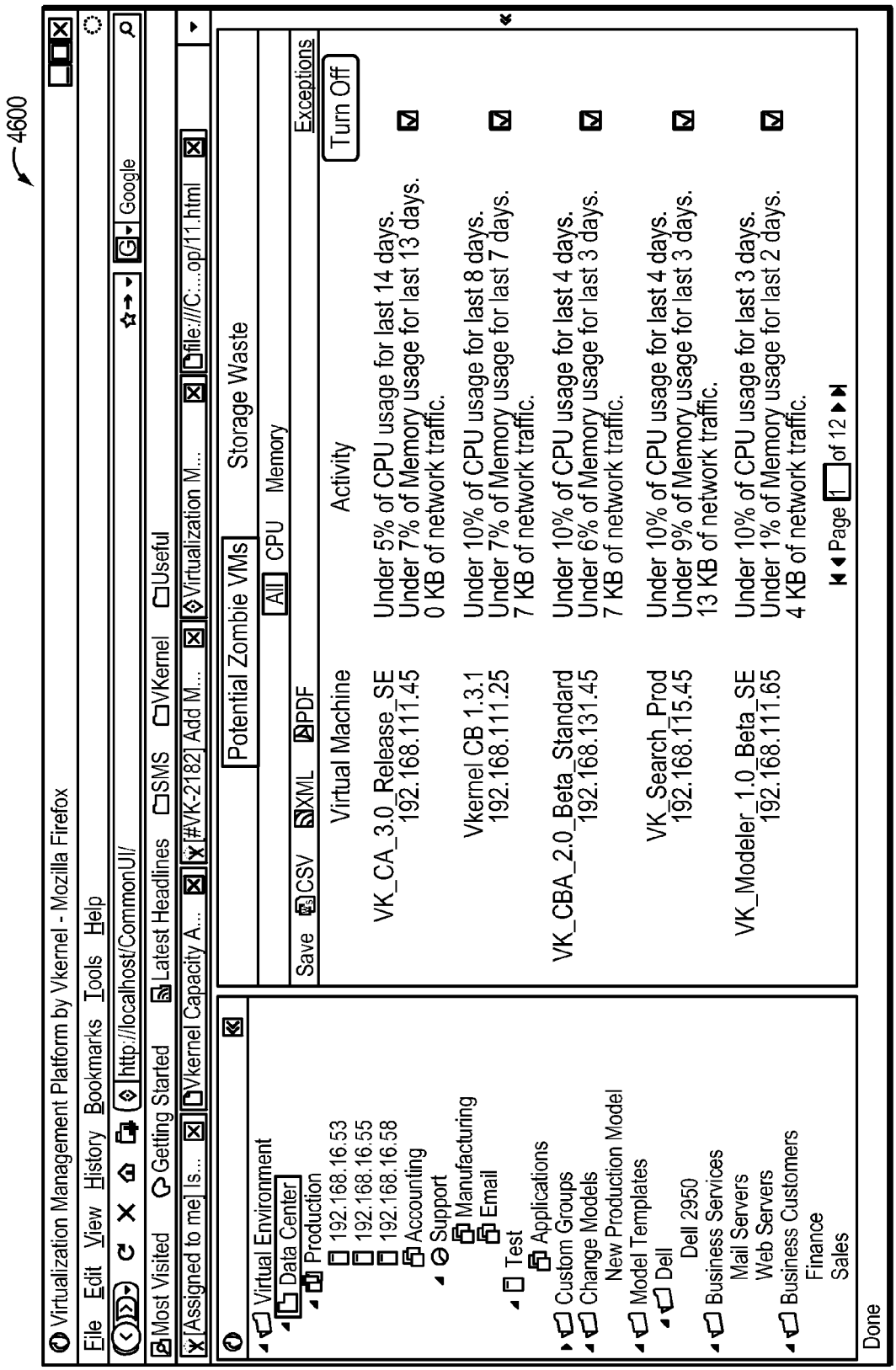
FIGS. 46 and 47 are screenshots illustrating exemplary GUI implementations, as well as methods, systems and devices for analyzing, utilizing and/or finding waste of resources for at least one virtual machine ("VM") in a computer network.
Figure 47:
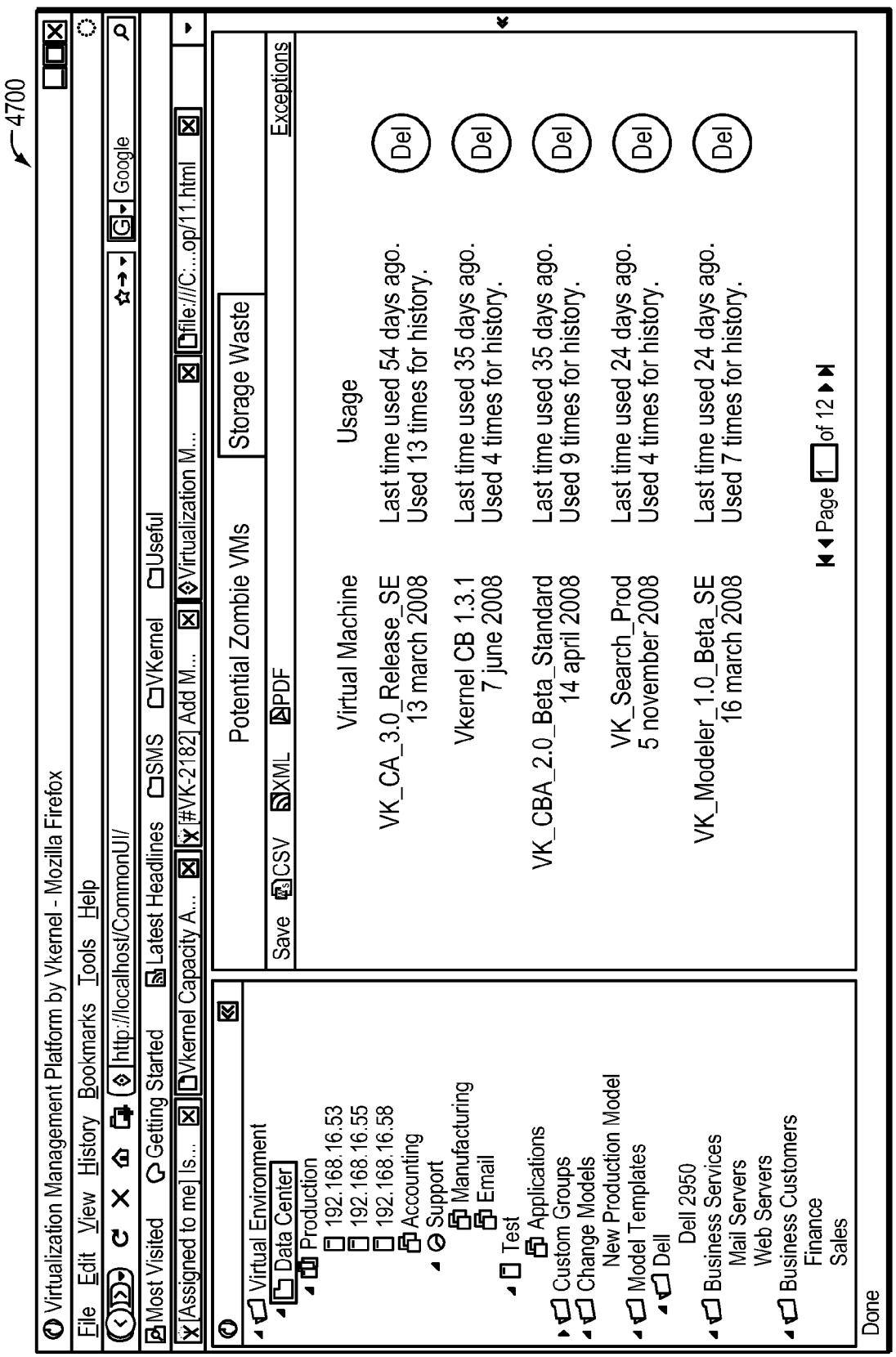

FIGS. 46, 47 and 48 show exemplary implementations of the present invention that provide a method for analyzing capacity and managing waste and utilization of resources on a computing network, the method comprising determining and providing information allowing a user to easily manage waste of capacity resources 4600 and 47200. Exemplary implementations of the present invention locate VMs that are not being used (for example, powered off, not accessing the internet, etc.) and resources that are being wasted (for example, storage allocated to snapshots that are never accessed, storage allocated to VMs that have been deleted, etc.).

Unified Management Platform ("UMP")

Another exemplary implementation of the present invention provides a method, apparatus and system for a unified management platform in a computer network (for example, a virtual network environment), providing a novel approach to system management, providing at least the benefit of optimizing time for system administrators, overcoming repetitive network discovery, and enabling integration among system management applications. Implementations of certain exemplary embodiments of the present invention provide for a unified management platform and associated applets (according to exemplary implementations and embodiments, applets can be applications. For example, applets can be mini-applications according to certain implementations) focused on optimizing the utilization, and guiding the evolution, of a virtual infrastructure. Using the various applets contained within the unified platform, according to exemplary implementations of the present invention, allow for: analyzing current operations, maximizing use of resources, predicting future constraints, modeling large or small infrastructure changes, predicting future behavior of those changes, managing inventory of resources in a virtual computing network, allocating infrastructure costs, and optimizing time for system administrators, overcoming repetitive network discovery, and enabling integration among system management applications. Exemplary implementations and embodiments of the present invention can facilitate insight into the current and future health of the infrastructure, and provide recommendations for changes designed to enhance the overall performance. According to certain exemplary implementations, these recommendations can either be automatically or manually executed.

An exemplary implementation of the above-noted embodiments of the present invention includes a novel approach for system management in a computer network (for example, in a virtual network) providing at least the following benefits:
- light weight, small software (virtual) appliance
- snap-in architecture that requires minimum or no installation and/or deployment
- minimal GUIs that are easy to use and learn
- individual applets in a uniform platform each focusing on a specific issue related to managing of resources in a virtual computing environment (for example, capacity bottlenecks, inventory, storage analysis, etc.)
- shared/common database amongst applets in the unified management platform eliminating system discovery and rediscovery
- context sensitive transition from one applet to another
- time savings by providing an "instant on" experience for end users
- immediate value/return on investment
- minimal ongoing administration flexible licensing—customers can license and pay for only those tools actually used.

Figure 60:
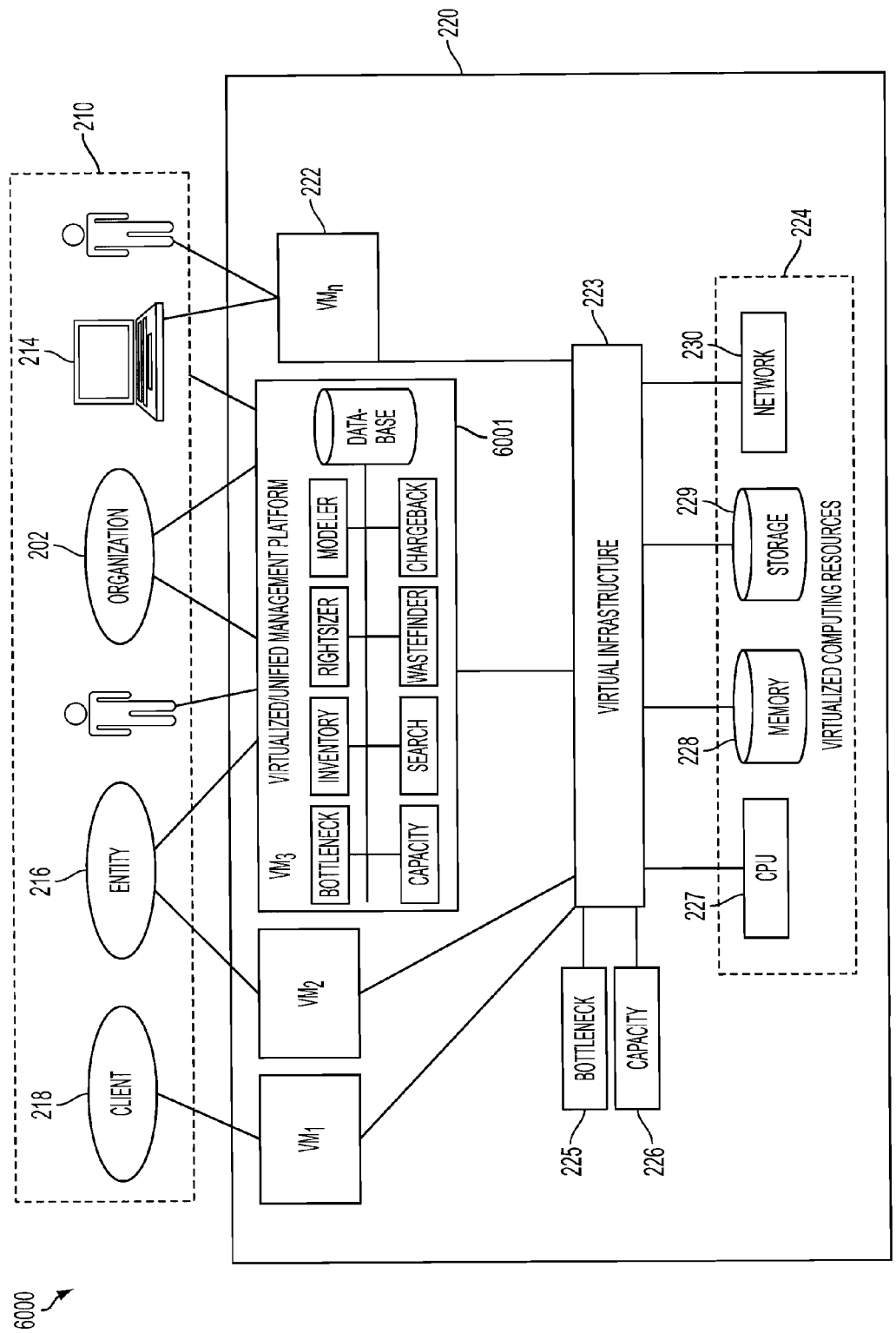
FIG. 60 is a schematic block diagram that illustrates an architecture associated with a unified management platform according to exemplary embodiments of the present invention.

FIG. 60 is a schematic block diagram that illustrates an architecture view of a unified management platform 6001 associated with a method, system and apparatus according to exemplary embodiments of the present invention.

Figure 52:
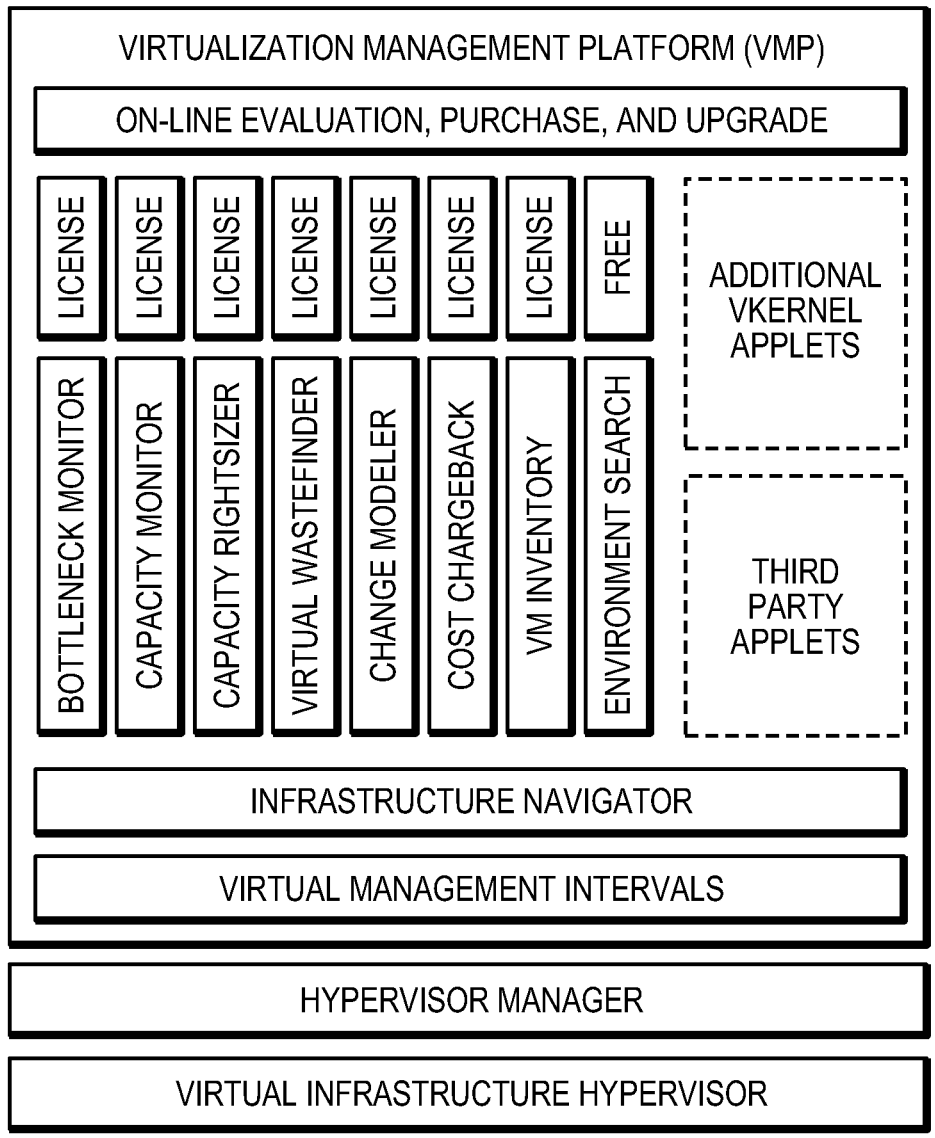
Figure 56:
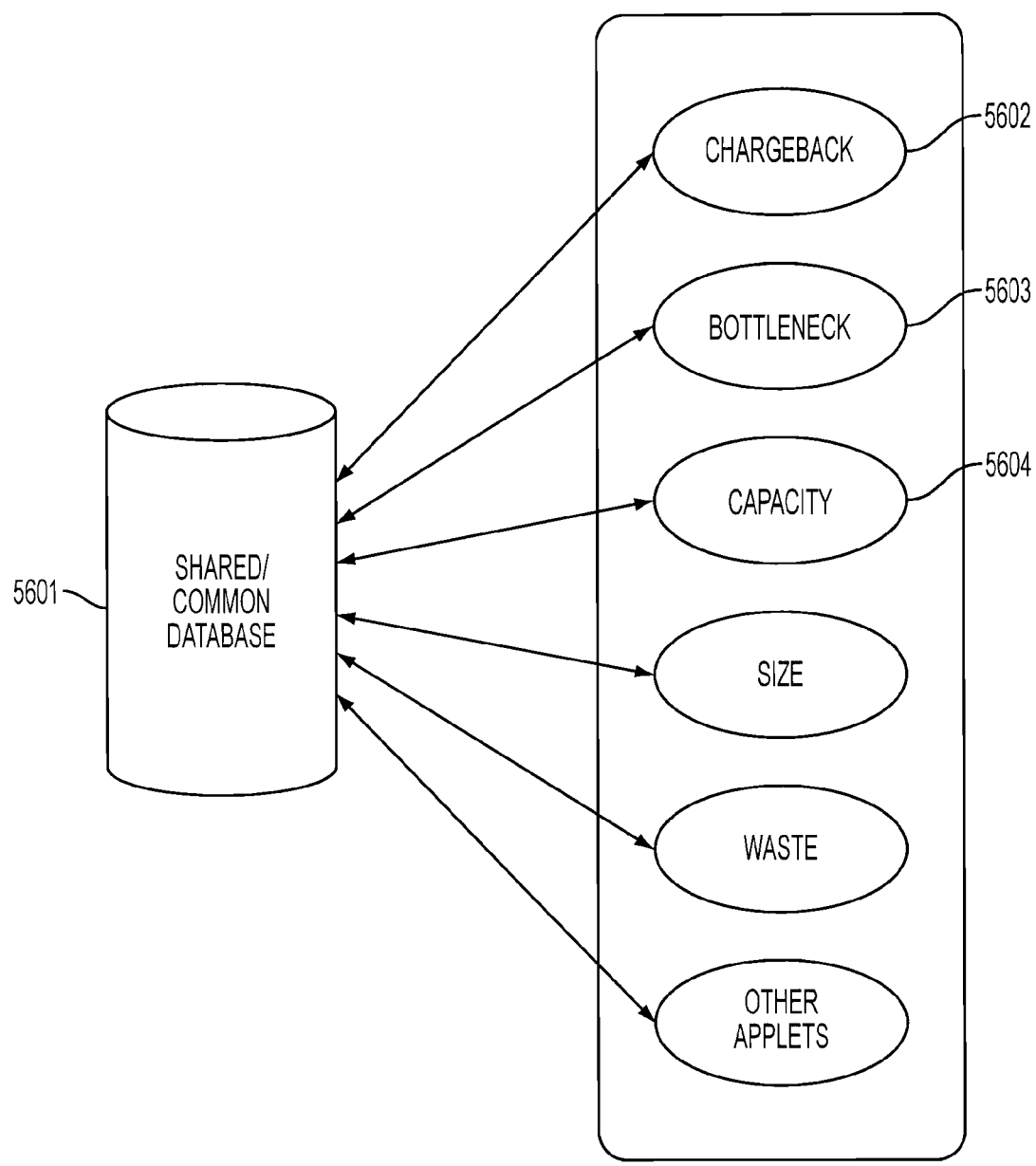
FIG. 56 illustrates an architecture associated with an exemplary implementation of the method, system and apparatus according to exemplary embodiments of the present invention.

FIGS. 52, 56, and 60 illustrate a unified management platform architecture 5200 according to an exemplary implementation of the present invention, showing a virtual infrastructure navigation view where the underlying management internals are all common to and available for all applets. The virtual infrastructure navigation view 5201, a management database 5601 and underlying management internals 5202 are all common to and available for all applets. Exemplary implementations of the present invention provide a unified management platform 5200 that allows hosting third party management applications, in addition to the comprehensive applications provided with the unified management platform. FIGS. 61 and 61A-61F illustrate a database schema associated with exemplary implementations and embodiments of the method, system and apparatus according to exemplary embodiments and/or implementations of the present invention.

Figure 53:
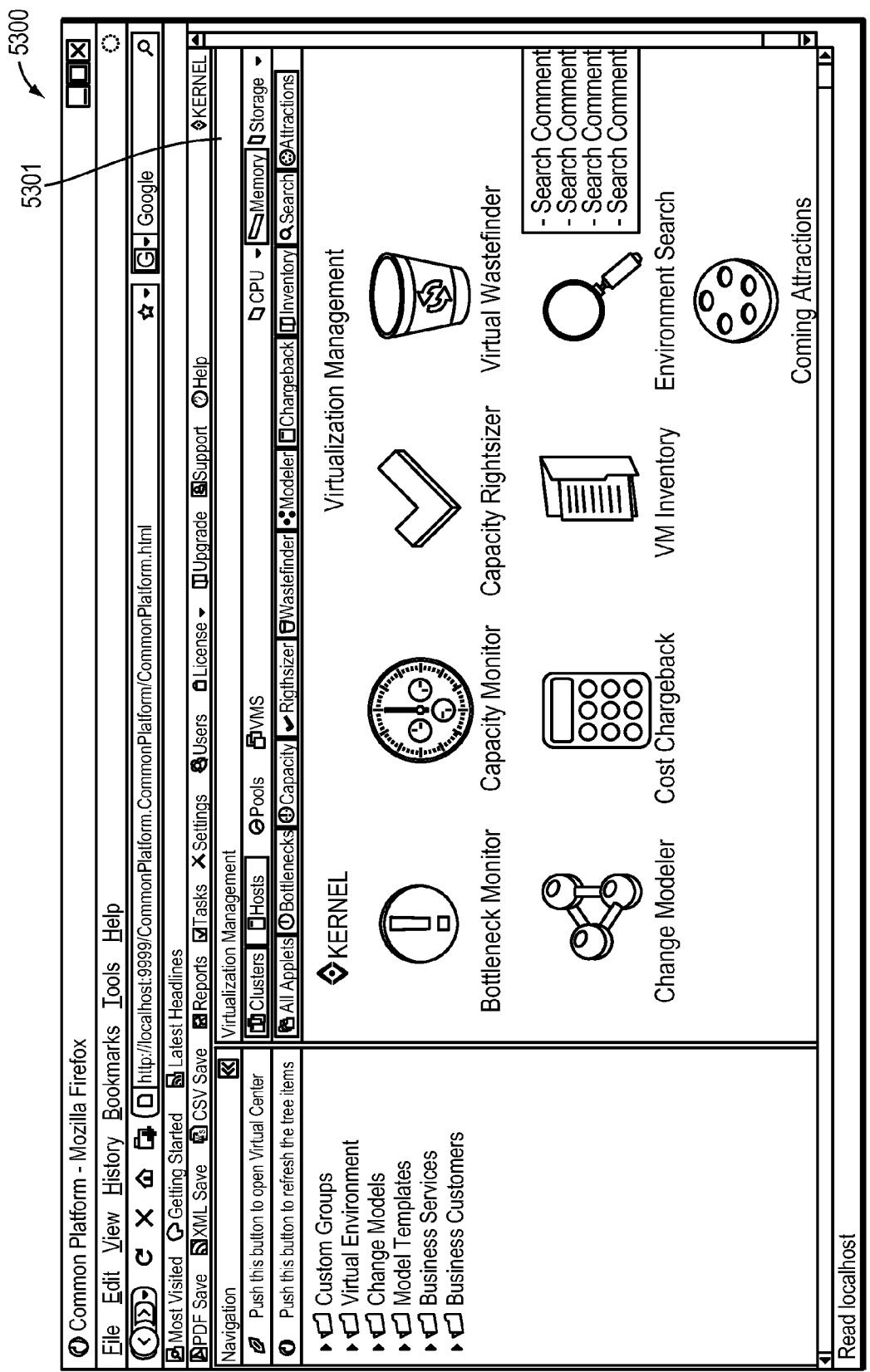

FIG. 53 shows a GUI, according to an exemplary embodiment of the present invention, which provides for a unified management platform in a virtual computer network 5300, providing at least the benefit of an overall look and feel of a system management platform that is intuitively understood, visually pleasing and instantly recognizable. For example, the GUI comprises a toolbar 5310 containing actions appropriate for all applets (for example, PDF Save, Reports, Users options, Support, XML Save, Tasks, License, Help, CVS Save, Settings, Upgrade, etc.). Further, the GUI 5300, according to an exemplary implementation 5300, comprises a navigation panel 5302 and an applet panel 5303. The navigation panel 5302, according to an exemplary implementation of the present invention, comprises a graphical button to launch the various applications (for example, Virtual Center), a graphical button to refresh the navigation tree, and the complete navigation tree, where the navigation tree, according to certain implementations, comprises folders necessary to support the applets (for example, Custom Groups, Virtual Environment, Change Models, Model Templates, Business Services, Business Customers, etc.). The applets panel 5303, according to an exemplary implementation of the present invention, comprises a toolbar 5311 that selects objects 5312 (for example, Cluster, Host, Pool and VM, etc.) and resources 5313 (for example, CPU, Memory, and Storage) displayed by the applets. According to certain implementations, a toggle button can be use to select/filter the appropriate objects or resources.

FIG. 56 illustrates an exemplary implementation of the present invention that provides a novel approach for managing a system where a unified management platform database architecture 5600 comprises applets, where the applets (for example, chargeback 5602, bottleneck 5603, capacity 5604, . . . ) share a shared/common database 5601. Thus providing at least the benefit of eliminating the need for every appliance to discover all servers, hosts and clusters.

Furthermore, an exemplary implementation of the present invention provides a common database 5601 comprising data comprising information indicative of historical activity of at least one application in a virtual environment platform, storage for accommodating new activity information of at least one application active in the virtual environment platform, wherein the information indicative of the historical is updated based on the new activity information, and an output providing accessibility to the data upon initialization, wherein a new application active in the virtual environment upon the initialization has access to the data. Furthermore, FIGS. 61 and 61A-61F illustrate a schema associated with the common database 5601 according to an exemplary implementation of the method, system and apparatus according to exemplary embodiments and/or implementations of the present invention. FIG. 61 illustrates an overview of the entire schema of the common database 5601, according to an exemplary implementation, and FIGS. 61A-61F illustrate portions of FIG. 61 zoomed in for clarity.

Figure 57:
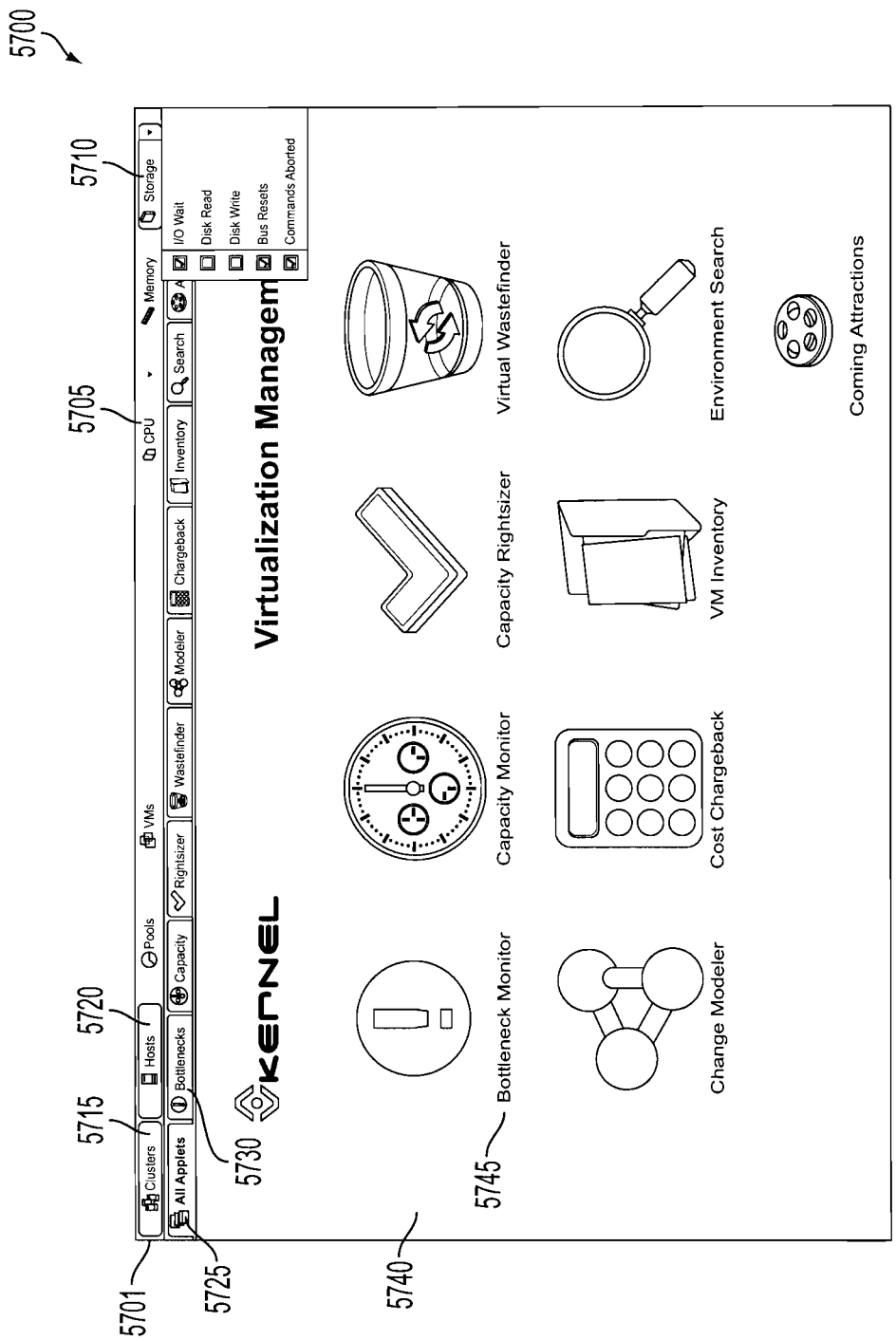
FIGS. 57 and 57a are screenshots illustrating exemplary implementations, as well as method, system and devices for a unified management platform in a virtual environment according to embodiments of the present invention.
Figure 57A:
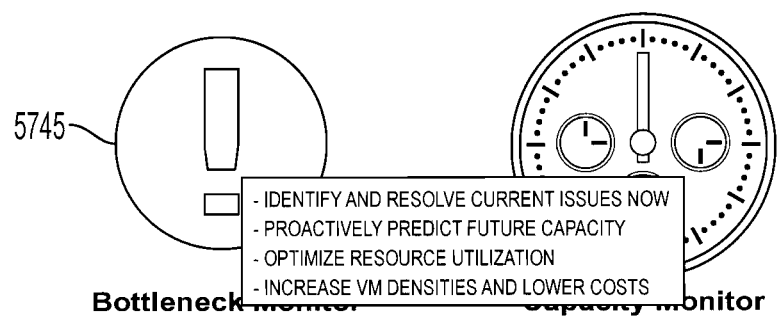

FIGS. 57 and 57a are screenshots illustrating exemplary implementations of the present invention, as well as method, system and devices for a unified management platform in a virtual environment.

Further, FIG. 57 illustrates an exemplary implementation of the present invention that provides a GUI comprising an applet panel 5700, comprising a toolbar 5701 that selects objects (for example, Cluster 5715, Host 5720, Pool and VM) and resources (CPU 5705, Memory and Storage 5710) displayed by the applets in the applet frame 5740. Further, according to certain implementations, the CPU graphical button 5705 comprises a checkbox menu item which allows CPU options to be selected or filtered if CPU is selected. According to certain exemplary implementations of the present invention, the Storage button 5710 comprises graphical checkbox menu items for I/O Wait, Disk Read, Disk Write, Bus Resets, and Commands Aborted. For example, FIG. 57 shows an exemplary implementation of the present invention where the views of any of the applets (in the applets frame 5740) would include Clusters, Hosts and all of their respective storage properties (I/O Wait, Bus Resets and Commands Aborted) except Disk Read and Disk Write. According to certain implementations of the present invention, whenever the unified management platform, is started, all objects and resources can be selected for inclusion by the applets. Additionally, the applet panel 5700, according to the exemplary implementation of the present invention, comprises an all applets tab 5725 as well as a unique tab 5730 for each of the specific applets comprised in the unified management platform, the selection of each unique applet tab 5730 providing information related to the tab selected in the applet frame 5740 corresponding to the selected tab. The all applets tab 5725, according to exemplary implementations of the present invention, comprises an applet frame 5740 that further comprises a large icon and brief description for each of the available applets (for example, an icon for bottleneck monitor 5745). The GUI 5700, according to an exemplary implementation of the present invention provides further information regarding the respective applet whenever the mouse hovers over the icon. For example, as shown in FIG. 57a, when a user hovers the mouse over the Bottleneck Monitor 5745, a window frame appears and provides further information relating to Bottleneck Monitor 5745. In FIG. 57, when a user clicks the left mouse on any of the icons (for example, Bottleneck Monitor 5745), the unified management platform, according to exemplary implementations of the present invention, will open/launch the appropriate applet function (and tab).

According to exemplary implementations, a set of small virtual appliances can inter-operate to solve complex system management problems, where the GUI integration can be achieved through hyperlinks (from one appliance to another). For example, when a user is working with the bottleneck analyzer appliance and sees that the trend is negative and wants to monitor it more closely, the user would be able to click one hyperlink and automatically switch to the applet for capacity monitoring where he can set a watch point that will monitor and trigger an alarm when a problem occurs.

FIGS. 48-53 show exemplary implementations of the present invention for a unified management of applications in a computer network providing at least the benefit of optimizing time and money for users of computer networks. Exemplary implementations of the present invention provide for a unified management platform comprising zero or more applications (for example, applications for monitoring capacity 4803), where the applications inter-operate to solve complex system management problems. Exemplary implementation of the present invention, as shown in FIG. 48 provides a unified management platform for quick and easy access to tools and functions necessary to proactively manage virtual infrastructures. The unified management platform of implementations of the present invention, as shown in FIG. 48, provide easy to use tools, applications and functions, for example, applications for monitoring, analyzing, validating, modeling, inventorying and costing the virtual infrastructure on a computer network.

According to exemplary implementations of the present invention, the unified management platform may provides at least the following benefits:
  easy and intuitive operation
  individual single function tools
  consistent vies and actions across the functions
  common view of the virtual infrastructure
  common database shared by the various functions
  context sensitive transition from one function to another
  one-time installation for the complete appliance
  convenient licensing
  update or schedule appliance update According to exemplary implementations of the present invention, the virtual infrastructure navigation GUI 4801, the management database and the underlying management internals can be common to and available for all functions, see FIG. 53. In addition to the various suites of functions provided by exemplary implementations of the present invention, certain implementations of the present invention can integrate with third party management applications.

Further, exemplary implementations of the uniform management platform, according to the present invention provide for optimizing the utilization of and guiding the evolution of the virtual infrastructure. Various functions, according to exemplary implantations of the present invention, provide for analyzing current operations, maximize user of resource, predict future constraints, model large and/or small infrastructure changes, predict the future behavior of those changes, manage the virtual inventory and allocate infrastructure costs. Exemplary implementations of the present invention may provide the benefit of insight into the current and future health and fitness of the infrastructure, and provide recommendations (for automatic or manual execution) for change designed to enhance the overall performance of resources of VMs.

As shown in FIG. 48, exemplary implementations of the present invention facilitate a analyzing and/or managing resources on a computer network by providing a uniform management platform 4800 comprising a GUI managing capacity bottlenecks (current and future) 4801, capacity monitoring and management (capacity consumers and availability) 4803, capacity sizing and tuning (capacity utilization versus allocation) 4804, virtual waste-finding (VM sprawl, VM non-use, VM waste and VM abuse) 4805, capacity model (for capacity planning and change) 4807, cost chargeback (resource usage based cost allocation) 4808, VM inventory (for organized access to infrastructure details) 4809, and Environment Search (infrastructure query and capture) 4810.

Exemplary implementations and/or embodiments of the present invention provide features and functions that are common to the overall unified management platform and the applets therein. For example, installation, licensing, update and support functions are common to the unified management platform, the management internals, database, navigation view and common toolbars.

According to an exemplary implementation and/or embodiment, upon installation and set up of the unified management platform, collection of information (raw data) about each object begins immediately (for example, collection of information for the Virtual Center). For example, data can be collected for 5 minute segments, for a time period initialized during set-up of the platform (according to certain exemplary implementations, information may be need to be gathered for at least 24 hours or for 7 days, depending on the functionality desired). Exemplary implementations and embodiments of the present invention provide at least the benefit that once the unified platform (for example, the database) is installed and initialized (for example, including for one appliance), then the unified platform retains the information from the initialization and makes the data available for other applets. For example, after initialization, and some time in the future, if a new appliance is licensed and initiated in the unified management platform, the new applet can access the same information (such as database 5601) that is already being used and is common to all the unified management platform and other applet 5600. This provides the benefit of having a common database already in place that is shared by all the other applets and functions, and is ready for seamless access by a new applet or function when added, as provided by exemplary implementations and/or embodiments of the present invention.

Figure 58:
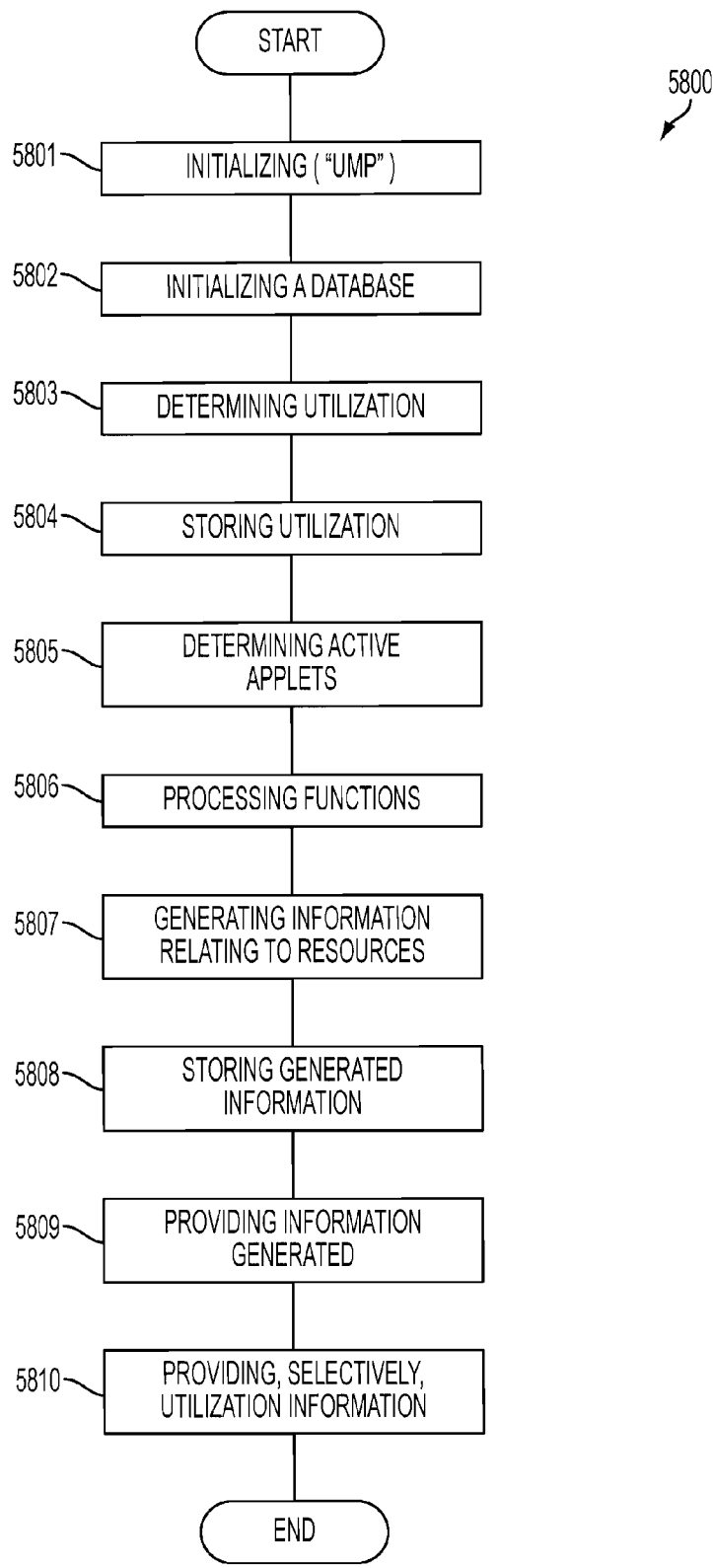
FIG. 58 is a flow diagram illustrating an exemplary methodology for a unified management platform in a computer network according to exemplary embodiments of the present invention.

FIG. 58 is a flow diagram illustrating methodology for a unified management platform in a computer network.

FIG. 58 illustrates an exemplary implementation of certain embodiments of the present invention that provide a method for unified management in a computer network 5800. According to this example, the method comprises, without limitation, initializing a unified management platform ("UMP") 5801, initializing a database 5802, determining utilization information relating to resources in the computer network 5803, storing the utilization information 5804, determining zero or more active applets provided by the UMP 5805, processing functions provided by at least one of the active applets 5806, generating information relating to the resources, upon processing of the functions 5807, storing in the database, the generated information relating to the active applets 5808, providing information generated by the active applets 5809; and providing, selectively, utilization information to active applets for managing, analyzing and/or modeling at least one resource on the computer network 5810. According to an exemplary implementation, the database 5802 stores information relating to resources in the computer network. According to another exemplary implementation, the database and UMP are common to any or all active applets. As will be understood by skilled artisans based on the teaching of this disclosure, the method can be partially or entirely computer implemented.

Figure 59:
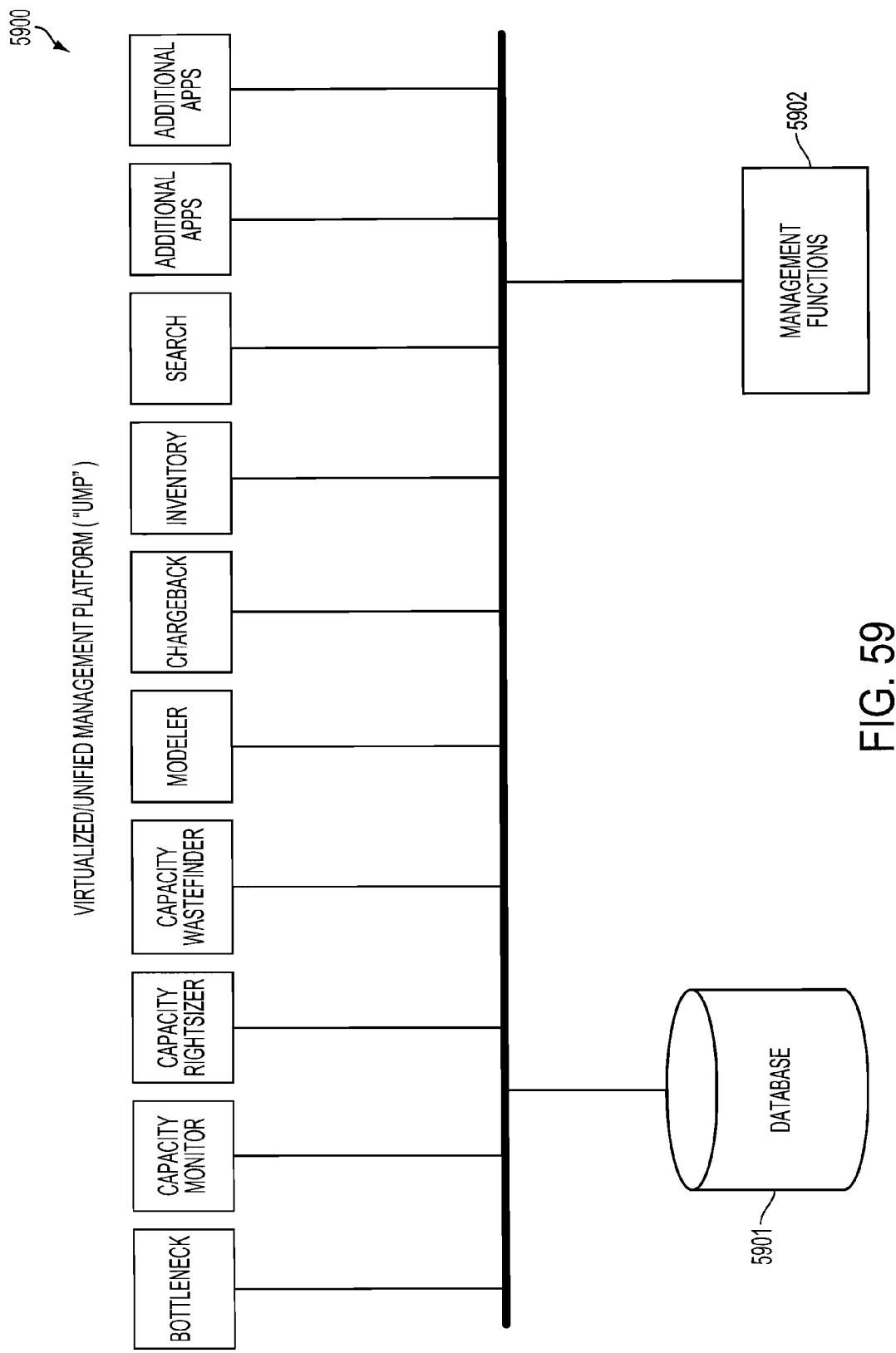
FIG. 59 is a block diagram illustrating an exemplary methodology for a unified management platform in a computer network according to exemplary embodiments of the present invention.

FIG. 59 is a block diagram illustrating exemplary methodology for a unified management platform in a computer network according to yet another exemplary implementation of the present invention.

In the example of FIG. 59, the methodology for a unified management platform ("UMP") in a computer network provides, without limitations, a database 5901 common to any (or all) applets active in the UMP, and management functions 5902 common to the applets. According to exemplary implementation, the applets provide for functionality such as, without limitation, managing, modeling, predicting, allocating and utilizing resources and bottlenecks in the computer network, managing, predicting and displaying of capacity, allocating and utilizing of resources, as well as actual and potential performance-degrading resource shortages in a computer network, in a virtualized computer environment. As will be understood by skilled artisans based on the teaching of this disclosure, the UMP can be computer implemented in part or in its entirety on one or more computers, systems or networks.

Further, according to an exemplary implementation of the present invention, UMP can be deployed from a remote location, for example, remote from the network and/or virtual resources utilizing UMP, such that the entity utilizing UMP (utilizing entity) does not have to download the UMP software. According to exemplary implementations and embodiments, the utilizing entity can initialize and utilize UMP, including, for example, the common database, applets and management functions, remotely via, for example, an Intranet and/or the Internet using, for example, an electronic document such as a Web browser and/or other electronic means. In certain exemplary implementations of the present invention, UMP can also include security features so that when an entity is utilizing UMP remotely, the UMP can provide for security and/or integrity of the data, the transmission and the connection. Exemplary implementations of the present invention providing remote utilization of UMP can facilitate "instant on", flexibility, ease of use, convenient usage methods (for example, subscription usage licensing models, which may be easier to budgeting for entities and organizations). Remotely-deployed UMP allows minimum utilization of the entity's resources, easy software maintenance and upgrade (for example, the remote location where the UMP resides physically, can be updated and maintained by the deploying entity). According to yet other exemplary implementations, the utilizing entity and deploying entity can be independent of one another and/or overlap, the deployment of UMP being remote from the utilizing entity. According to yet other exemplary implementations, the utilizing entity can seamlessly execute UMP, as described in exemplary implementations herein, with little or no impact from remote deployment and/or usage.

Figure 55:
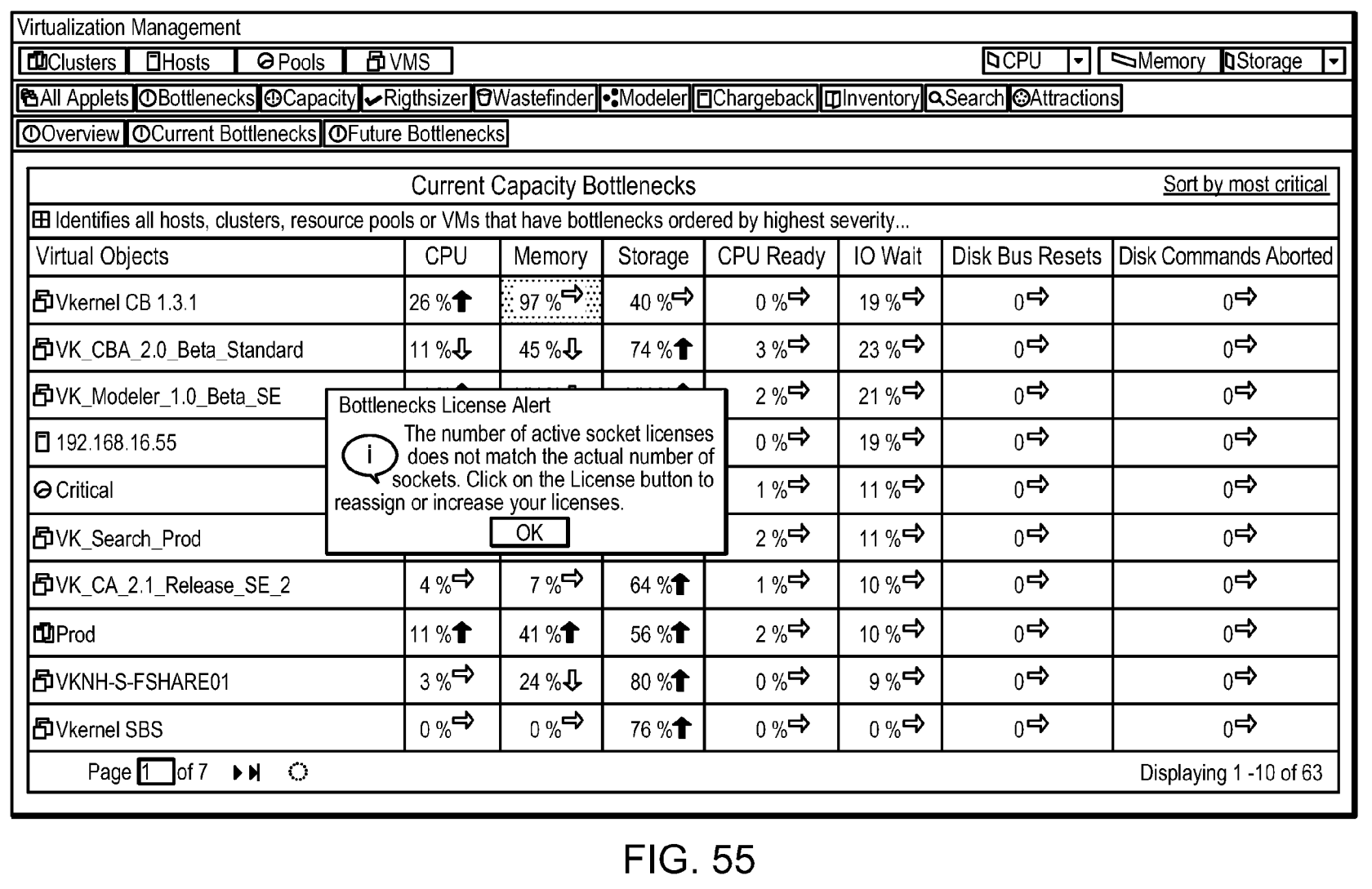

FIG. 55 is a screenshot illustrating an exemplary GUI implementation, as well as a method, system and device for automated licensing and licensing monitoring for resources in a virtual environment.

FIG. 55 shows an exemplary implementation of the present invention that provides for automated licensing and licensing monitoring for multiple applications with user selectable licensing, in one appliance. For example, implementations of the present invention provide for validating for use within the virtual infrastructure and then license according to need. Exemplary implementations allow a user to customize license assignments to hosts, for each application (for example, Bottlenecks).

FIG. 21 illustrates an exemplary implementation of the present invention that provides a graphical user interface (GUI) for managing and allocating computing resources in a computer network 2100, the GUI comprising a first interface for mapping computing object with one computing resource 2110, a second interface providing utilization bottleneck information of computing resources in the computer network 2111, 2112, and a third interface providing utilization trends for the computing resources 2113, wherein the GUI is computer generated.

FIG. 7 illustrates an exemplary implementation of the present invention that provides a method for identifying utilization bottleneck of computing resources in a computer network 700.

Regarding FIG. 7, an exemplary implementation of the present invention that provides a method for identifying at least one current utilization bottleneck of at least one computing resource in a computer network, wherein current utilization is based on past and current utilization of the computing resource 700.

FIG. 8 illustrates an exemplary implementation of the present invention that provides a method for identifying at least one future bottleneck of computing resources in a computer network, wherein identifying future bottleneck comprises predicting utilization trend information based at least on past and current computing resource utilization information 800.

FIGS. 31-39 illustrate exemplary implementations of the present invention that provide a graphical user interface (GUI) for allowing predictive analysis of computing objects utilizing resources in a computer network, the GUI comprising, a slider user interface (2101, 3201, 3301, 3401, 3501, 3601, 3701, 3801, 3901) allowing a user to specify a time period with a range of time periods, wherein the slider is comprised in a window showing resource utilization information for the computing objects, and wherein the GUI is computer implemented.

Exemplary implementations of the present invention facilitate performing of "what-if" scenario analysis, for example to determine the impact of changes to a model of resources of VMs in a computer network, as shown in FIGS. 48 and 54. This provides the benefit of simulating real-world scenarios and modifications to a model without making the changes.

Exemplary implementations of the present invention facilitate identification and utilization of over-allocated, under-used and/or un-used capacity resources for VMs, as shown in FIGS. 40-45 and 48. Implementations of the present invention provide for finding, fixing, tuning and/or rightsizing or decommissioning resources for VMs, providing the benefit of freeing up unused capacity to minimize or eliminate waste and reduce costs.

Exemplary implementations of the present invention provide for predicting capacity bottlenecks before such bottleneck occur by continuously monitoring resources related to VMs, and can forecast future bottleneck based on historical capacity consumption patterns, ensuring that capacity can always be made available before problems actually occur, as shown in FIGS. 2, 4-8, 12, 32 and 48.

The above-described exemplary embodiments of an apparatus, system and method in computer-readable media include program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for unified management in a virtualized computer network, the method comprising:
    initializing a unified management platform (UMP) on at least one computer comprising a processor and memory;
    initializing, by the at least one computer, a database;
    determining, by the at least one computer, utilization information relating to at least one resource in a virtual computing environment, wherein the at least one resource comprises a virtual resource associated with at least one of CPU, memory, storage, and network input/output;
    storing, by the at least one computer, the utilization information in the database;
    determining, by the at least one computer, two or more active applets provided by the UMP;
    wherein the UMP comprises at least one internal management function common to the two or more active applets;
    wherein the two or more active applets each comprise an application that focuses on at least one issue related to managing the at least one resource;
    wherein the database is shared among the two or more active applets;
    processing, by the at least one computer, at least one function associated with at least one of the two or more active applets;
    generating, by the at least one computer, information relating to the at least one resource, upon processing of the at least one function;
    storing in the database, by the at least one computer, the generated information relating to the at least one resource;
    selectively providing, via the database, the utilization information and the generated information to the two or more active applets for at least one of:
        managing, modeling, predicting, allocating, or utilizing the at least one resource;
        managing, modeling, or predicting bottlenecks in a computing system;
        managing, predicting, or displaying of capacity; and
        evaluating actual and potential performance-degrading resource shortages in the virtual computing environment;
    initializing, by the at least one computer, a new applet provided by the UMP, the new applet focusing on an issue related to managing the at least one resource; and
    providing the new applet with access to the database responsive to the initializing.

2. The method of claim 1, wherein an applet comprises at least one application for determining and providing information relating to at least one resource, wherein the information is indicative of one or more of bottleneck, capacity, modeling, chargeback, and inventory information.

3. The method of claim 1, further comprising providing the generated information relating to the at least one resource via at least one of a report and a display.

4. The method of claim 1, wherein the UMP comprises the database.

5. A system comprising:
    a physical data storage storing a database;
    a physical computing system operable to:
        initialize a unified management platform (UMP);
        determine utilization information relating to at least one resource in a virtual computing environment, wherein the at least one resource comprises a virtual resource associated with at least one of CPU, memory, storage, and network input/output;
        store the utilization information in the database;
        determine two or more active applets provided by the UMP;
        wherein the UMP comprises at least one internal management function common to the two or more active applets;
        wherein the two or more active applets each comprise an application that focuses on at least one issue related to managing the at least one resource;
        wherein the database is shared among the two or more active applets;
        process at least one function associated with at least one of the two or more active applets;
        generate information relating to the at least one resource, upon processing of the at least one function;
        store in the database the generated information relating to the at least one resource;
        selectively provide, via the database, the utilization information and the generated information to the two or more active applets for at least one of:
            managing, modeling, predicting, allocating, or utilizing the at least one resource;
            managing, modeling, or predicting bottlenecks in a computing system;
            managing, predicting, or displaying of capacity; and
            evaluating actual and potential performance-degrading resource shortages in the virtual computing environment;
        initialize a new applet provided by the UMP, the new applet focusing on an issue related to managing the at least one resource; and
        provide the new applet with access to the database responsive to the initialization.

6. The system of claim 5, wherein an applet comprises at least one application for determining and providing information relating to at least one resource, wherein the information is indicative of one or more of bottleneck, capacity, modeling, chargeback, and inventory information.

7. The system of claim 5, wherein the physical computing system is further operable to provide the generated information relating to the at least one resource via at least one of a report and a display.

8. The system of claim 5, wherein the UMP comprises the database.

9. A non-transitory computer-readable medium having program instructions embodied therein, the program instructions adapted to be executed to implement a method comprising:

initializing a unified management platform (UMP);
initializing a database;
determining utilization information relating to at least one resource in a virtual computing environment, wherein the at least one resource comprises a virtual resource associated with at least one of CPU, memory, storage, and network input/output;
storing the utilization information in the database;
determining two or more active applets provided by the UMP;
wherein the UMP comprises at least one internal management function common to the two or more active applets;
wherein the two or more active applets each comprise an application that focuses on at least one issue related to managing the at least one resource;
wherein the database is shared among the two or more active applets;
processing at least one function associated with at least one of the two or more active applets;
generating information relating to the at least one resource, upon processing of the at least one function;
storing in the database the generated information relating to the at least one resource;
selectively providing, via the database, the utilization information and the generated information to the two or more active applets for at least one of:

managing, modeling, predicting, allocating, or utilizing the at least one resource;
managing, modeling, or predicting bottlenecks in a computing system;
managing, predicting, or displaying of capacity; and
evaluating actual and potential performance-degrading resource shortages in the virtual computing environment;

initializing a new applet provided by the UMP, the new applet focusing on an issue related to managing the at least one resource; and
providing the new applet with access to the database responsive to the initializing.

10. The non-transitory computer-readable medium of claim 9, wherein an applet comprises at least one application for determining and providing information relating to at least one resource, wherein the information is indicative of one or more of bottleneck, capacity, modeling, chargeback, and inventory information.

11. The non-transitory computer-readable medium of claim 9, wherein the method comprises providing the generated information relating to the at least one resource via at least one of a report and a display.

12. The non-transitory computer-readable medium of claim 9, wherein the UMP comprises the database.

* * * * *